US010891695B2

United States Patent
Sayed

(10) Patent No.: US 10,891,695 B2
(45) Date of Patent: Jan. 12, 2021

(54) REAL-TIME ANALYSIS USING A DATABASE TO GENERATE DATA FOR TRANSMISSION TO COMPUTING DEVICES

(71) Applicant: Omar Sayed, Chandler, AZ (US)

(72) Inventor: Omar Sayed, Chandler, AZ (US)

(*) Notice: Subject to any disclaimer, the term of this patent is extended or adjusted under 35 U.S.C. 154(b) by 133 days.

(21) Appl. No.: 16/106,788

(22) Filed: Aug. 21, 2018

(65) Prior Publication Data

US 2019/0122307 A1 Apr. 25, 2019

Related U.S. Application Data

(60) Provisional application No. 62/653,097, filed on Apr. 5, 2018, provisional application No. 62/575,991, filed on Oct. 23, 2017.

(51) Int. Cl.

| | | |
|---|---|---|
| *G06Q 40/00* | (2012.01) | |
| *G06Q 20/32* | (2012.01) | |
| *G06F 3/0482* | (2013.01) | |
| *G06Q 20/10* | (2012.01) | |
| *G06F 16/18* | (2019.01) | |
| *G06Q 20/38* | (2012.01) | |
| *G06F 3/0481* | (2013.01) | |

(52) U.S. Cl.
CPC .......... *G06Q 40/12* (2013.12); *G06F 3/0481* (2013.01); *G06F 3/0482* (2013.01); *G06F 16/1865* (2019.01); *G06Q 20/102* (2013.01); *G06Q 20/108* (2013.01); *G06Q 20/3221* (2013.01); *G06Q 20/389* (2013.01)

(58) Field of Classification Search
CPC .............................. G06Q 40/12; G06Q 40/00
USPC ........................................... 705/30
See application file for complete search history.

(56) References Cited

U.S. PATENT DOCUMENTS

| | | | |
|---|---|---|---|
| 7,899,750 B1 | 3/2011 | Klieman et al. | |
| 8,719,132 B1* | 5/2014 | Diggdon | G06Q 20/405 705/35 |
| 9,665,857 B2* | 5/2017 | Saoji | G06Q 20/10 |
| 9,965,808 B1* | 5/2018 | Kunz | G06Q 40/12 |
| 10,402,910 B1* | 9/2019 | Kunz | G06Q 40/12 |
| 10,460,379 B1* | 10/2019 | Diggdon | G06Q 20/227 |
| 10,467,709 B2* | 11/2019 | Maheshwari | G06Q 20/3224 |
| 10,552,917 B1* | 2/2020 | Kunz | G06Q 40/12 |
| 10,600,009 B1* | 3/2020 | Augustine | G06Q 30/02 |
| 2004/0139018 A1* | 7/2004 | Anderson | G07F 7/1008 705/41 |
| 2006/0106700 A1* | 5/2006 | Boren | G06Q 20/4016 705/35 |
| 2008/0275916 A1* | 11/2008 | Bohannon | G06F 16/254 |
| 2010/0100424 A1* | 4/2010 | Buchanan | G06Q 20/10 705/35 |

(Continued)

*Primary Examiner* — Oluseye Iwarere
(74) *Attorney, Agent, or Firm* — Greenberg Traurig LLP

(57) ABSTRACT

Systems and methods for analysis using a database to generate data for transmission to a computing device. In one approach, a method includes: receiving a current account balance for a user; receiving historical transaction data for the user; determining, based on the current account balance and the historical transaction data, historical cash balances for the user; determining forecasted transactions for the user; updating a database, the updating based on the historical cash balances and the forecasted transactions; generating, based on the database, data to display; and transmitting the data to a computing device for display in a user interface.

18 Claims, 57 Drawing Sheets

(56) References Cited

U.S. PATENT DOCUMENTS

| | | | |
|---|---|---|---|
| 2010/0100469 A1* | 4/2010 | Buchanan | G06Q 10/06 705/35 |
| 2010/0100470 A1* | 4/2010 | Buchanan | G06Q 10/10 705/35 |
| 2010/0217701 A1 | 8/2010 | Mesilaty | |
| 2014/0149201 A1* | 5/2014 | Abbott | G06Q 30/0234 705/14.34 |
| 2014/0180962 A1 | 6/2014 | Fiala et al. | |
| 2015/0149333 A1* | 5/2015 | Yaplee | G06Q 40/12 705/30 |
| 2015/0199661 A1* | 7/2015 | Saoji | G06Q 20/10 705/39 |
| 2015/0206252 A1 | 7/2015 | Rephlo et al. | |
| 2015/0339765 A1* | 11/2015 | Dubey | G06Q 10/04 705/35 |
| 2017/0053344 A1* | 2/2017 | Yaplee | G06Q 40/12 |
| 2017/0161652 A1* | 6/2017 | Porth | G06Q 10/04 |
| 2017/0161762 A1* | 6/2017 | Porth | G06Q 10/04 |
| 2017/0161833 A1* | 6/2017 | Porth | G06Q 10/04 |
| 2018/0060843 A1* | 3/2018 | Maheshwari | G06Q 20/3224 |
| 2018/0247296 A1* | 8/2018 | Win | G06Q 20/3255 |
| 2019/0057386 A1* | 2/2019 | Fazeli | H04L 67/327 |

* cited by examiner

REAL-TIME ANALYSIS USING A DATABASE TO GENERATE DATA FOR TRANSMISSION TO COMPUTING DEVICES

RELATED APPLICATIONS

This application claims priority to U.S. Provisional Application Ser. No. 62/575,991, filed Oct. 23, 2017, entitled "SYSTEM AND METHOD PROVIDING REAL-TIME ANALYSIS AND ALERTS," by Omar Sayed, and also claims priority to U.S. Provisional Application Ser. No. 62/653,097, filed Apr. 5, 2018, entitled "SYSTEM AND METHOD PROVIDING REAL-TIME ANALYSIS AND ALERTS," by Omar Sayed, the entire contents of which applications are incorporated by reference as if fully set forth herein.

FIELD OF THE TECHNOLOGY

At least some embodiments disclosed herein relate in general to data analysis using a database, and more particularly, but not limited to, real-time analysis using a database of transactional data obtained from real-time data, and using the database to generate data for performing one or more actions on a computing device.

BACKGROUND

In some cases, software and/or web-based financial management systems are used to monitor a consumer's financial activity including checking various account balances, implementing budgets, and paying bills. Examples of web-based financial management systems include web-based banking sites available on the Internet. When using a web-based banking site, for example, an account holder can perform tasks including balance monitoring, bill payment, balance transfers, etc., using various traditional or mobile computing devices.

Examples of financial management software systems include various personal and business financial management software systems. These systems often are typically implemented using a software application (e.g., software provided for execution on a mobile device of a user). The application may interact with a central computing system or device (e.g., a central server), and provide a user with a centralized interface with banks and other various financial institutions (e.g., for electronically tracking financial transactions to allow a user to, balance checkbooks, pay bills, track expenditures, create and manage budgets, and transfer money between accounts). Financial software systems have become more popular as capabilities have increased, and as the complexity of the typical person or business finances has increased.

Some current financial management systems include automatic payment and/or bill presentment features that provide a user with the ability to schedule bill payments from selected checking, savings, or other asset-based and/or credit-based accounts using automatic payment guidelines or rules (e.g., established by the user or the provider of the automatic payment and/or bill presentment feature). Examples of automatic payment rules include: automatic payment of a recurring bill to the same payee, for the same amount, on a periodic basis; automatic payment of a recurring bill to the same payee, for a variable amount, up to a predefined limit, on a periodic basis; automatic payment of a recurring bill to the same payee, in the amount of a minimum balance due, on a periodic basis; and automatic payment of a recurring bill to the same payee, for a variable amount, to be paid in full on a periodic basis.

Automatic payment and/or bill presentment features are used by both users and financial institutions. However, financial management systems using automatic payment and/or bill presentment features with automatic payment rules are typically focused on making an automatic payment, and do not address other financial goals or needs of the user.

In some cases, financial management systems use a projected balance feature. For example, a projected balance feature can calculate and estimate a projected balance of a selected account (e.g., a checking or savings account) at any designated future date or time frame, such as a particular day, week, or month. Typically, the projected balance is calculated using historical data about the account such as: a current balance in the account; recurring deposits to the account (e.g., a weekly or monthly paycheck), or other type of deposit made into the account on a recurring periodic basis; recurring withdraws, outflows, and bill payments made out of the account on a recurring periodic basis; pending activity, such as written but un-cashed checks; and/or any other recurring and/or user designated activity involving the selected account.

SUMMARY OF THE DESCRIPTION

Systems and methods for analysis using a database to generate data for transmission to computing devices and/or for use in performing other actions on a computing device are described herein. Some embodiments are summarized in this section.

In one embodiment, a software application (or other form of software) provides a user with a display of historical, current, and future cash flow for the user without requiring the user to manually enter the user's historical cash flow data. Data for providing the display is generated by taking current balances in accounts of the user, downloading transaction histories of the user, and running a reverse calculation to create a historical cash flow database. Artificial intelligence and/or machine learning algorithms are applied to the historical cash flow database to generate data regarding forecasts of future cash flows, which is used to provide various displays of selected data to the user in a user interface.

In one embodiment, the software application is managed by the user using a cash flow dashboard (e.g., that presents cash flow forecasts, account information, etc.). The software application (e.g., operating in conjunction with a server) can aggregate user account data from various online sources (e.g., that store account data for accounts of the user). The software application generates an aggregated user cash flow database that includes historical entries (e.g., for past transactions on an account) and future cash flow projections (e.g., as impacted by forecasted activity on multiple accounts). In one embodiment, the software application displays cash flow data (e.g., as a graph or table) for the user with a user-selected granularity (e.g. day, week, month, etc.).

In one embodiment, the software can generate a rolling cash flow forecast. Using artificial intelligence and machine learning, the software application automatically converts forecast transactions to historical transactions as bank transactions are downloaded. The software can be configured to automatically notify the user when a cash flow or projected cash flow hits a threshold value or other predetermined limit. The software can be configured to link with one or more financial institutions (e.g., lenders) to automatically recommend appropriate financing based on the user's cash flow history and forecast.

In one embodiment, a system includes: at least one processor; and memory storing instructions configured to instruct the at least one processor to: receive at least one current account balance for a user; receive historical transaction data for the user; determine, based on the at least one current account balance and the historical transaction data, historical cash balances for the user; determine forecasted transactions for the user; update at least one database, the updating based at least on the historical cash balances and the forecasted transactions; generate, based on the at least one database, data to display; and transmit the generated data to a computing device for display of the generated data in a user interface.

In one embodiment, a non-transitory computer-readable storage medium stores computer-readable instructions, which when executed, cause a computing device to: receive at least one current account balance and historical transaction data for a user; determine, based on the at least one current account balance and the historical transaction data, historical cash balances for the user by calculating cash balances in reverse chronological order; and generate, based at least on the historical cash balances, data to present in a user interface of a computing device.

In one embodiment, a method to display selected information in a user interface of a computing device and implemented in a data processing system includes: receiving, over a network from at least one server, at least one current account balance for a user of the computing device; receiving, over the network from the at least one server, historical transaction data for the user; determining, by at least one processor and based on the at least one current account balance and the historical transaction data, historical cash balances for the user; determining, by the at least one processor and based at least in part on the historical transaction data, forecasted transactions for the user; updating, by the at least one processor, at least one database, the updating based at least on the historical cash balances and the forecasted transactions; generating, using the at least one database, first data to display selected information; and transmitting, over the network, the first data to the computing device for display in the user interface.

The disclosure includes methods and apparatuses which perform these methods, including data processing systems which perform these methods, and computer readable media containing instructions which when executed on data processing systems cause the systems to perform these methods.

Other features will be apparent from the accompanying drawings and from the detailed description which follows.

BRIEF DESCRIPTION OF THE DRAWINGS

The embodiments are illustrated by way of example and not limitation in the figures of the accompanying drawings in which like references indicate similar elements.

FIG. 5 shows automatic classification of transactions based on user-defined and/or machine-learning rules, according to one embodiment.

FIG. 23 shows a listing of accounts provided to a user, according to one embodiment.

FIGS. 27-28 show listings of transactions presented in a user interface of a computing device for which transactions can be classified, according to one embodiment.

FIG. 29 shows a listing of transactions for which filters can be applied, according to one embodiment.

FIGS. 30-32 show listings of transactions, according to one embodiment.

FIG. 33 shows applying a rule to transaction data received from a server of a financial institution, according to one embodiment.

Figure 36:
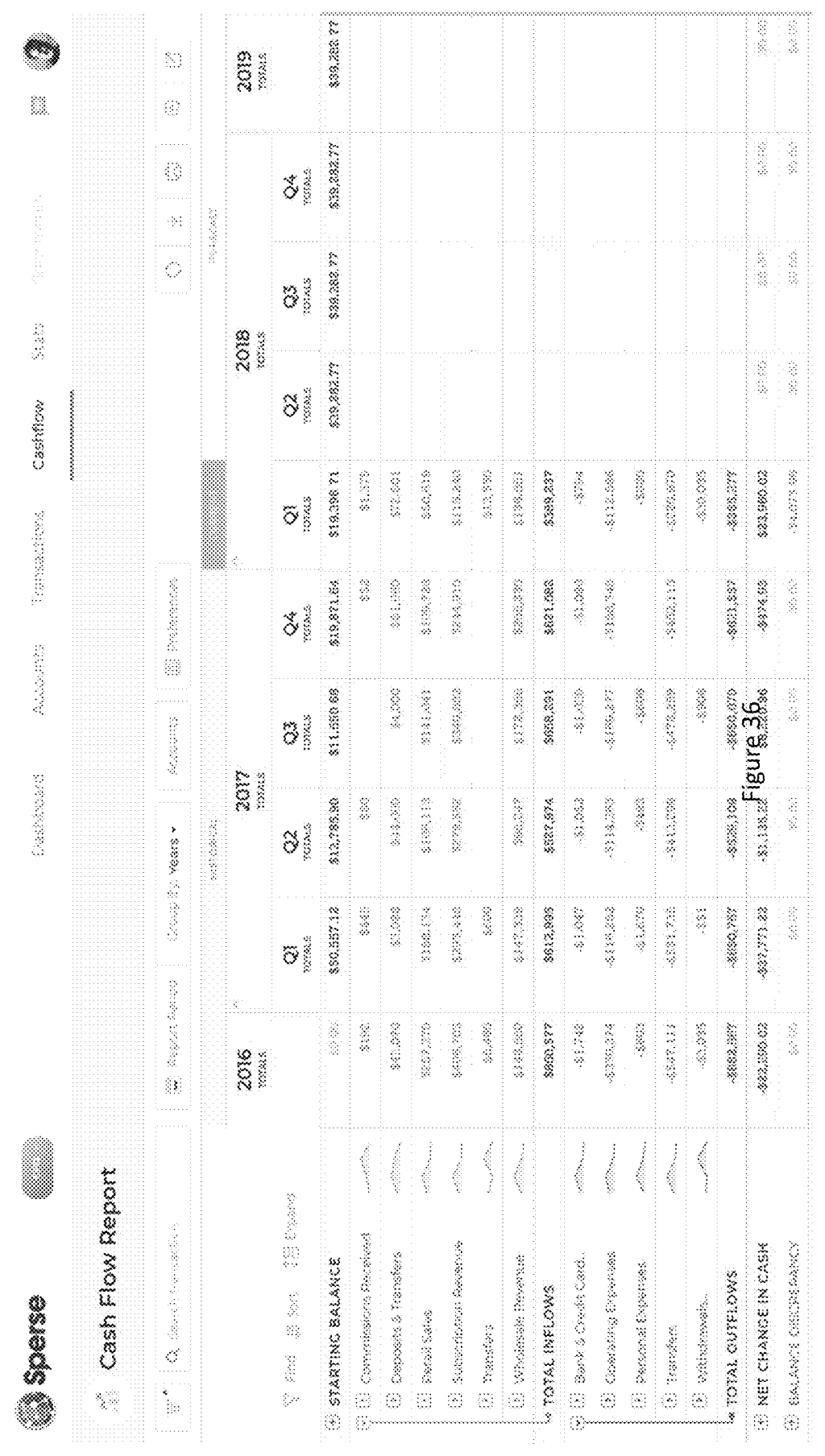
Figure 37:
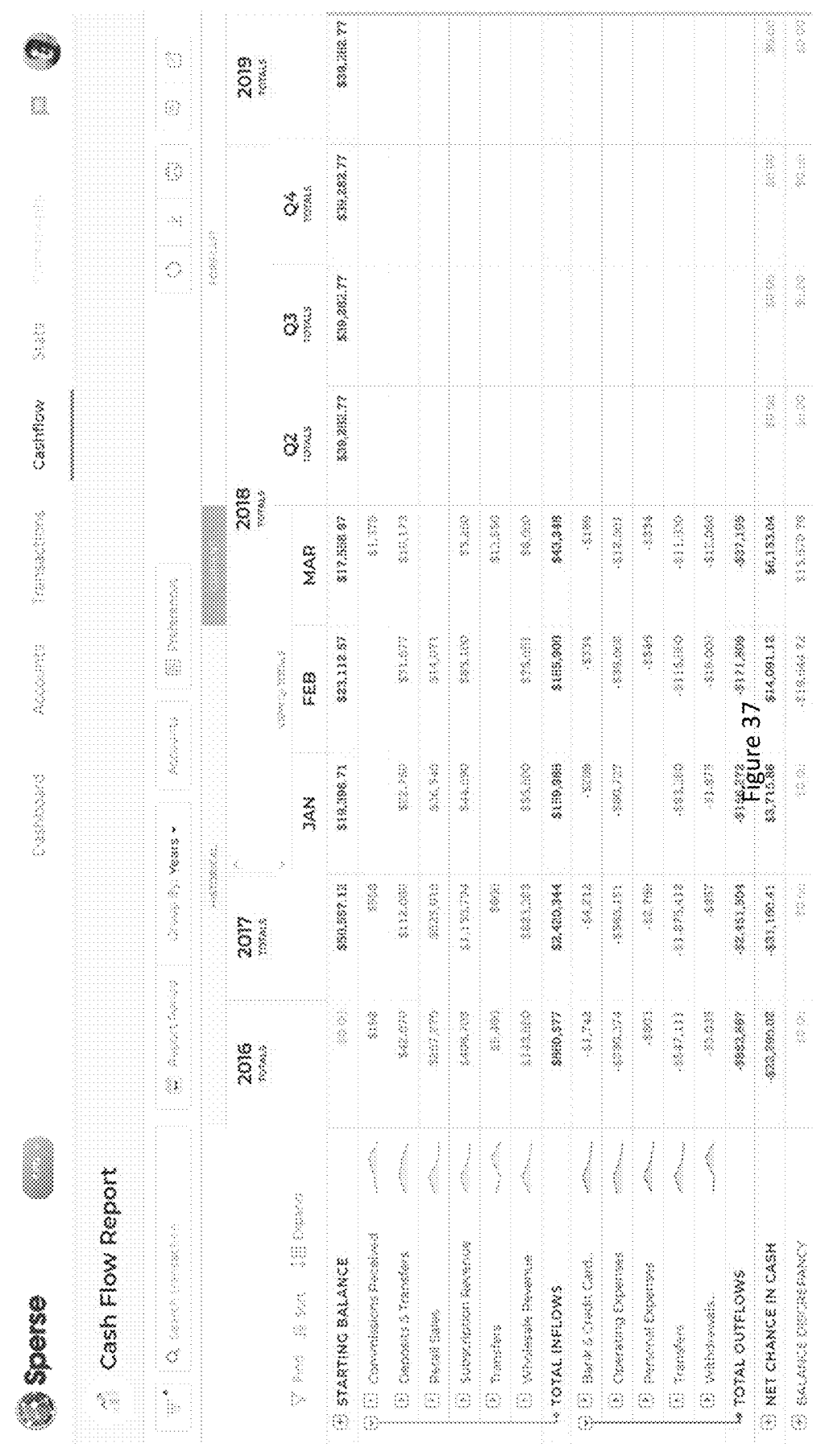
Figure 38:
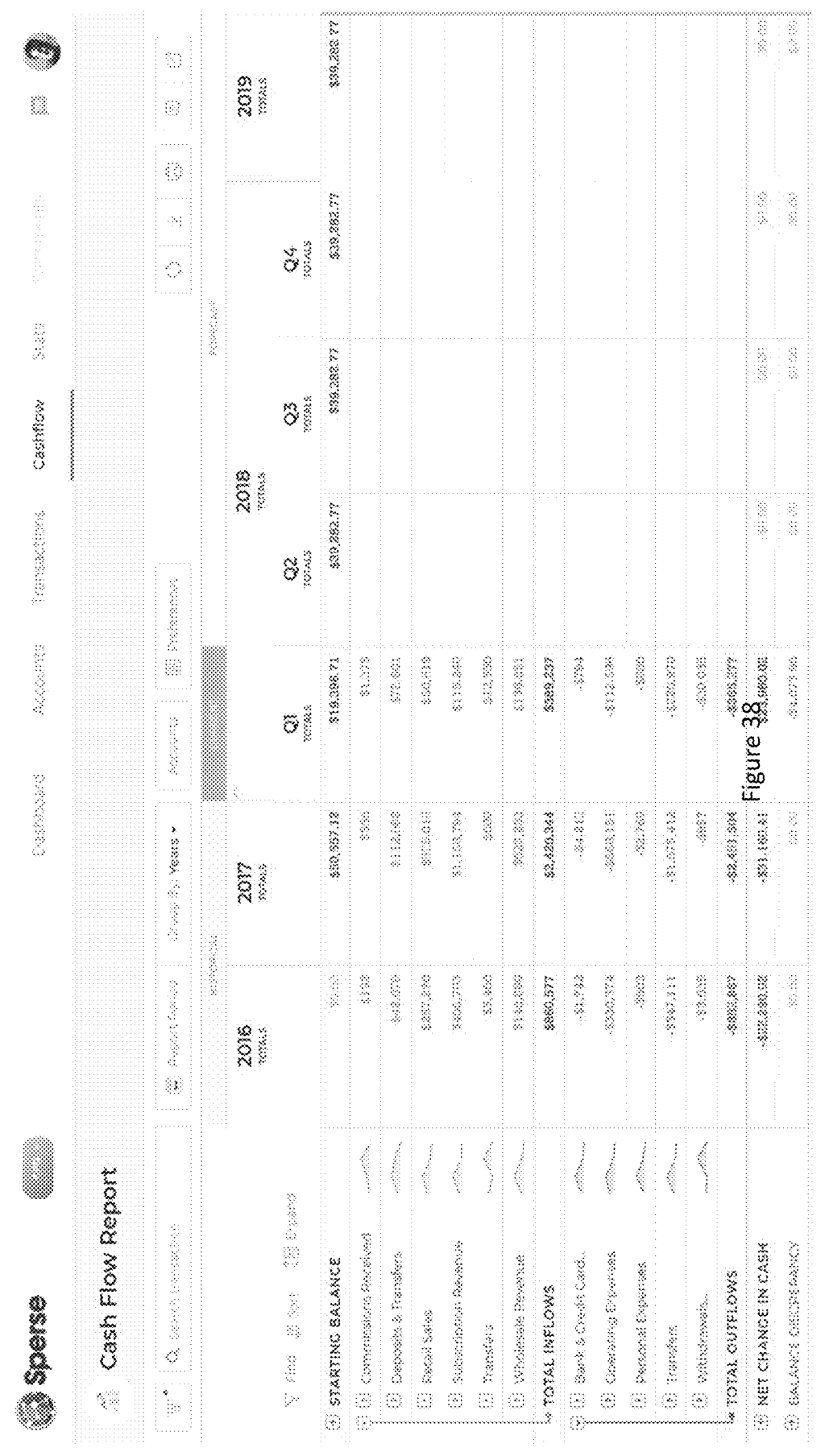
Figure 39:
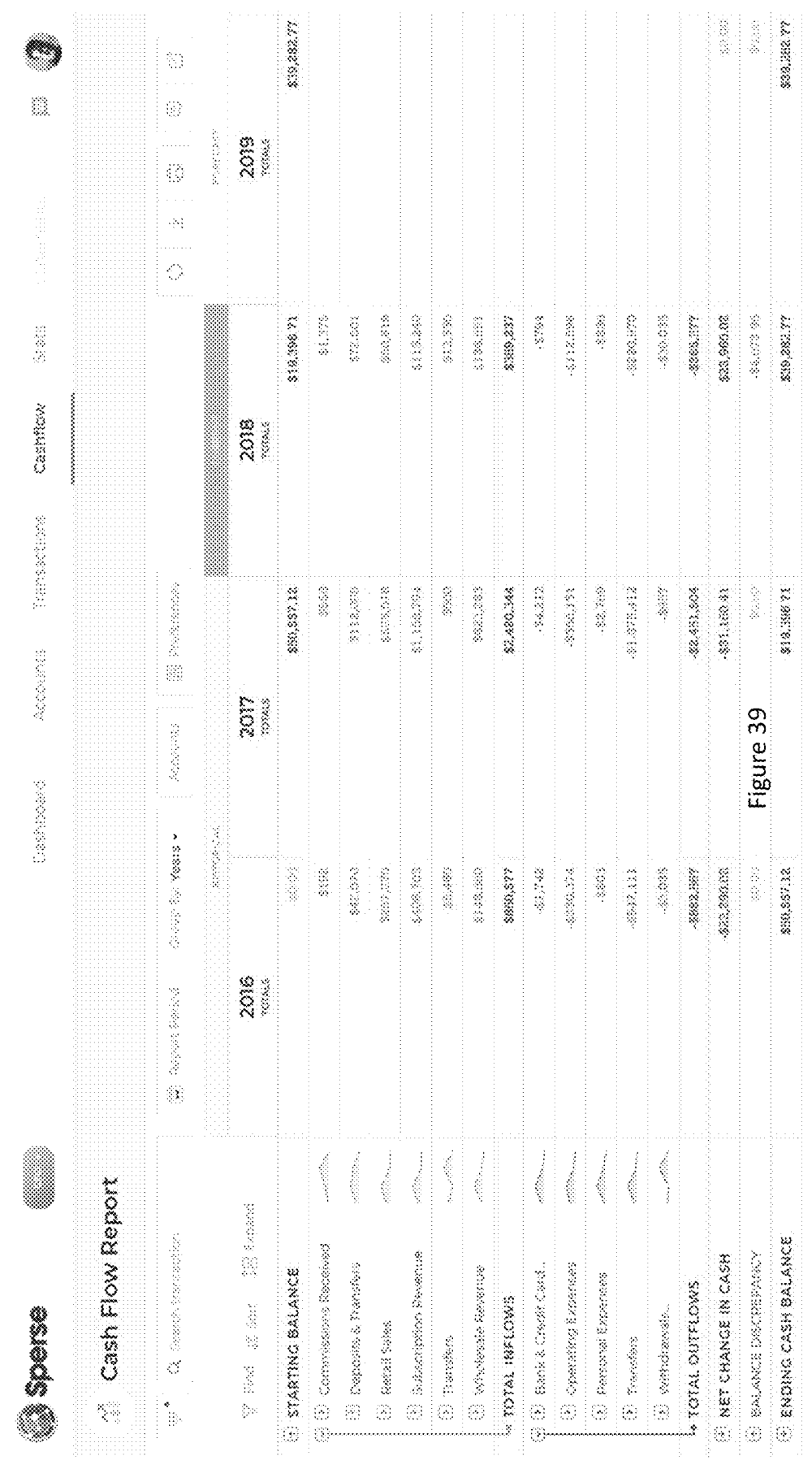
Figure 41:
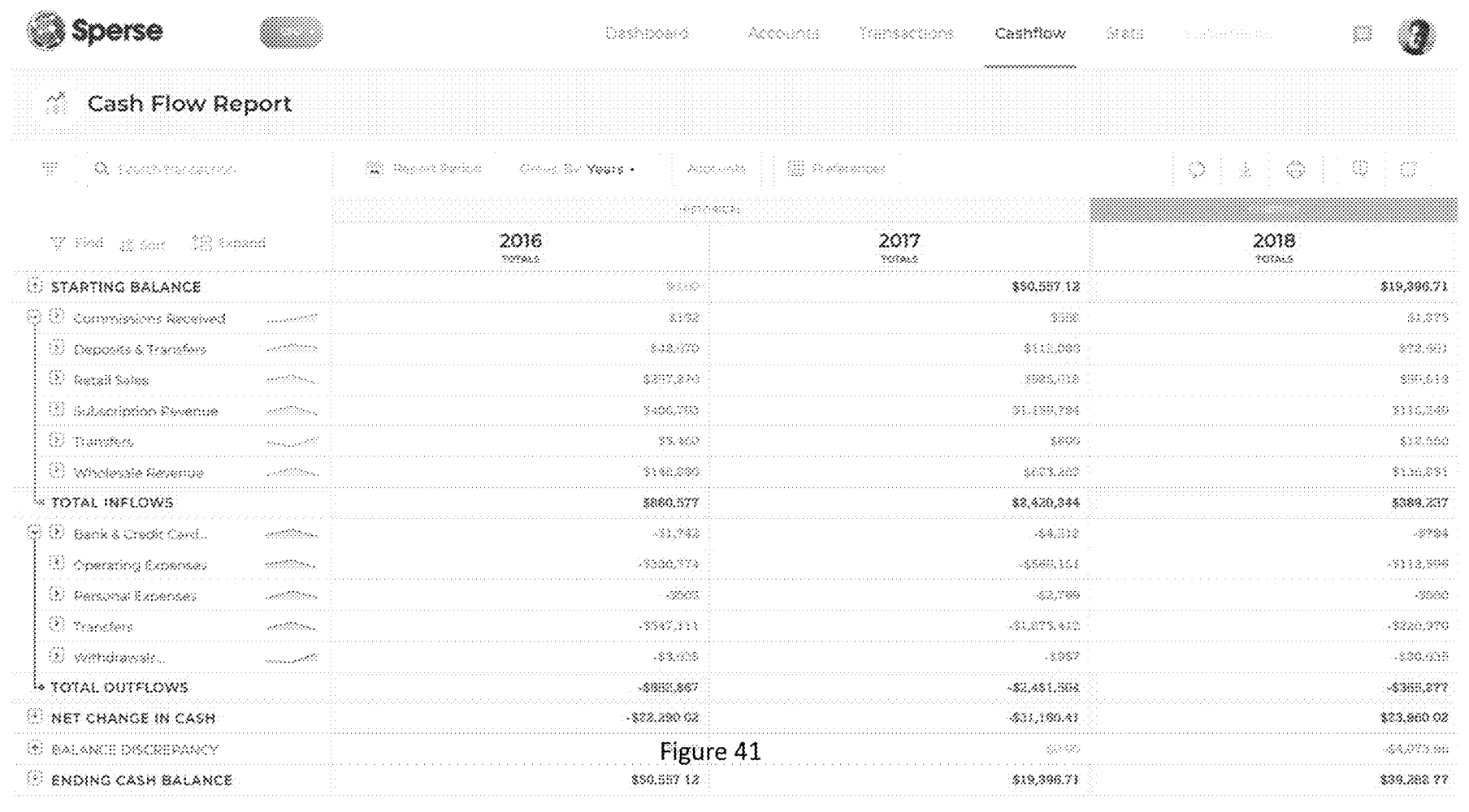

FIGS. 34-41 show cash flow reports presented to a user of the software application of FIG. 10 including listed cash inflows, listed cash outflows, and corresponding cash balances for various time periods, according to various embodiments.

FIG. 42 shows a cash flow report along with historical transaction data corresponding to a cash balance entry selected by a user in a user interface, according to one embodiment.

FIGS. 43-45 show cash flow reports presented to a user of the software application of FIG. 10, according to various embodiments.

FIG. 49 shows a cash flow report, according to one embodiment.

FIG. 53 shows receiving daily updates from various bank accounts of a user, according to one embodiment.

DETAILED DESCRIPTION

Figure 1:
FIG. 1 shows one or more functions for cash flow data processing that can be provided by various embodiments.
Figure 1:

The following description and drawings are illustrative and are not to be construed as limiting. Numerous specific details are described to provide a thorough understanding. However, in certain instances, well known or conventional details are not described in order to avoid obscuring the description. References to one or an embodiment in the present disclosure are not necessarily references to the same embodiment; and, such references mean at least one.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The present embodiments include the realization that the collection over a network and the management of transactional data from numerous, disparate computing devices using existing systems is inefficient. Further, managing and updating a database on a frequently recurring basis (e.g., at least hourly) is difficult due to large volumes of data that are typically collected.

One problem is that there are numerous different types of formats used for storing transactional data. Another problem is that methods of access to various different computing devices can vary dramatically. For example, application programming interfaces can have dramatically different interfacing requirements.

It is also difficult to forecast future transactional data trends using existing systems. One problem is that existing systems require significant manual input of data by a user or other person. This can lead to significant introduction of errors into any stored data.

Another problem is that transaction records downloaded from financial institutions and other servers are cryptic and difficult to interpret. This further increases the inefficiency of managing a transactional database and preparing a forecast of trends based on data stored in the database.

It is also difficult with existing systems to implement machine learning in an efficient manner that leverages the interactions of a central computing system with various servers when handling accounts for numerous different users in order to improve the efficiency of generating data for transmitting to a client device of each user based on previously collected and/or analyzed data of the group of users overall, or one or more of the other users. One problem with existing systems is that machine learning applied for a single user is limited to a narrow scope of data of just that user or a small set of users. In addition, existing systems do not integrate machine learning for handling of incoming transactional data processing with the management and updating of a transactional database based on the transactional data received from numerous different servers.

Another problem with existing transactional data systems is that the user must navigate and switch through many views of data in a user interface to find the proper or relevant data for display. Further, in many cases a user is viewing financial or other data on a computing device with a small screen. Existing systems do not select a limited set of information regarding a forecast of transactional trends or historical transactions, or an integration of historical and forecast data in a single view. Thus, the user is not able to efficiently view relevant transactional forecast or other data (e.g., when viewed on small screens or even a single monitor of a desktop computing device).

Various embodiments described herein provide a technical solution to the above technical problems. These various embodiments provide methods for summarizing and presenting relevant, limited information in a user interface of one or more computing devices. Transactional data such as a forecast display is presented to the user based on display of a limited set of information selected using one or more transactional databases. This results in an improved user interface that is more efficiently navigated by a user, especially for computing devices having smaller screens.

At least some embodiments generate data for transmitting to one or more computing devices based on access to an analysis of data stored in one or more transactional databases. This data is generated in a way that permits summarizing and presenting information in a user interface of a computing device (e.g., display on a single screen of a cash flow forecast or trend for a particular user). In many cases, relevant data is presented to the user in a single screen, which avoids the user having to scroll around and switch views many times to find the right data. For example, avoiding excessive navigation by a user in the user interface (e.g., avoiding having to scroll or move through two or more screen views or windows to locate a cash flow forecast or trend) improves the functioning of the graphical user interface of a mobile or tablet device, or other computing device (e.g., a single monitor system).

Figure 54:
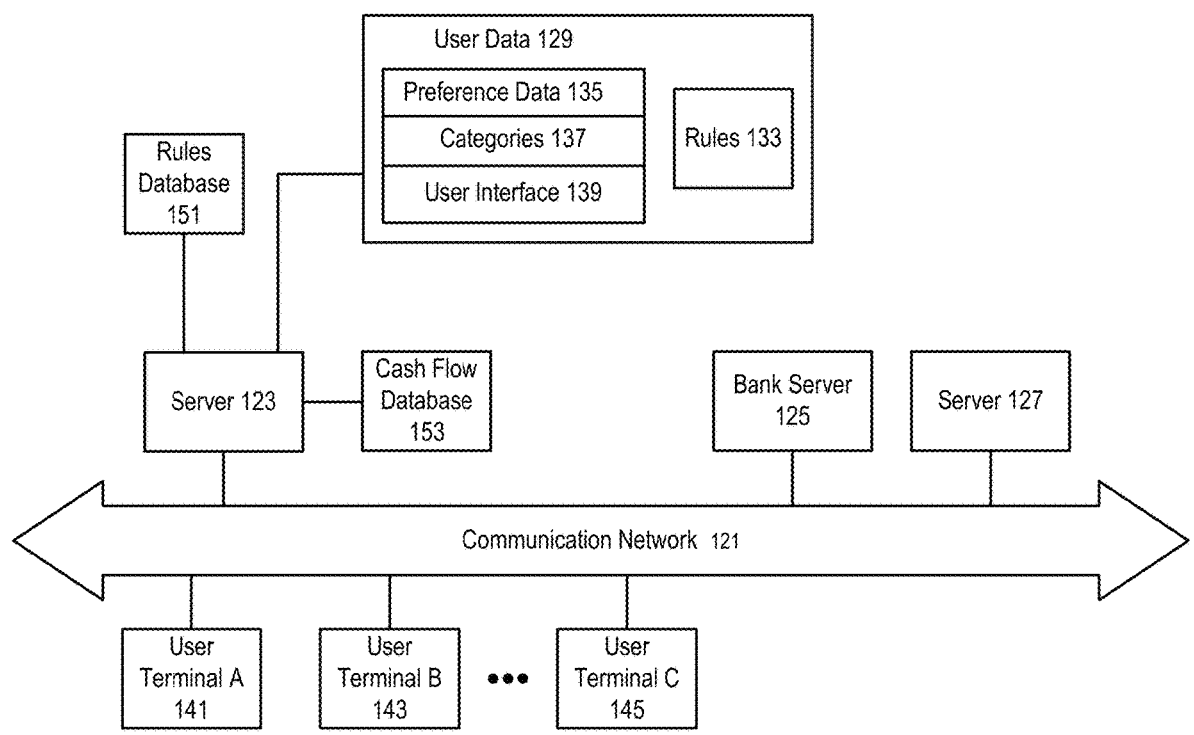
FIG. 54 shows a system to perform analysis of transactional data using one or more databases to generate data for transmission to a computing device, according to one embodiment.

FIG. 54 shows a system to perform analysis of transactional data using one or more databases to generate data for transmission to a computing device (e.g., a user terminal 145), according to one embodiment. In FIG. 54, user terminals (e.g., 141, 143, . . . , 145) are used to communicate with a server 123 over a communication network 121. The server 123 may include one or more web servers (or other types of data communication servers) to communicate with the user terminals (e.g., 141, 143, . . . , 145). In one example, the user terminals include a mobile device (e.g., an iPhone or Android device).

The server 123 also communicates over network 121 with bank server 125 and/or server 127. For example, server 123 can receive one or more current account balances and historical transaction data from bank server 125 and/or server 127 for a user of user terminal 145.

The server 123 is connected to a data storage facility to store user data 129, such as preference data 135, categories 137, user interface customization 139, rules 133, etc. In one example, preference data 135 can include preferred modes of communication desired by a user. In one example, categories 137 can correspond to how account data is organized when presented to the user on user terminal 145. Categories 137 can be selected by the user using a user interface. In one example, user interface customization 139 can correspond to customization of how user-interface information is presented to the user.

In one embodiment, user data 129 can include various administrator data for users. For example, such data can include data regarding user policies, roles, identification data for users, user settings, etc.

In one embodiment, rules 133 can correspond to procedures for handling newly-received transaction data from one or more bank servers (e.g., bank server 125) when updating data for various accounts of a user. In one example, rules 133 are specified by the user in a user interface of user terminal 145.

The server 123 is also connected to a rules database 151 and a cash flow database 153. In one embodiment, rules database 151 stores rules generated from machine learning based on transaction data received by server 123 from bank server 125 and/or server 127 for various users (e.g., the users of user terminals 141-145). For example, rules developed on data for one user can be applied to processing transaction data and forecasting cash flow for a different user.

In one embodiment, cash flow database 153 stores data regarding historical cash balances and forecasted transactions based on transaction data, current account balances, and/or other data obtained by server 123 from bank server 125 and/or other computing devices. In one embodiment, the historical cash balances are determined based on one or more current account balances for a user and historical transaction data of the user received by server 123. In one embodiment, the forecasted transactions are determined based at least on the historical transaction data.

In one embodiment, as server 123 receives new data, such as account balances and/or historical transaction data, cash flow database 153 is updated. Rules database 151 also can be updated based on new training of, for example, a neural network using training data including new data received by server 123. In one embodiment, data received by server 123 is processed based on rules and rules database 151 to update cash flow database 153.

In one embodiment, after cash flow database 153 is updated, cash flow data is generated by server 123 using data at least in part from the cash flow database 153. The cash flow data corresponds to data to be displayed by one of user terminals 141-145. The cash flow data is transmitted over the network to, for example, user terminal 145 for display in a window of a user interface. For example, the cash flow data can correspond to cash inflows, cash outflows, a cash flow trend, and/or a transaction classification status.

In one embodiment, server 123 uses data from cash flow database 153 when determining forecasted transactions for a user. As new historical transaction data is received from one or more servers, corresponding forecasted transactions are converted to historical transactions. Cash flow database 153 is updated after this conversion.

In one embodiment, historical cash balances for a user are determined by calculating cash balances in reverse chronological order. The cash balances are calculated starting with the current date of an account balance for the user. The calculating also uses a starting cash balance for a date that is prior to the current date. In one embodiment, determining the historical cash balances is performed by calculating cash balances by applying, using an opposite sign, debits and credits in reverse order. For example, the debits and credits are part of historical transaction data stored in cash flow database 153.

In one embodiment, historical balances and/or financial activity is determined using reverse calculation as described in more detail below. A server (e.g., server 123) receives a current account balance (e.g., available from a server of a financial institution over network 121) as a starting point for the calculations, and uses transactional data exported from the financial institution server. The transactional data consists of all the debits and credits and is used to reconstruct historical financial activity, and daily starting and ending balances, in reverse chronological order, starting with the most recent date and going back to the oldest date to determine a starting account balance for the beginning activity based on the available data.

The starting point for reconstructing the historical cash balance will be the current (latest) cash balance. Then, transactional data (e.g., debits and credits) will be applied in reverse order, and using the opposite sign (this is mathematically known as additive inverse).

Cash balance calculations will be done in reverse chronological order, starting with the most recent date and then going back to the oldest date. This will be done, for example, daily for each historical day, based on the user's historical data (e.g., as stored in cash flow database 153). In one example, the data is updated on a daily basis and any changes from the previous day are recalculated.

The starting cash balance of a given day is the same as the ending cash balance of the previous day. As a result, the system is actually reconstructing the starting cash balances of a certain day and also using that as the ending cash balance for the prior date, until there are no more historical transactions to process.

If multiple financial accounts are included in the calculations, the same approach for calculating historical financial balances and activity is applied to each account separately. In one embodiment, the activity of multiple accounts is collated together into various reports to provide an aggregated view of the selected accounts, which can be presented to the user in any granularity (e.g., daily, weekly, monthly quarterly or annual grouping) and with any level of account aggregation (e.g., individual accounts, aggregated accounts per banking institution, aggregated accounts grouped by user selection between one or more institutions, aggregate total of all accounts). The system takes all of the transactional data exported from an individual account or multiple financial accounts and calculates all applicable historical cash balances for the selected period.

The server (e.g., server 123) calculates a starting balance for each historical period (e.g., day, week, month, quarter, year). To determine each starting balance, the system uses each ending balance calculated for a certain date and adds or deducts the net sum of all prior transactional data (credit, debits) received from the financial institution(s) for the given date. Therefore, the previous starting balance is a calculated value. The calculation for the first starting balance, which can be referred to as the "Starting Balance Entry", is the difference between the current ending position, and the sum of all debit and credit transactions for all available periods, resulting in the original starting position.

The server calculates and reconstructs each day's balances. The day of the current (latest) cash balance in the system is referred to as the latest day. Based on the data in the system, the process starts with the current (latest) cash balance. For the latest day, the process adds transactional data negative values (cash out) back in, and subtracts transactional data positive values (cash in). The result is the starting cash balance for the latest day. For the previous day (latest day minus 1 day), the process begins with the latest day starting cash balance. Then, the process adds transactional data negative values (cash out) back in, and subtracts transactional data positive values (cash in). This will provide the starting cash balance on the previous day. Next in the process will be the latest day minus 2 days, and then the days order will continue this way for all historical days.

Although FIG. 54 illustrates an example system implemented in client server architecture, embodiments of the disclosure can be implemented in various alternative architectures.

For example, the system can be implemented via a peer to peer network of user terminals, where transactional data and forecast data are shared via peer to peer communication connections. For example, some or all processing of transactional data may be implemented in the individual user terminals, instead of running on one or more centralized servers.

In one embodiment, a system includes servers (e.g., server 123) and devices (e.g., user terminals 141-145) that each contain at least one processor, at least one memory, and at least one network connection (e.g., network 121). The network connections are used to communicate messages, data, information, instructions, alerts, and notifications through the system. The servers and devices execute programs, program code, instructions, and applications stored in memory that cause the servers and devices to activate and execute programs in response to the messages sent through the system. In one embodiment, servers and devices are activated in response to messages that were transmitted over a wireless network and that include instructions to activate a user client device and execute one or more programs, instructions, and code.

In some embodiments, a combination of client server architecture and peer to peer architecture can be used, in which one or more centralized servers may be used to provide some of the information and/or services and the peer to peer network is used to provide other information and/or services. For example, some transactional data can be provided via the server 123, while other transactional data can be provided via peer to peer network connections. Thus, embodiments of the disclosure are not limited to a particular architecture.

In one embodiment, software (e.g., a client application) is executed by a user terminal and communicates with server 123. The software provides a user with a view of the user's historical, current, and/or future cash flow (e.g., based on data generated by server 123 and transmitted from server 123 to the user terminal). The user is not required to enter historical cash flow data, which is instead collected from bank server 125, server 127, etc., by server 123, and then cash flow data is transmitted to the client application for display in a user interface of a user terminal.

In one embodiment, server 123 can connect to other servers (e.g., servers for hundreds to thousands of banks or other financial institutions) to automatically download and categorize transactions and aggregate data from multiple accounts of a user. The user can be presented with a dashboard view of the user's cash flow with a rolling forecast. Server 123 can automatically convert forecast entries into historical entries as transactions are downloaded. Accounts and views can be modified to meet organizational needs, and notifications can be set to alert users when critical events occur.

In one embodiment, a cash flow dashboard is presented in a user interface and is presented and controlled by the software on the user terminal. The dashboard provides a user with an illustration of how the user's cash movements are occurring over time. In one embodiment, the cash flow dashboard is generated by starting with the ending balances of each account of a user, taking in raw debit and credit data, aggregating it from multiple institutions, and using a tagging system and reverse calculations to reconstruct a database with the user's daily historical cash flow.

In one embodiment, software executing on server 123 re-creates a full historical cash flow by inference using account current balances and downloaded data for transactions. Server 123 uses artificial intelligence, machine learning algorithms and rules (e.g., stored in rules database 151) to forecast future cash flow from historical cash flow data. The cash flow history and forecasts are updated in real-time (e.g., several times daily, or at least hourly) and stored in, for example, cash flow database 153. Server 123 recognizes changes in the data (e.g., based on data received from server 125 and/or 127) and will automatically update, in real-time, the cash flow history and forecast.

In one embodiment, historical cash flow and projected future cash flow forecasts are generated together. When data for new transactions is received (e.g., by server 123), software executing on server 123 looks at the transaction source and amount to identify if the transaction matches a forecast transaction. If a transaction fully matches a forecast (e.g., an exact match), the forecast transaction is moved or converted to a historical transaction. If the values don't match, server 123 decides through inference whether a partial match exists. For example, some transactions may be partial fulfillment of a forecast transaction, or the amount may not match exactly. For example, if a transaction for $15,200 is received by a bank server, server 123 needs to determine if that data matches a forecast transaction. If it does, that forecast transaction is moved to a historical transaction. However, if the forecast transaction was $15,500, server 123 needs to decide if this is a partial transaction and only move a percentage of the forecast transaction to a historical transaction, or if the transaction is complete and move $15,200 to a historical transaction and cancel the $15,500 forecast transaction. In one embodiment, server 123 uses artificial intelligence and inference for transaction matching. If the software does not correctly map the forecast and historical transactions, the user can override the transactions to correct the model (e.g., override rules of a user can be stored as rules 133). As server 123 processes more data, it becomes more accurate in matching transactions correctly.

In one embodiment, server 123 generates a rolling cash flow forecast. A benefit of this is the way it simplifies cash flow forecasting (e.g., to make data processing more efficient). In one example, a business has 700 units sold at a price of $69, and so $48,300 is added to the cash flow forecast. Using server 123, the cash flow forecast creation can be automated (e.g., after the historical database has been constructed). Inputs to the cash flow forecast come from the historical cash flow model, formulas, and internal or external data input sources. Rent is an example of an internal value. For example, if the rent is known to rise each year, a formula can be added to automatically increase the rent forecast transaction. A payroll service is an example of an external input of cash flow forecast values.

In one embodiment, after accounts have been added and connected to bank account data for a user, the user can view snapshots (e.g., for a business of the user) from multiple perspectives. For example, a chart of accounts displays all of the user's accounts. A user can add or remove accounts and choose how to view the information. Different departments of a business may have different ways the data needs to be viewed. For example, an accounting view may be specific to certain business needs, whereas managing cash flow can have different requirements. An accounting view may need to be structured in one way, for example, with specific categories shown, yet a different set of categories are shown for cash flow management. A user can customize how to view the data that best meets the user's needs.

In one embodiment, processing is handled in a client/server system. Some of the data is calculated on the server side and some on the client side. When a change is made on the client side, the data is shown on the client's screen, but is also updated on the server side and saved (e.g., in cash flow database 153). When the data is later reproduced on the client side, it is pulled from the stored data on the server. Data can be stored on the server on a one-day granularity. A user can choose to view the data with different granularity. For example, the data can be aggregated and viewed on a week, month, or year granularity.

The system can provide significant flexibility in how accounts are entered, managed, and viewed. For example, each institution can have multiple accounts, and accounts can be associated with different entities. For example, a holding company may have multiple subsidiaries. Bank accounts can be added and tied to different business entities or units, or can be aggregated across business entities with one user managing multiple entities.

In one embodiment, transactions for each bank account of a user can be automatically downloaded. Transactions are automatically classified as they are downloaded into categories (e.g., categories that have been previously defined by the user). The system learns user usage patterns, and can use hash identifiers to identify where to classify transactions. For example, the system will recognize a repeat transaction for Starbucks, and every time a new Starbucks transaction arrives the system knows where to classify the transaction.

In one embodiment, transaction history (e.g., transaction description, date stamp, time, amount, etc.) is pulled from the banks and the accounts of a user are updated daily. The transaction history retrieved from the banks represents the net change since the last synchronization point. For example, if the system has one thousand transactions, and since the last synchronization point, two hundred more transactions were added at the bank, the system pulls in the two hundred new transactions that had been added since the last synchronization point. For example, the last synchronization point could be eight hours ago, a day ago, or whenever the user last chose to synchronize the data. Banks typically update their account data on a daily basis, but users can choose to synchronize on whatever schedule is preferred.

As mentioned above, transaction records downloaded from banks are often cryptic. In one embodiment, server 123 can convert cryptic descriptors to more human friendly descriptors to give the user a better understanding of their transactions. For example, a bank transaction description may read "SWA". The server 123 can recognize this transaction and convert the description to "Southwest Airlines" (e.g., for data stored in cash flow database 153).

In one embodiment, a user can input data, set formulas, conditional rules and notification preferences to modify calculations or get notified when certain events happen (e.g., stored as preference data 135, rules 133, and/or user interface customization 139). These rules, formulas and preferences, etc. can be set by multiple users. In one embodiment, rule sets are hierarchic. On a general level there may be one set of rules, and for a particular business there may be another set. An individual person may have a different set of rules from the business or general rules. An example of a rule may be a formula that a rent payment rises by ten percent every year. The system uses that formula when calculating the cash flow forecast. Calculations can also include currencies from multiple countries. For example, Canadian currencies can be combined with U.S. currencies.

In one embodiment, a user is notified when certain predefined events occur, such as for example cash flow dropping below a threshold value. One of the triggers for notification can be when a user's balance goes into a pre-defined range.

In one embodiment, the system can be configured to recognize that financing is needed for the user (e.g., business). The system can analyze cash flow history and cash flow forecast and suggest what financing needs to be provided. In one embodiment, the system has an integrated process to recommend appropriate lending for the client. In one embodiment, the system enables users to look forward at their forecasted cash flow requirements and the system can connect users with computing devices of lenders. In one example, lenders can look at a user's cash flow inputs and outputs and determine an appropriate amount of funding.

In one embodiment, when handling financial account data, account balances of a user are reconciled with bank records obtained from one or more servers. For example, records in some cases need to reconcile to within a penny. Server 123 can reconcile account balances with bank balances daily with the starting balance, inputs, outputs, net change and ending balance shown on a screen to a user of a user terminal.

FIG. 1 shows one or more functions for cash flow data processing that can be provided by various embodiments (e.g., when generating cash flow data by server 123). For example, server 123 can dynamically update historical cash transactions along with generating predictive cash flow forecast data. This forecast data can be transmitted to user terminal 145 for display to a user.

Figure 2:
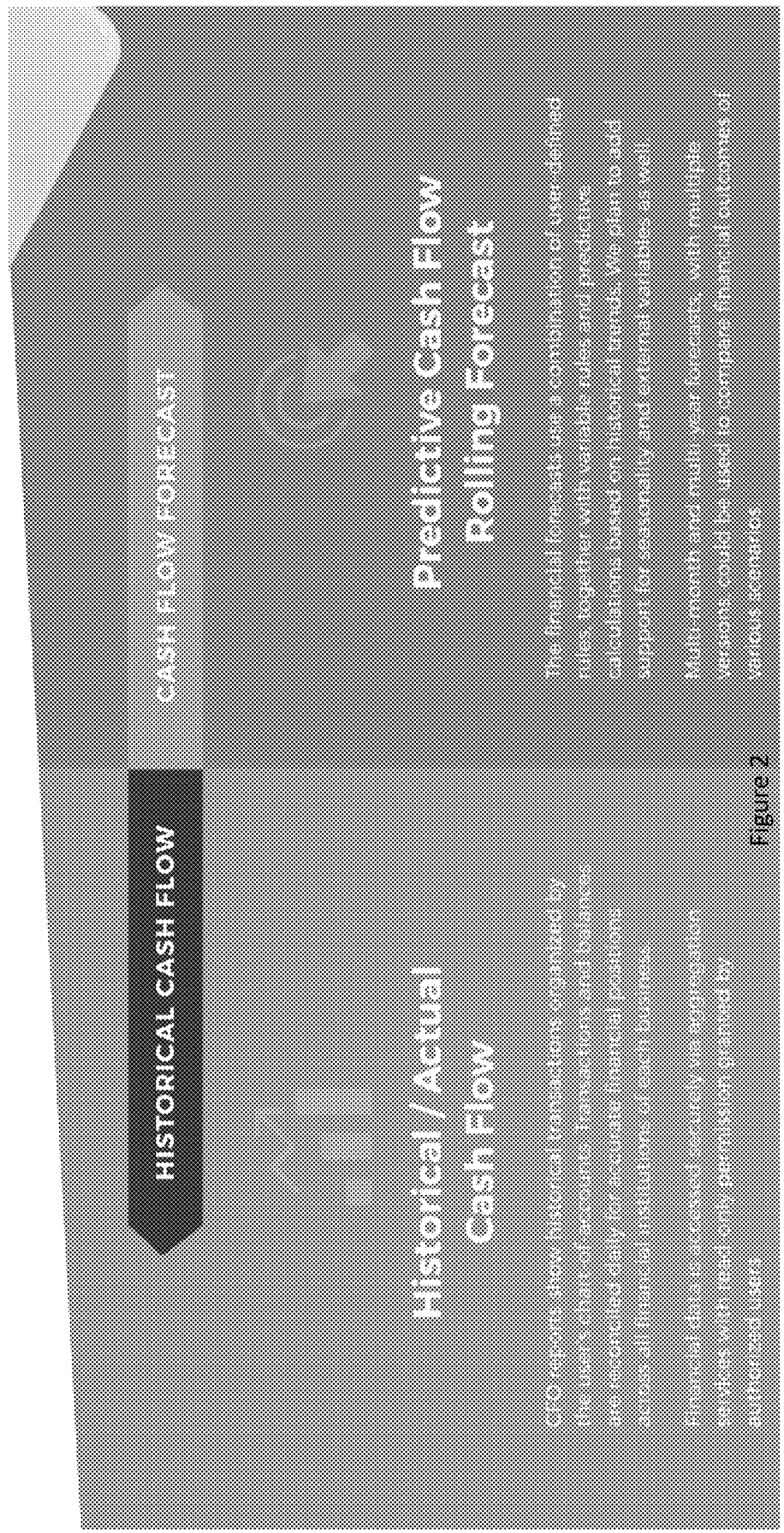
FIG. 2 shows integration of a historical cash flow with a predictive cash flow rolling forecast, according to one embodiment.

FIG. 2 shows integration of a historical cash flow with a predictive cash flow rolling forecast, according to one embodiment. In one embodiment, a forecast uses a combination of user-defined rules (e.g., rules 133) along with variable rules and predictive calculations (e.g., stored in rules database 151) based on historical trends.

In one embodiment, rolling forecasting model logic is used. More specifically, the system (e.g., server 123 and user terminal 145) uses a hierarchical set of rules to forecast each type of transaction. The rules to forecast each forecast value are derived from a hierarchical set of rules that use a priority level and a percentage of confidence to determine the best forecasted value for each interval (e.g., which is calculated in days).

In one embodiment, static or formula based user-defined rules can be used. The system allows functionality to generate values and formulas in response to user input. The highest priority and confidence level is applied to fixed amounts or formulas set by a user so that such values supersede other forecasted values. For example, a user may set a fixed amount of rent payments the user expects to pay for a fixed set of intervals, with a certain percentage of growth each year.

In one embodiment, historical data with user defined formulas can be used. A second level of priority is applied to data calculated from historical values which can then be forecasted using formulas that are defined by the user or automatically by the system. The formula-based rules take into account confidence levels and probability of some event occurring in the future. For example, using the historical trend for a certain past period, server 123 can forecast the future values using a user-defined or system defined formula to increment or decrement the historical trend values over a certain period of future intervals.

In one embodiment, conditional variable rules can be used. Conditional variable rules check to see if certain pre-defined conditions are met and determine a forecasted value based on user-defined formulas and historical data. For example, a conditional variable rule may be that a media budget is defined as 1.5×, but in December is defined as 1.8×.

In one embodiment, override conditional variable rules can be used. When multiple conditions or criteria are applicable to a forecasted value, the system will override lower priority or lower confidence values by selecting a highest priority and highest confidence values.

In one embodiment, rules based on internal or external variables are used. The system looks at data from internal data sources, such as other tables where information is defined, or at data from externally-connected software applications to determine trends and forecasting values. For example, the system may link to an internal or external marketing software application to see the marketing spending for a certain historical or future period and determine the effect the marketing spending has on revenue over a given period of time, and then forecast future performance based on the internally or externally-available data.

In one embodiment, seasonality and external data conditional rules are used. This approach uses externally defined information such as seasonality, market trends or currency trends to adjust forecasts. One example has a December forecast at 2× average Q2 per month.

Figure 3:
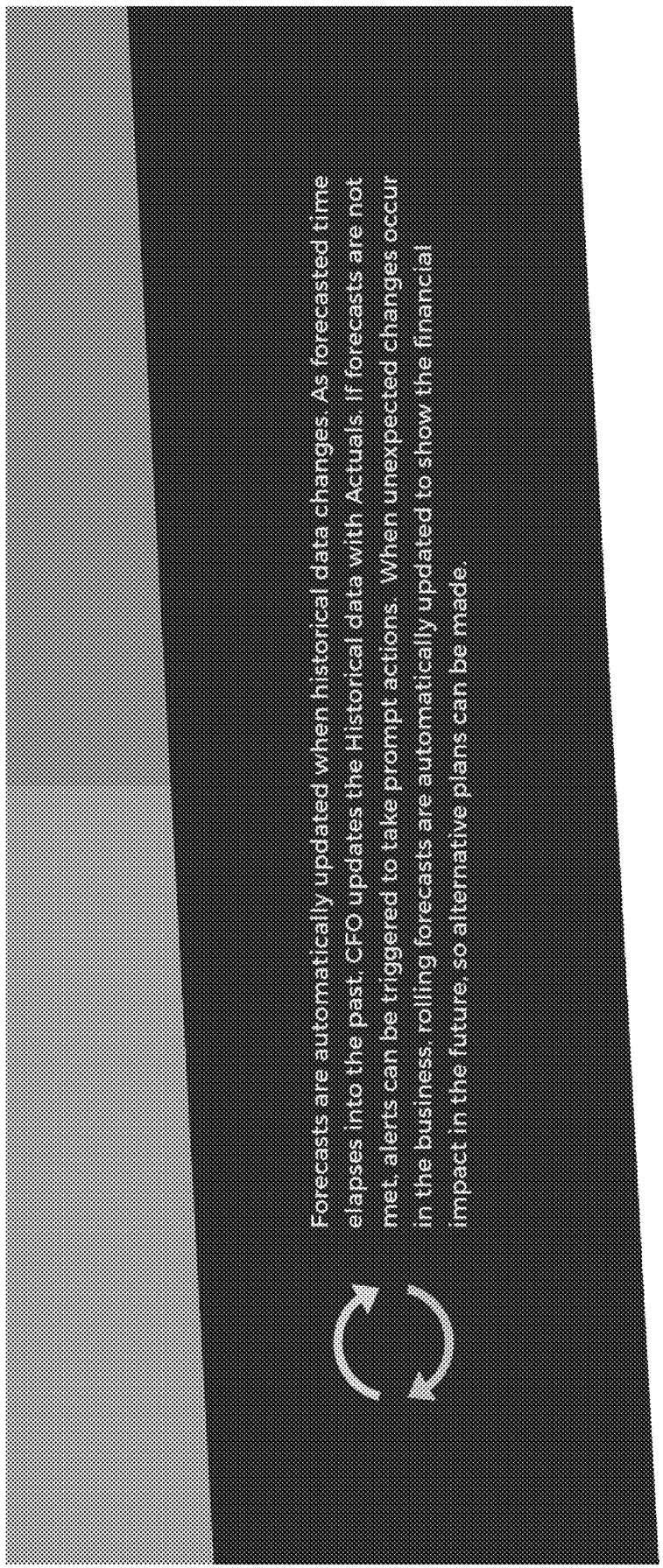
FIG. 3 shows automatic updating of forecasts when historical data changes, according to one embodiment.

FIG. 3 shows automatic updating of forecasts when historical data changes, according to one embodiment. In one example, if a forecast is not met, an alert can be triggered. In one example, the alert is a message transmitted to user terminal 145.

Figure 4:
FIG. 4 shows presentation of financial data based on user preferences, according to one embodiment.

FIG. 4 shows presentation of financial data based on user preferences, according to one embodiment. For example, the user preferences are stored as preference data 135 as part of user data 129.

Figure 5:
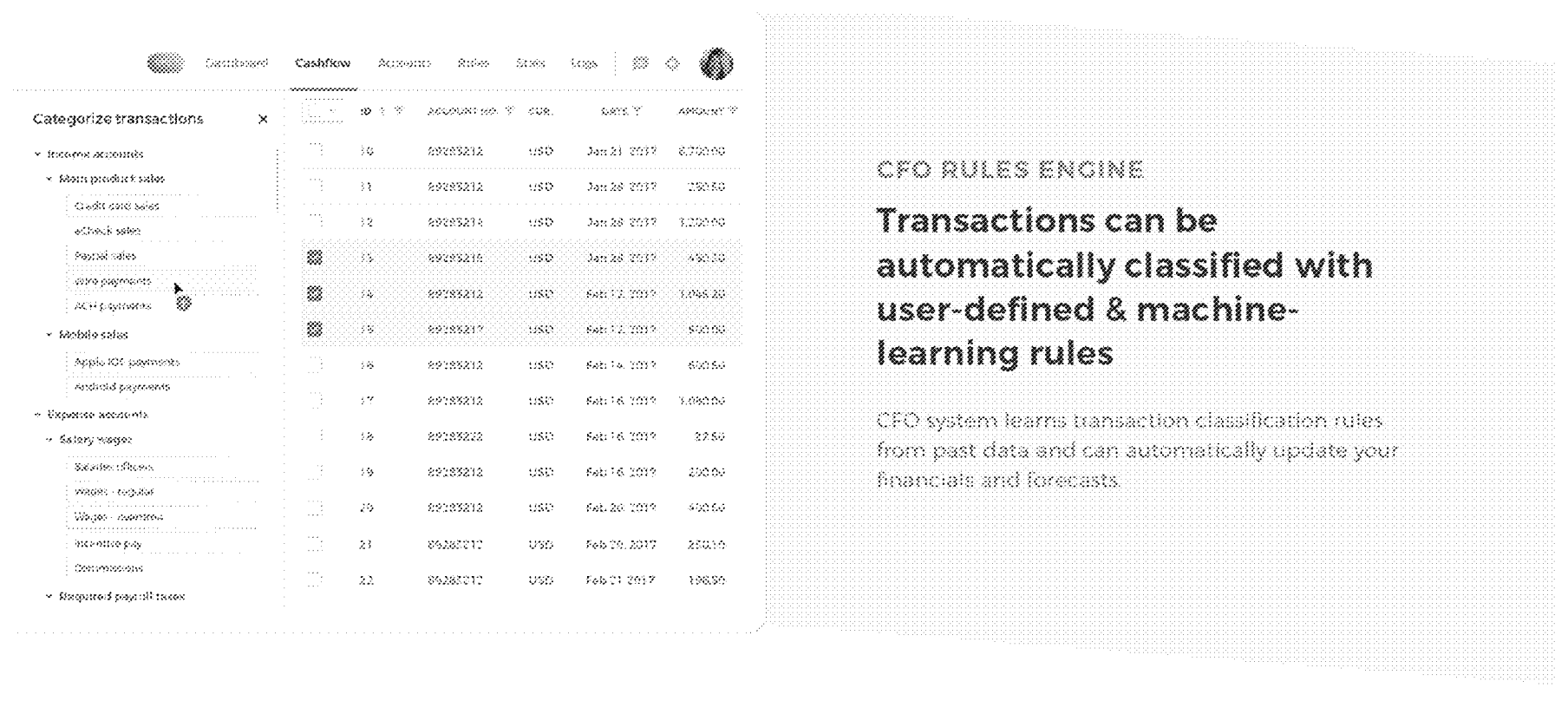

FIG. 5 shows automatic classification of transactions based on user-defined and/or machine-learning rules, according to one embodiment. For example, user-defined rules can be stored as rules 133. For example, machine-learning rules can be stored in rules database 151.

Figure 6:
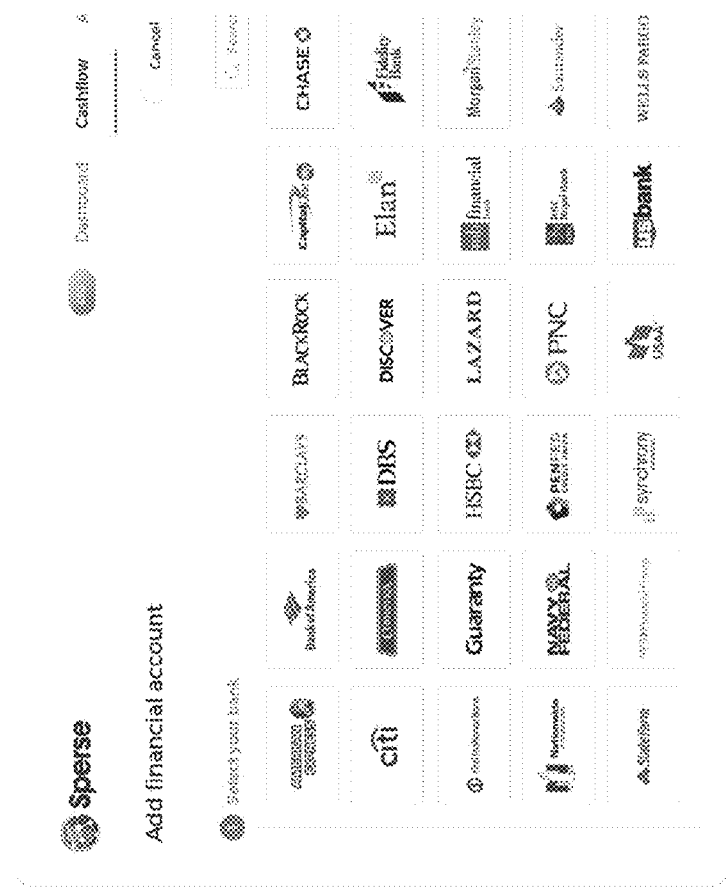
FIG. 6 shows adding an account for financial data aggregation, according to one embodiment.

FIG. 6 shows adding an account for financial data aggregation, according to one embodiment. For example, the account can be stored as part of user data 129. For example, the account can correspond to data stored on bank server 125.

Figure 7:
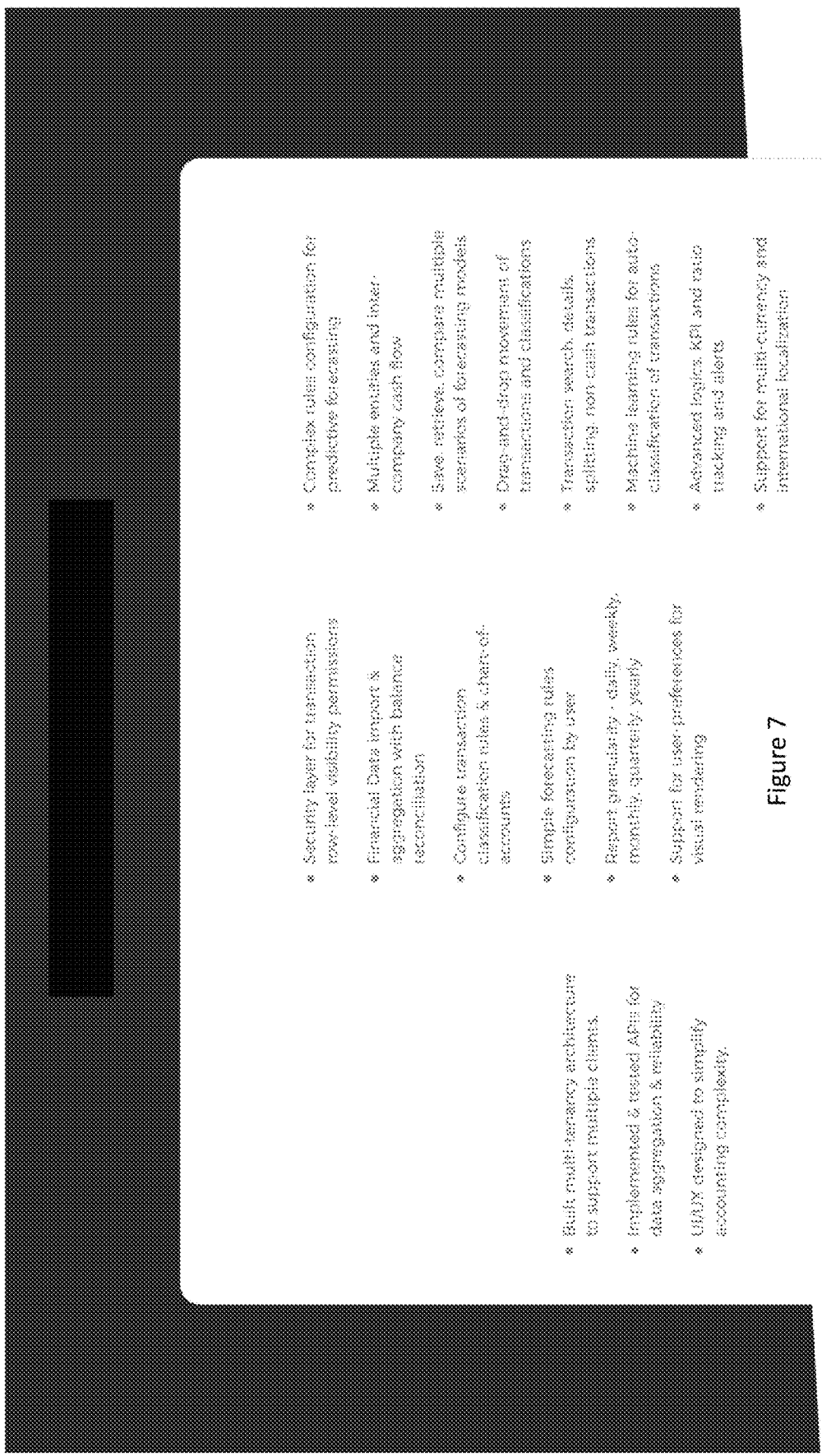
FIG. 7 shows one or more functions for cash flow data processing that can be provided by various embodiments.

FIG. 7 shows one or more functions for cash flow data processing that can be provided by various embodiments. In one embodiment, machine learning rules are used for automatic classification of transactions received from one or more servers.

Figure 8:
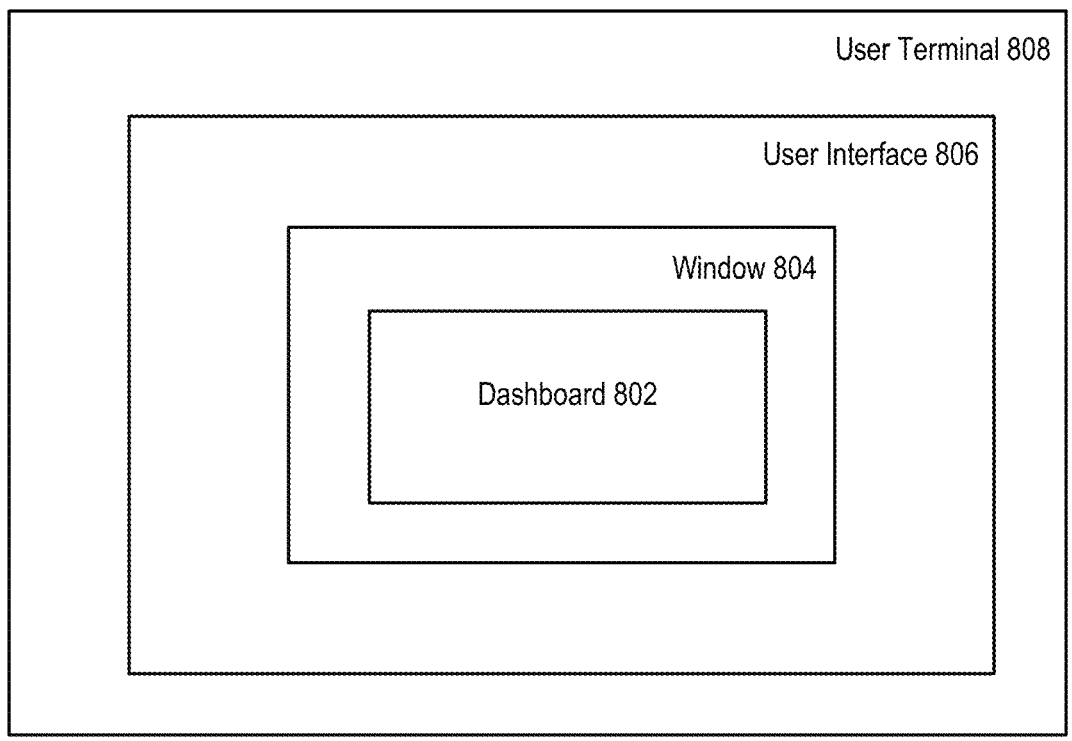
FIG. 8 shows a dashboard displayed in a window of a user interface on a user terminal, according to one embodiment.

FIG. 8 shows a dashboard displayed in a window 804 of a user interface 806 on a user terminal 808, according to one embodiment. In one example, user terminal 808 represents one of user terminals 141-145. A dashboard 802 is displayed in window 804. In one example, dashboard 802 presents a cash flow forecast for a user.

Figure 9:
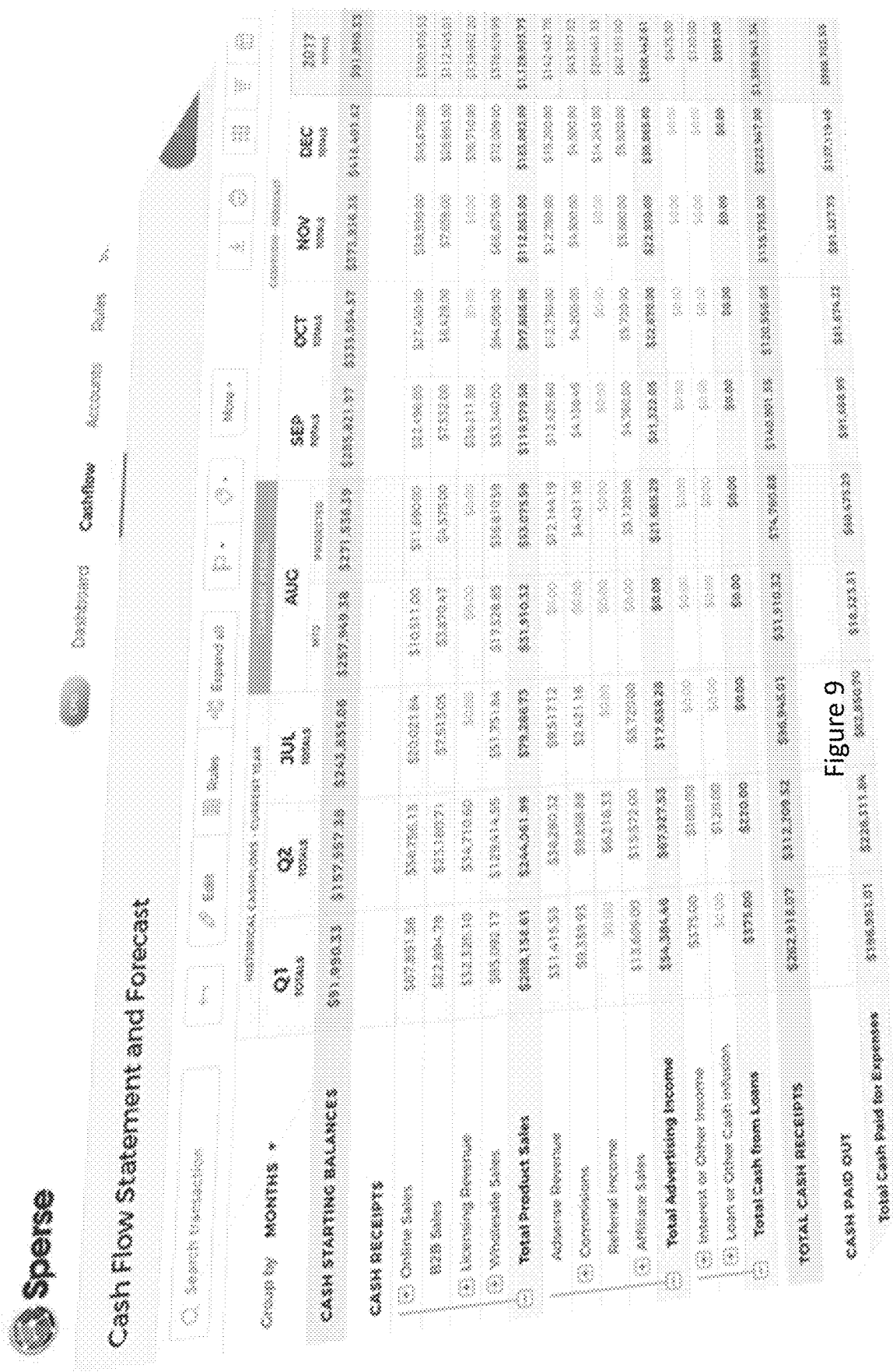
FIG. 9 shows a cash flow statement and forecast, according to one embodiment.

FIG. 9 shows a cash flow statement and forecast, according to one embodiment. Cash receipts are displayed that correspond to various types of activity.

In one embodiment, real-time balances can be connected to dynamically-adjusted rolling forecasts (e.g., on any given day of the month). A server (e.g., server 123) of the system connects to data sources (e.g., server 125 or 127), for example, of financial institutions multiple times on a daily basis. The server downloads all available transaction data and reconciles the starting and current balances of the connected financial accounts that are associated with the business or personal user, with the starting and ending balances of the data stored in one or more databases (e.g., cash flow database 153).

In one embodiment, the classification, reconciliation and forecasting are performed on a real-time basis using rules applied from the system or previously configured by the user with one or more user client devices.

In one embodiment, the data collection, data classification, data reconciliation and forecasting are done on either or both of a continuous real-time basis and an on-demand real-time basis. Continuous real-time automatic processing gives the user real-time information on a daily basis, or multiple times within a day. For on-demand, real-time operation, data collection, data classification, data reconciliation and forecasting are processed immediately for a particular user's data when that user activates the server reporting system.

In one embodiment, the reconciled balances are then used to update the rolling forecasting reports (e.g., data is generated and sent to user terminal 145 to display the report) so that future estimations can be updated using the updated historically reconciled data received from the data sources of the financial institutions.

Figure 10:
FIG. 10 shows a user login to a client software application, according to one embodiment.
Figure 10:
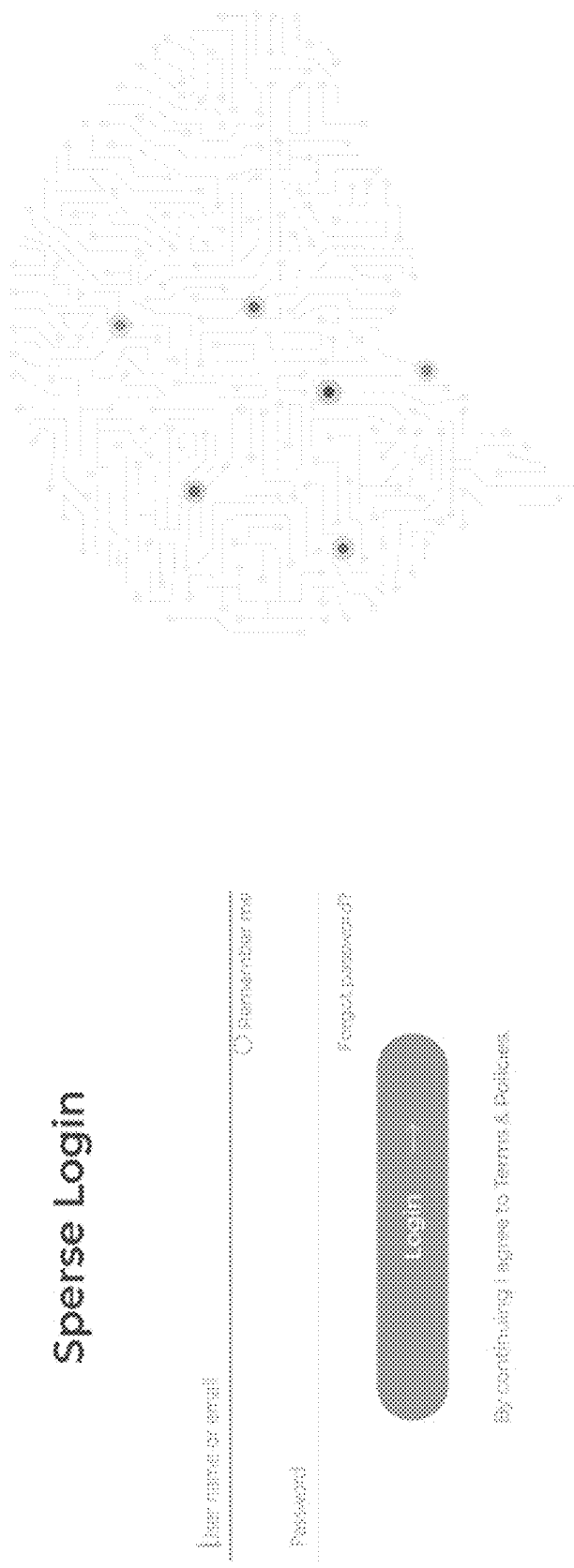

FIG. 10 shows a user login to a client software application, according to one embodiment. For example, the user logs on to server 123. In one example, the user is authenticated and then a secure connection established with server 123.

Figure 11:
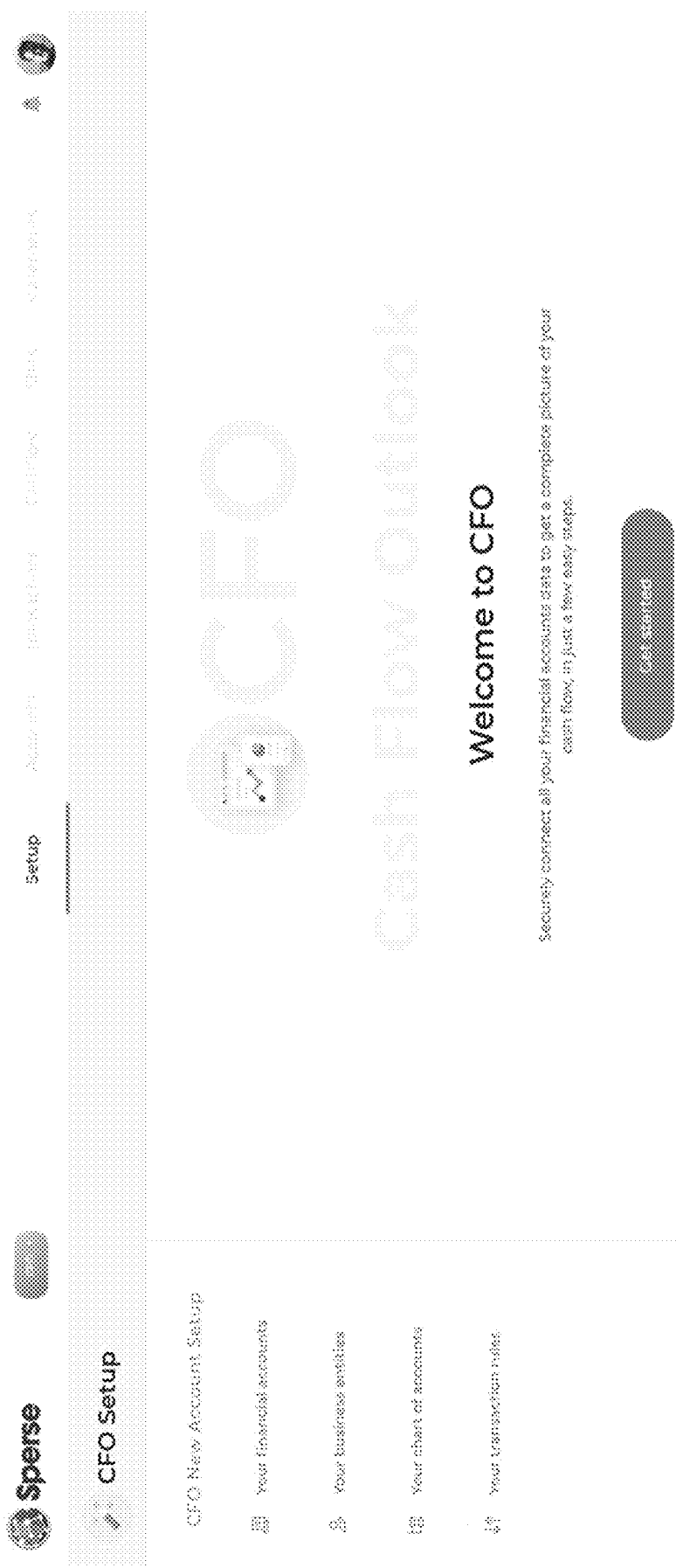
FIG. 11 shows a setup screen presented to a user of the software application of FIG. 10, according to one embodiment.

FIG. 11 shows a setup screen presented to a user of the software application of FIG. 10, according to one embodiment. In one example, setup configuration data is stored as part of user data 129.

Figure 12:
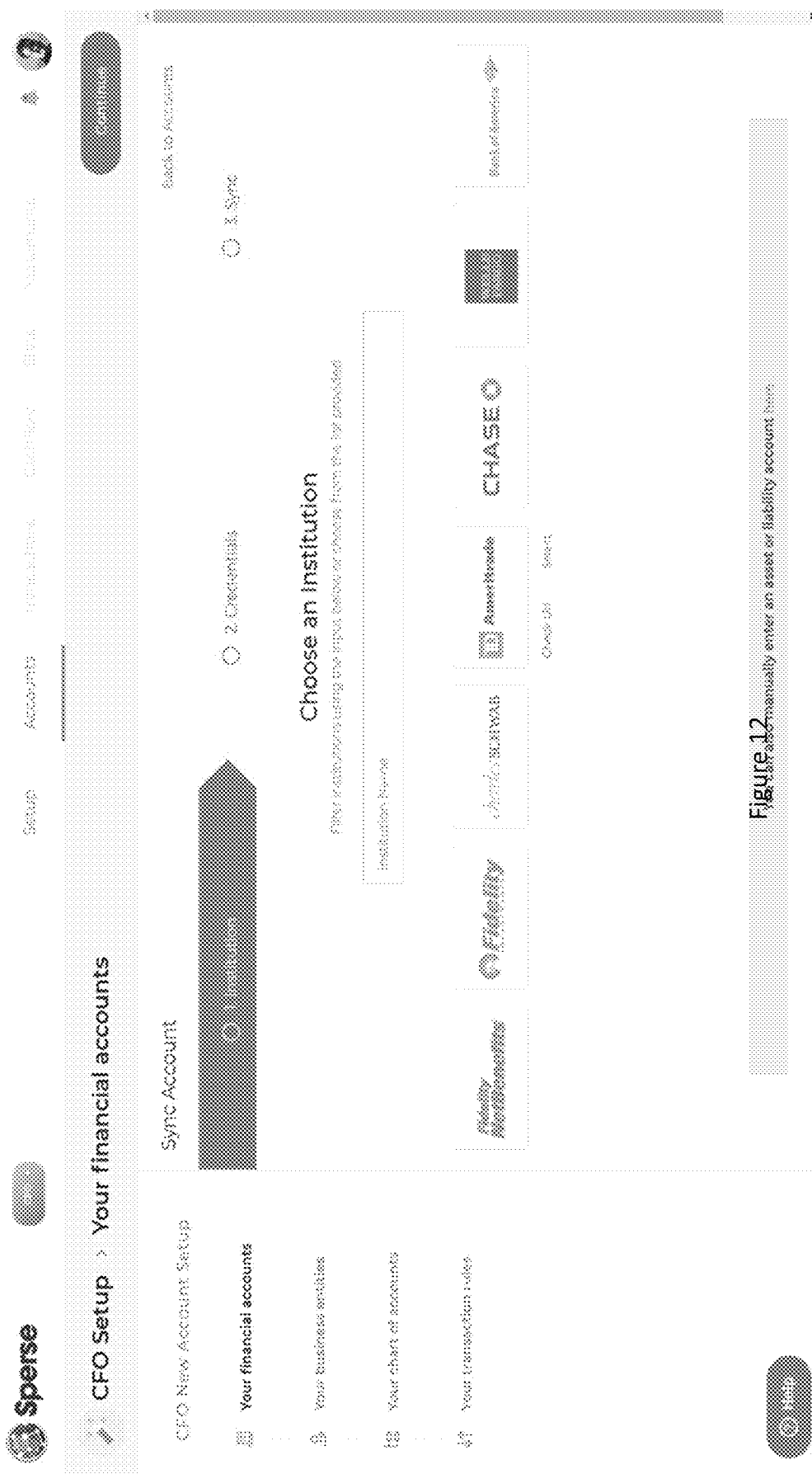
FIG. 12 shows selection of a financial institution for adding an account, according to one embodiment.
Figure 13:
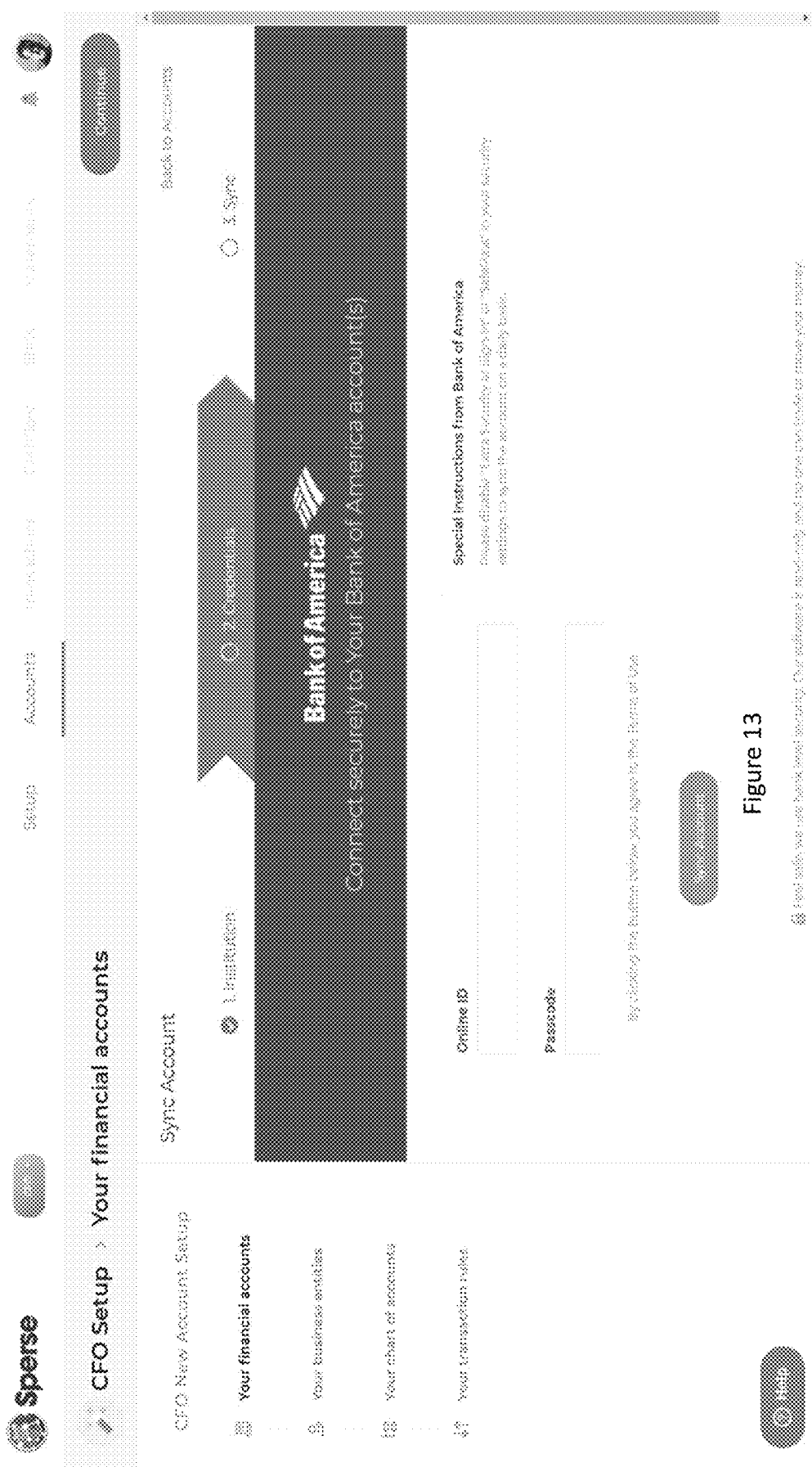
FIGS. 13-18 show connecting over a network to one or more selected financial institutions, according to one embodiment.
Figure 14:
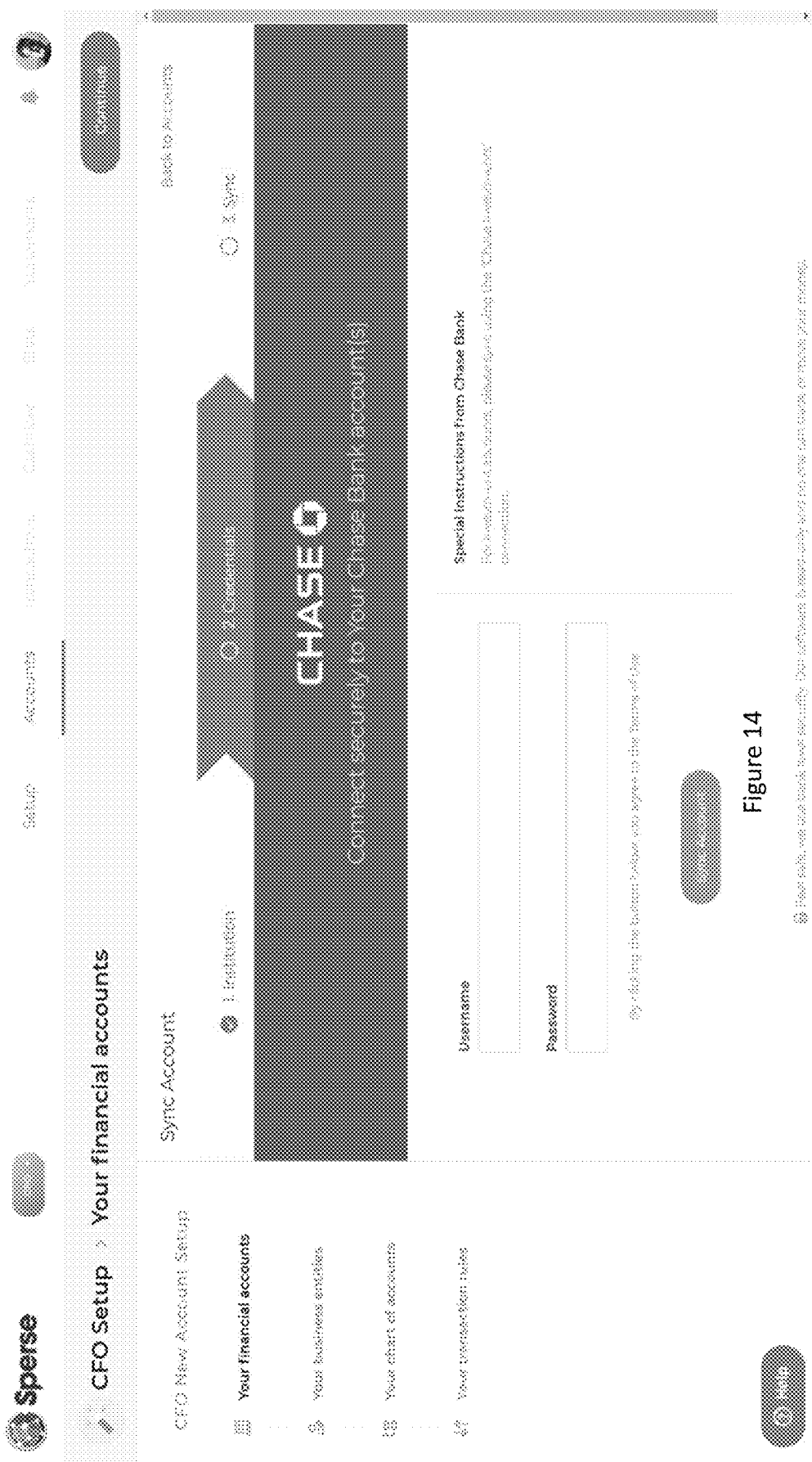
Figure 15:
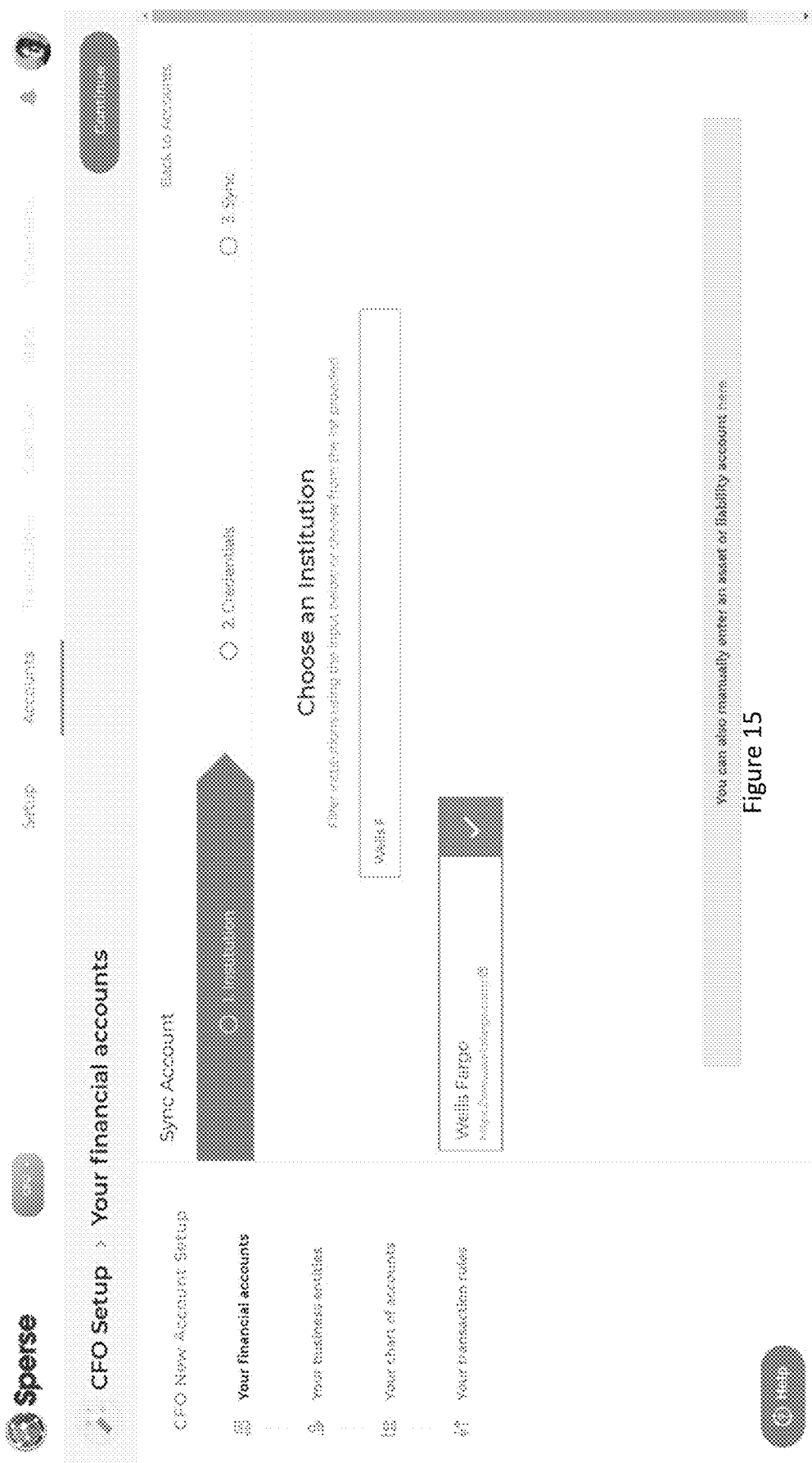
Figure 16:
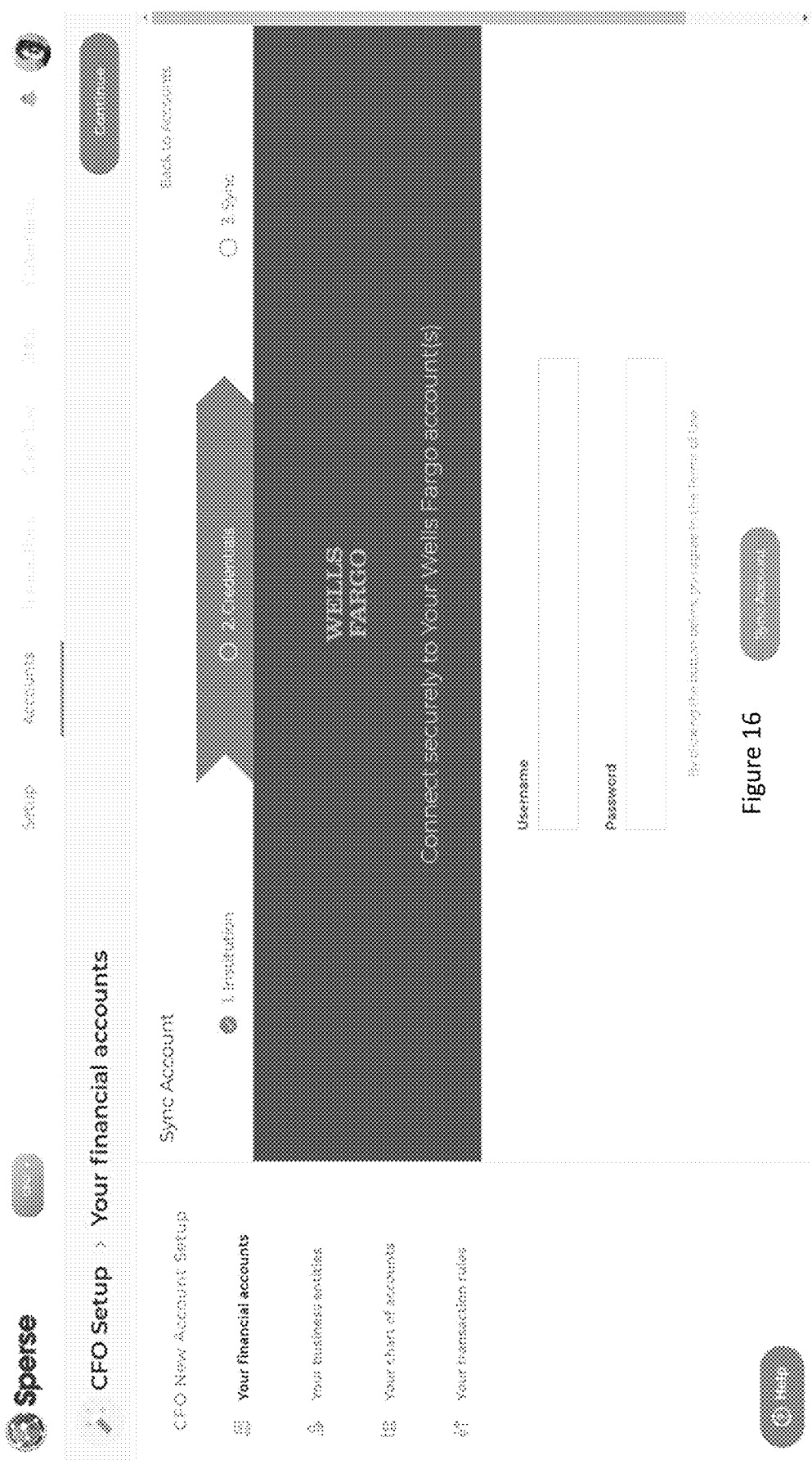
Figure 17:
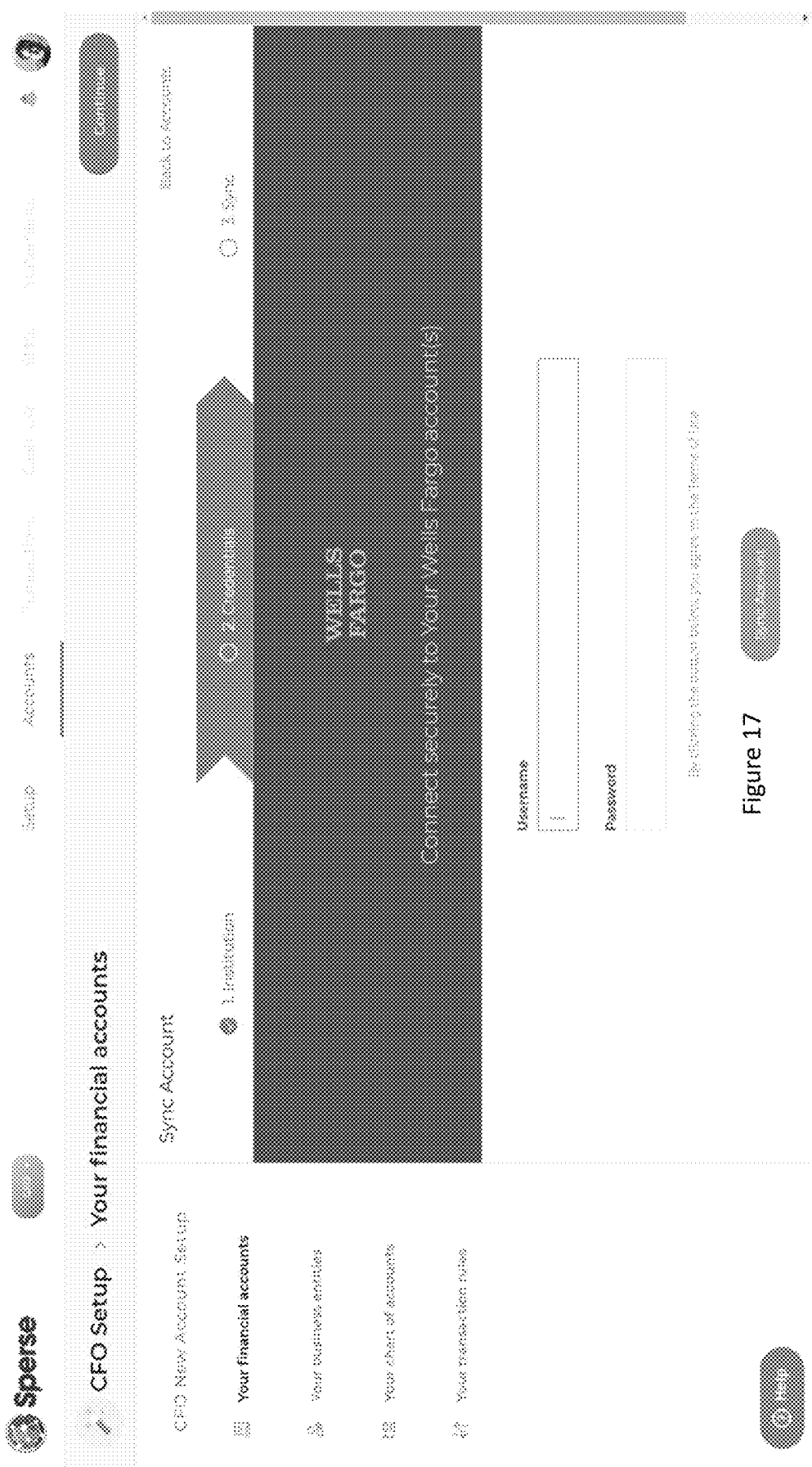
Figure 18:
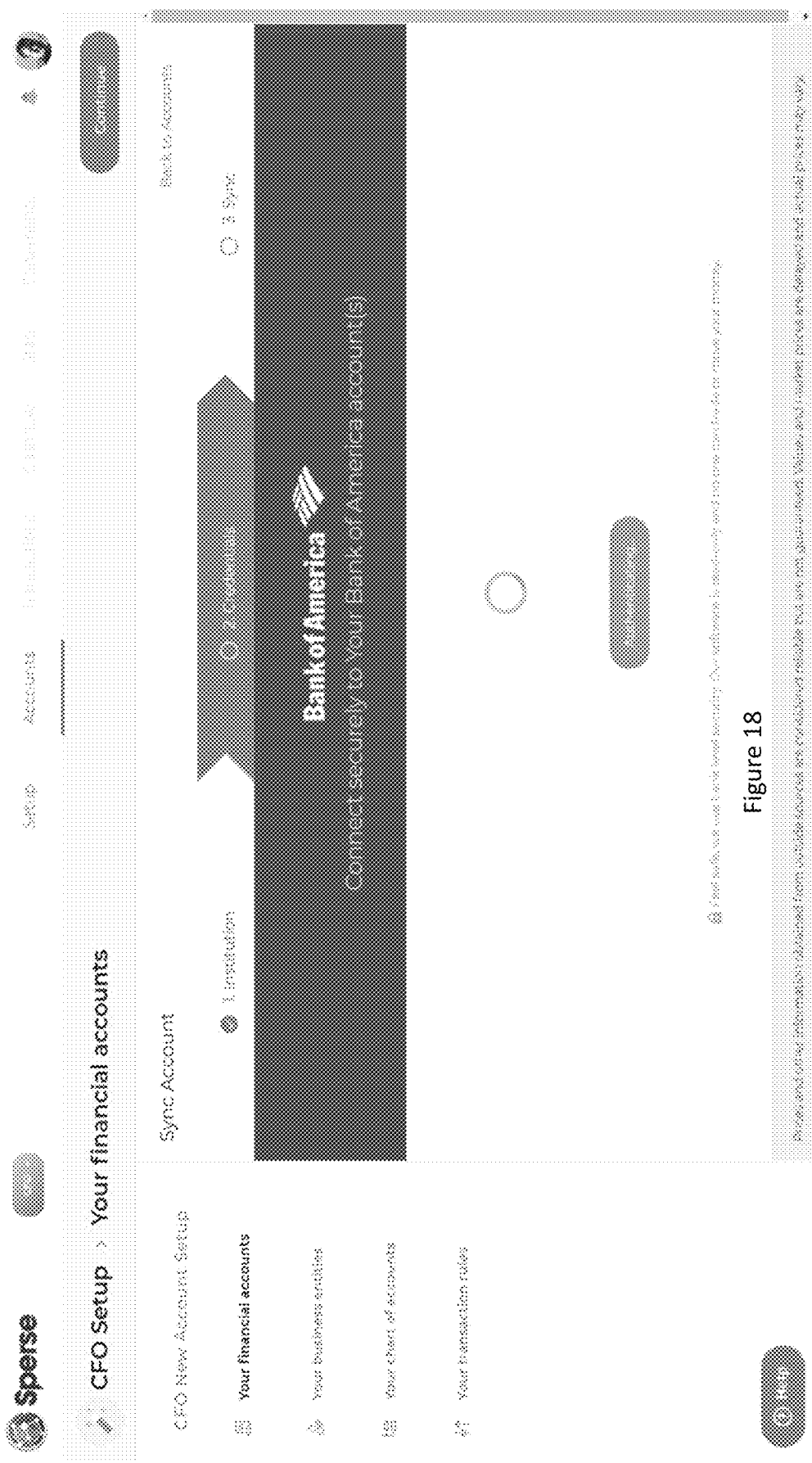

FIG. 12 shows selection of a financial institution for adding an account, according to one embodiment. For example, the financial institution can be selected from one of several entries presented in a user interface on user terminal 145.

FIGS. 13-18 show connecting over a network to one or more selected financial institutions, according to one embodiment. For example, the user can provide input in a user interface of client software on user terminal 145 that causes server 123 to establish a connection with bank server 125 and/or other servers.

Figure 19:
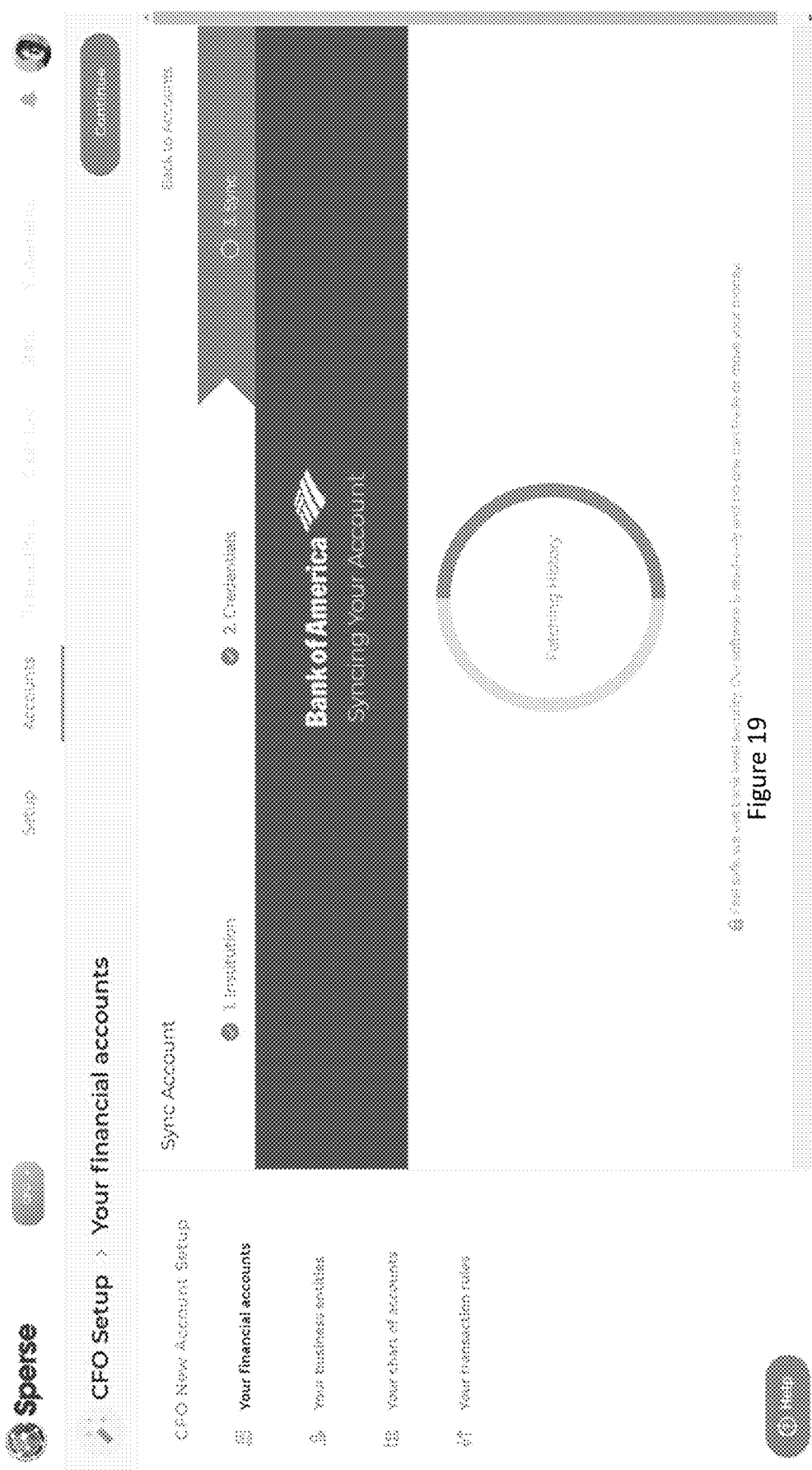
FIG. 19 shows fetching of the transaction history for an account at a selected financial institution, according to one embodiment.

FIG. 19 shows fetching of the transaction history for an account at a selected financial institution, according to one embodiment. For example, the extent of progress made in obtaining financial data can be indicated by a graphical image displayed to the user.

Figure 20:
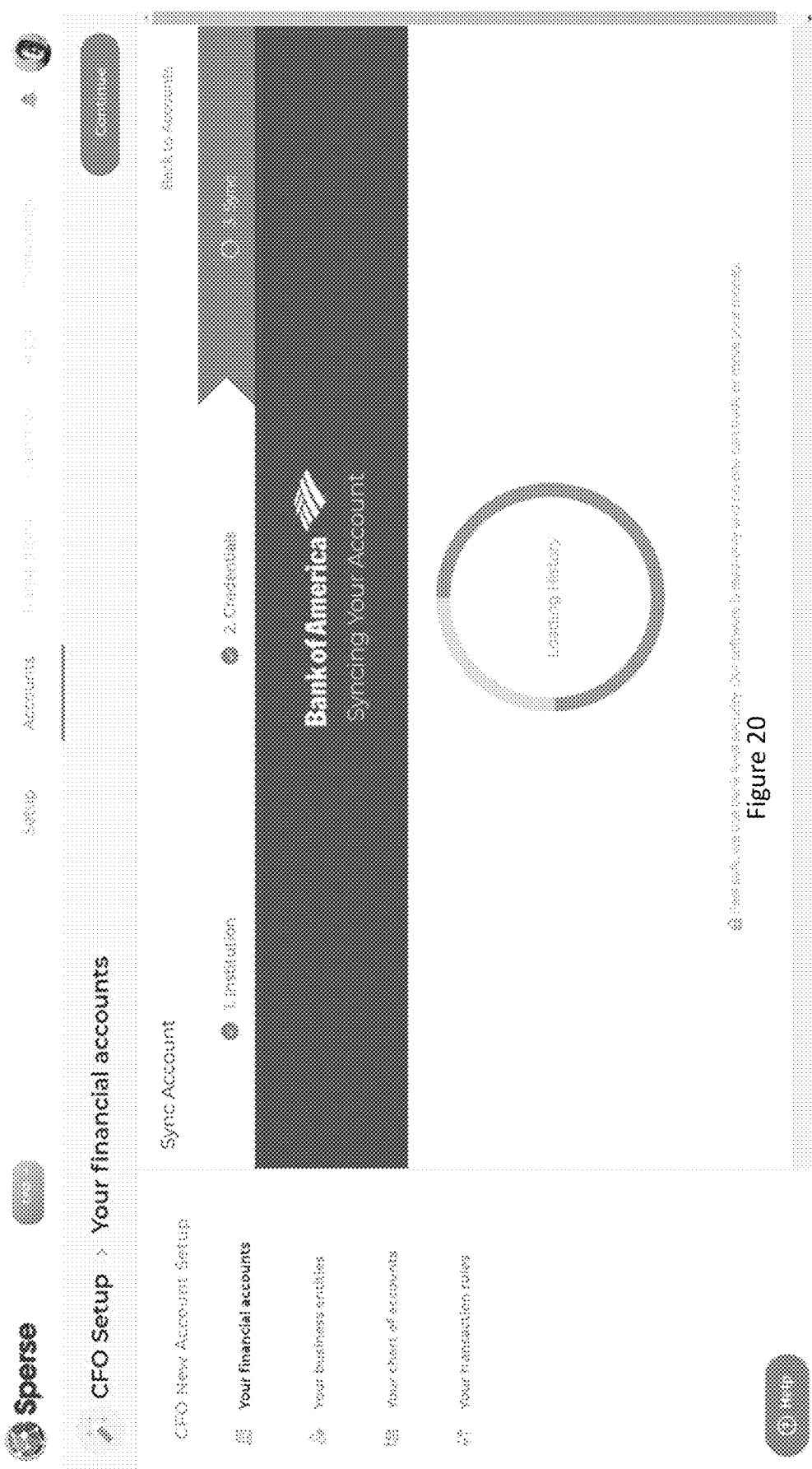
FIG. 20 shows loading the transaction history for the account of FIG. 19, according to one embodiment.

FIG. 20 shows loading the transaction history for the account of FIG. 19, according to one embodiment. For example, the extent of progress made in processing financial data can be indicated by a graphical image displayed to the user.

In one embodiment, data is pulled directly from financial institution accounts using the financial institution data sources; transactions values and balances are received directly from financial accounts stored in the data sources; and, the server includes import and auto-sync functionality with the servers of one or more institutions.

In one embodiment, financial and transactional data can be imported into the system in at least two ways including: a) by connecting to the data sources of the financial institutions either using a direct account integration, or through an intermediary service provider or accounting software that can either authenticate and connect the user to the financial institution, or provide the transactional data that the system pulled from the financial institution; and, b) by the user being able to manually import transaction data using static statement file upload functionality.

In one embodiment, the system aggregates multiple financial accounts for business or personal entities to be connected and linked together to perform financial reporting and analysis for separate or combined entities.

In one embodiment, the system maintains a separate parser for the statement schema format of each provider of data. If a new statement schema format is encountered, the system (e.g., server 123) creates a new schema and mapping automatically that can be modified in response to user input. For example, the new schema format can be stored in memory accessible by server 123.

Figure 21:
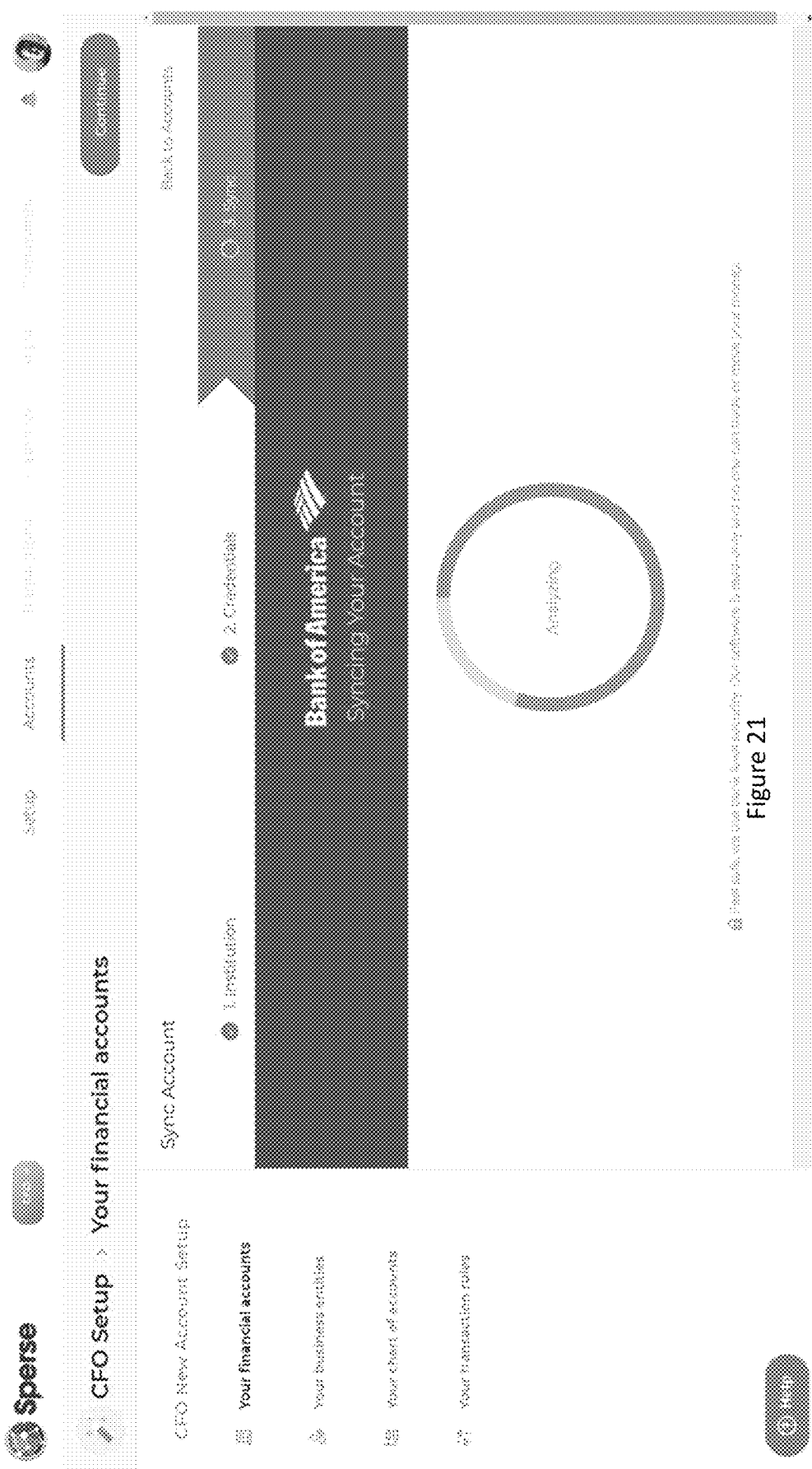
FIG. 21 shows analyzing for the account of FIG. 19, according to one embodiment.

FIG. 21 shows analyzing for the account of FIG. 19, according to one embodiment. For example, the account can correspond to data stored on server 127. The data can be analyzed using rules database 151.

Figure 22:
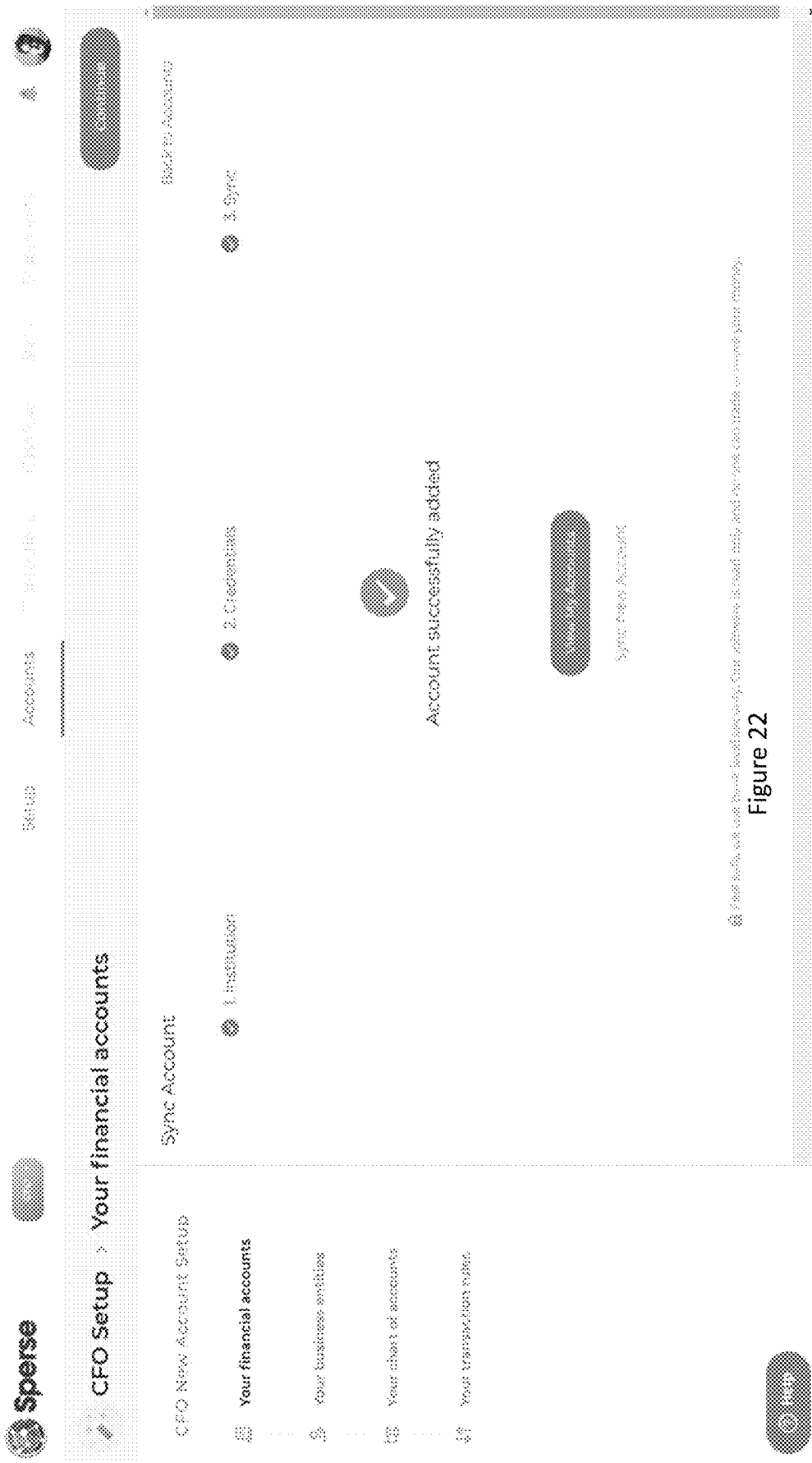
FIG. 22 shows a confirmation provided to a user indicating successful account addition, according to one embodiment.

FIG. 22 shows a confirmation provided to a user indicating successful account addition, according to one embodiment.

Figure 23:
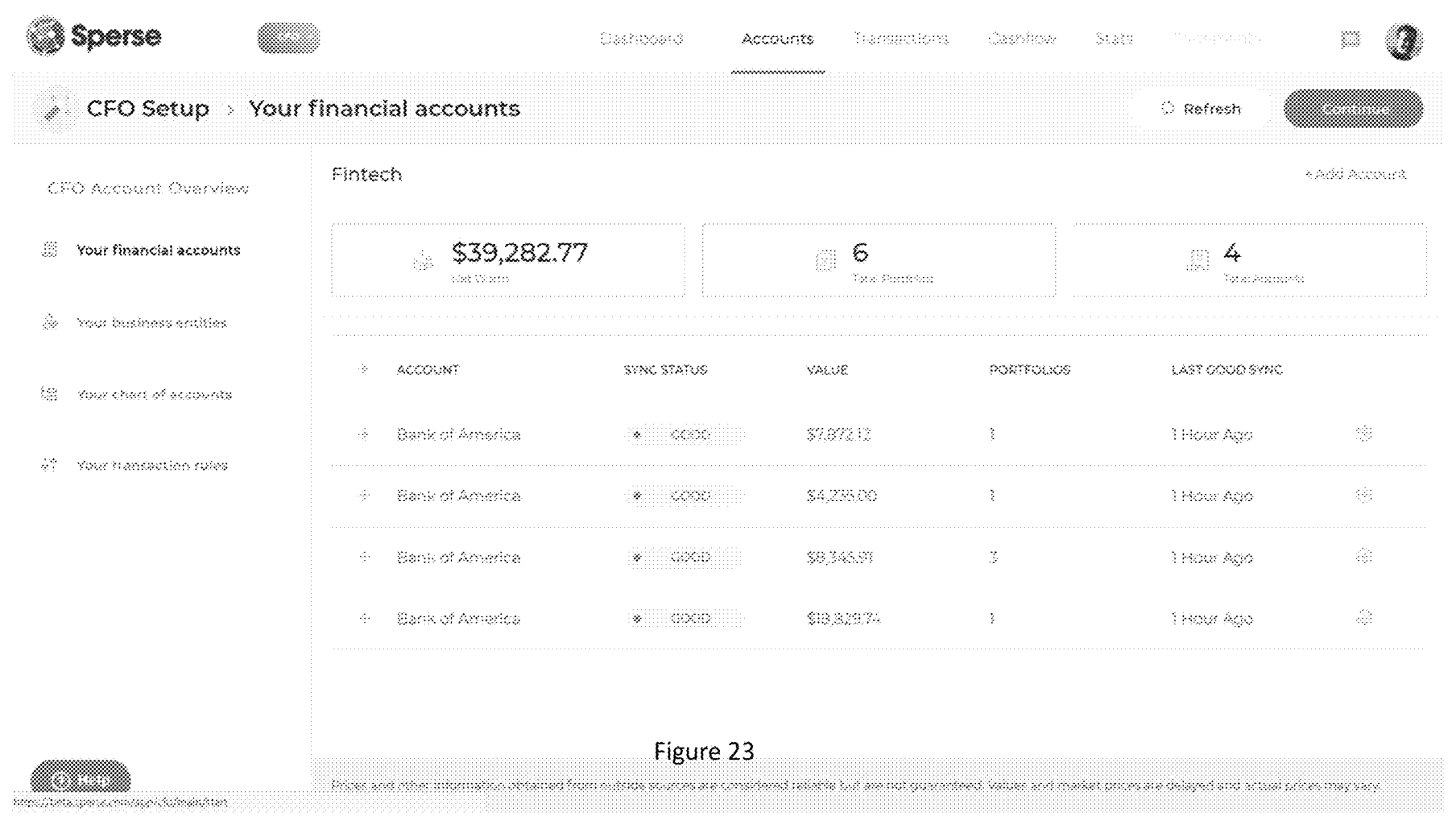

FIG. 23 shows a listing of accounts provided to user, according to one embodiment.

Figure 24:
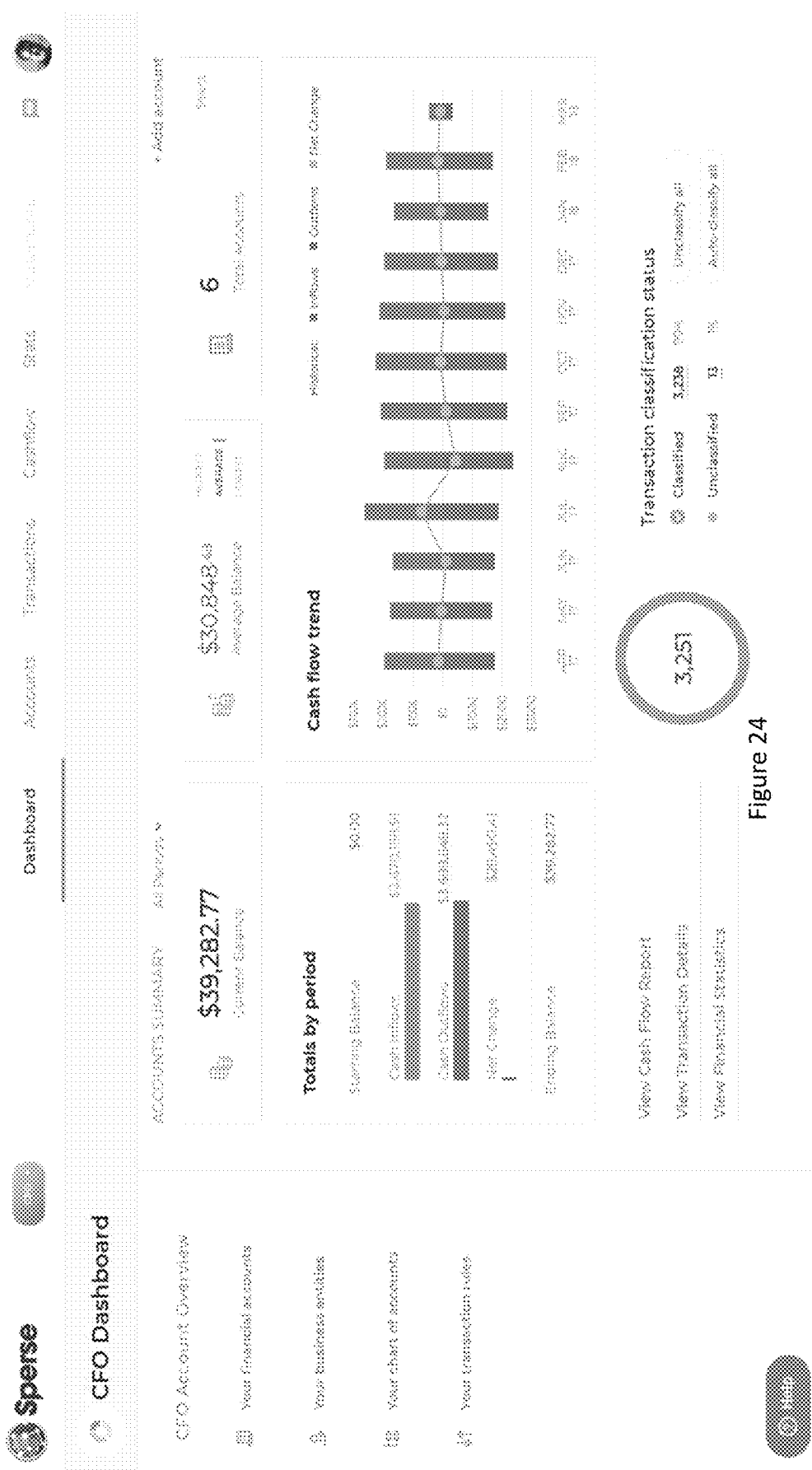
FIG. 24 shows a dashboard displayed to a user that presents cash inflows, cash outflows, a cash flow trend, and/or a transaction classification status, according to one embodiment.

FIG. 24 shows a dashboard displayed to a user that presents cash inflows, cash outflows, a cash flow trend, and/or a transaction classification status, according to one embodiment. In one example, the dashboard is dashboard 802 of FIG. 8 and is displayed in window 804 of user interface 806.

Figure 25:
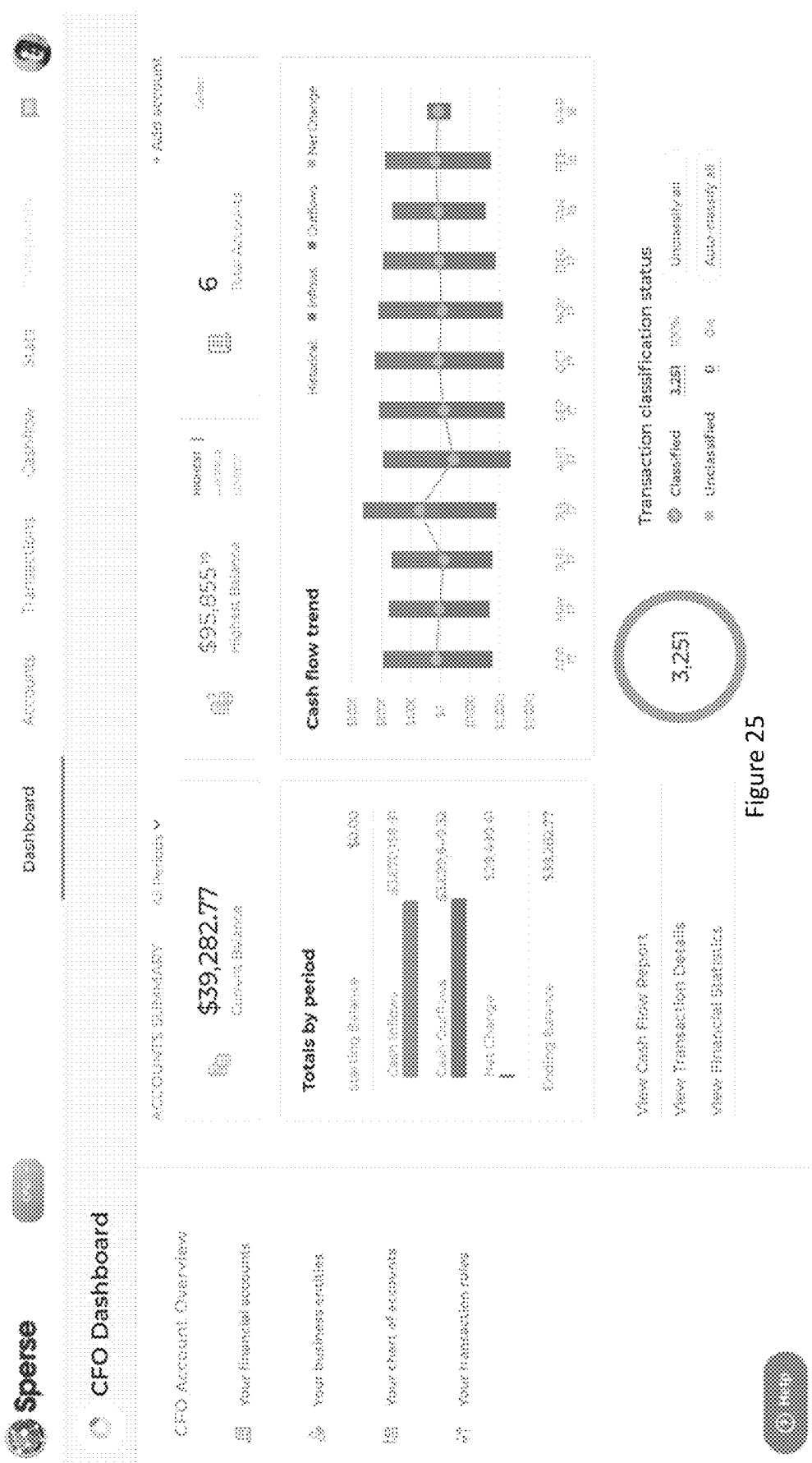
FIG. 25 shows the dashboard of FIG. 24, which presents an updated transaction classification status, according to one embodiment.

FIG. 25 shows the dashboard of FIG. 24 that presents an updated transaction classification status, according to one embodiment. For example, transactions can be classified using rules stored in rules database 151.

Figure 26:
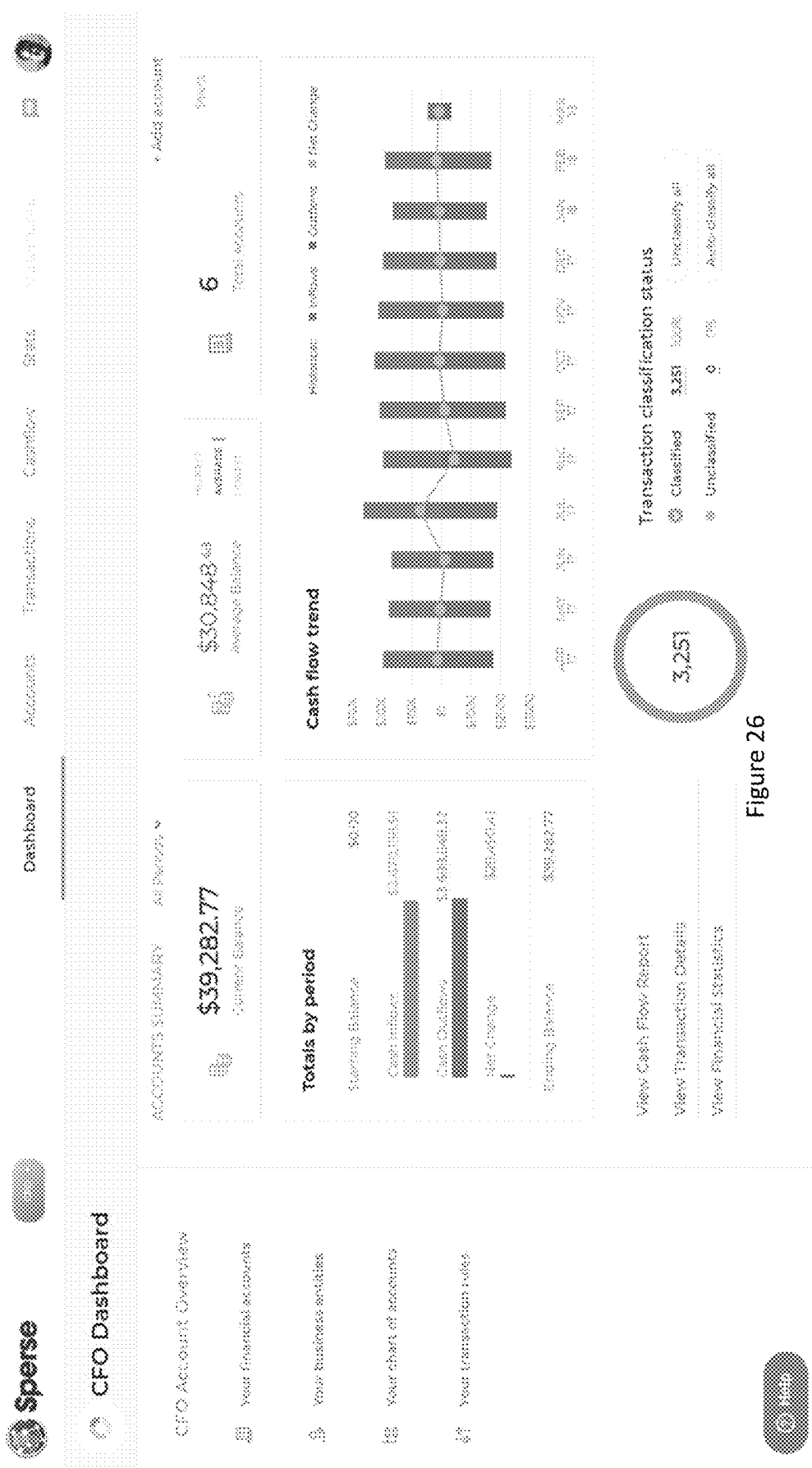
FIG. 26 shows a dashboard, according to one embodiment.

FIG. 26 shows a dashboard, according to one embodiment. For example, the dashboard is 802.

Figure 27:
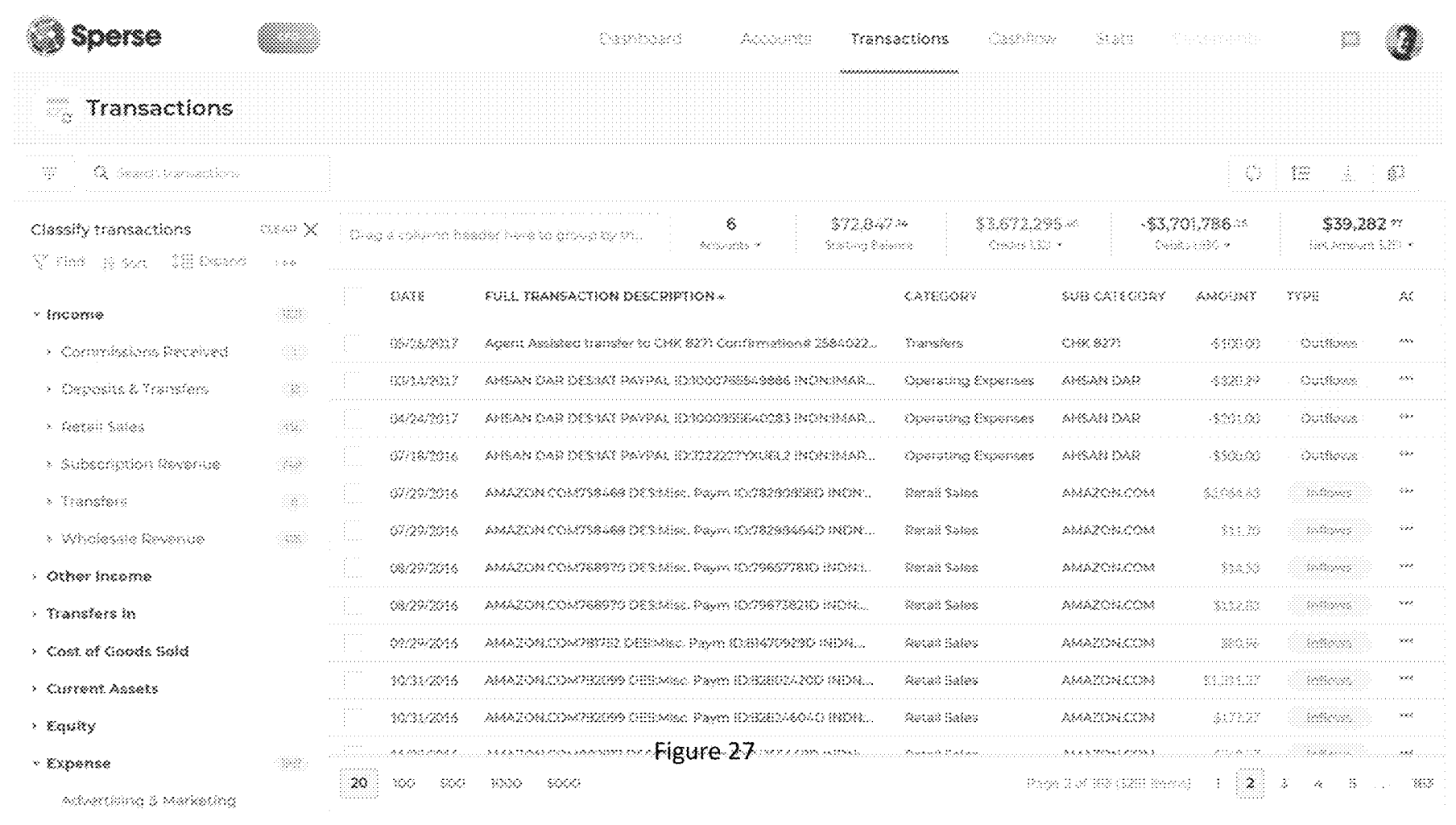
Figure 28:
Figure 34:
Figure 35:
Figure 40:

FIGS. 27-28 show listings of transactions presented in a user interface of a computing device for which transactions can be classified, according to one embodiment. For example, the user interface is user interface 806.

In one embodiment, a categories methodology for classification of transactions (e.g., based on historical data categorization and classification rules) can be used. In one example, transaction descriptions are parsed into recognizable words by the server (e.g., server 123). Descriptions, amounts, and/or date/time stamps are used to recognize strings and/or sets of patterns, and/or expense or income groupings by the system. For example, sets of word patterns for received transactions can be assigned to a predefined chart of accounts (e.g., of a user). If no chart of account category exists, a new classification can be created or a new chart of account table can be provided to the user, who can manually override the chart of account by editing and grouping accounts.

In one embodiment, each time the system encounters a new word pattern in a descriptor or in transaction information, the system automatically creates a new rule to apply in the future. Certain transactions can have more than one classification and the system uses a method to split the transactions into two or more sub-transactions.

In one embodiment, once the system recognizes a rule to determine the classification, the system looks up another internal data source that stores and defines a more recognizable descriptor (e.g., to show on reports provided to the user). The recognizable descriptor may differ from what is shown on the transactional data. For example "SW AIR TX" in the descriptor may be shown as "Southwest Airlines".

In one embodiment, a relationship is maintained between dual chart of accounts and cash flow. The system can use a dual chart of account hierarchical structure. One is for financial reporting, and another is used for presentation of a cash flow forecasting model. The two hierarchical models can be connected to each other using unique tracking identifiers between the two structures.

In one embodiment, transaction classification rules are applied in a hierarchical order with the user-defined rule having the highest priority. The user can change the transaction descriptions and classifications to override any system defined rule.

In one embodiment, the system automatically organizes the financial historical data into categories and sub categories; organizes the financial historical data as income and expenses; reconciles the balances with the balances of all the linked financial accounts; and/or updates future rolling forecasts based on any changes to the actual transaction amounts. The system provides the analysis to a user client device that displays both historical and forecast figures along with starting balances, ending balances, and reconciliation differences on the same view. The information for actuals and forecasted values can be grouped to be shown in daily, weekly, monthly, quarterly or annual columns with heterogeneous columns of differing lengths of time. The view for a user can be, but is not limited to, a table, graph, or chart.

Figure 29:
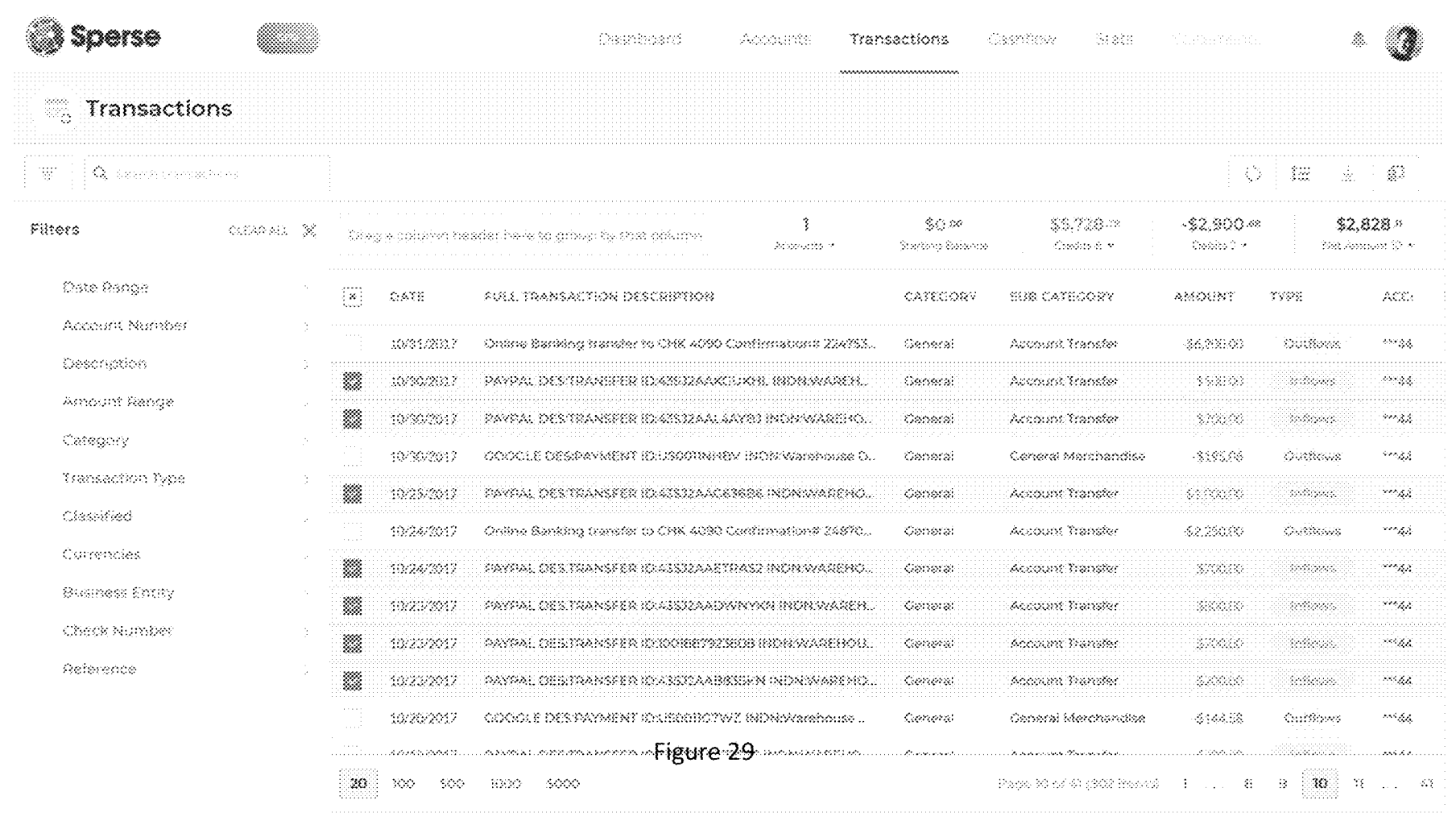

FIG. 29 shows a listing of transactions for which filters can be applied, according to one embodiment. For example, the filters can include date range, account number, category, transaction type, etc.

Figure 30:
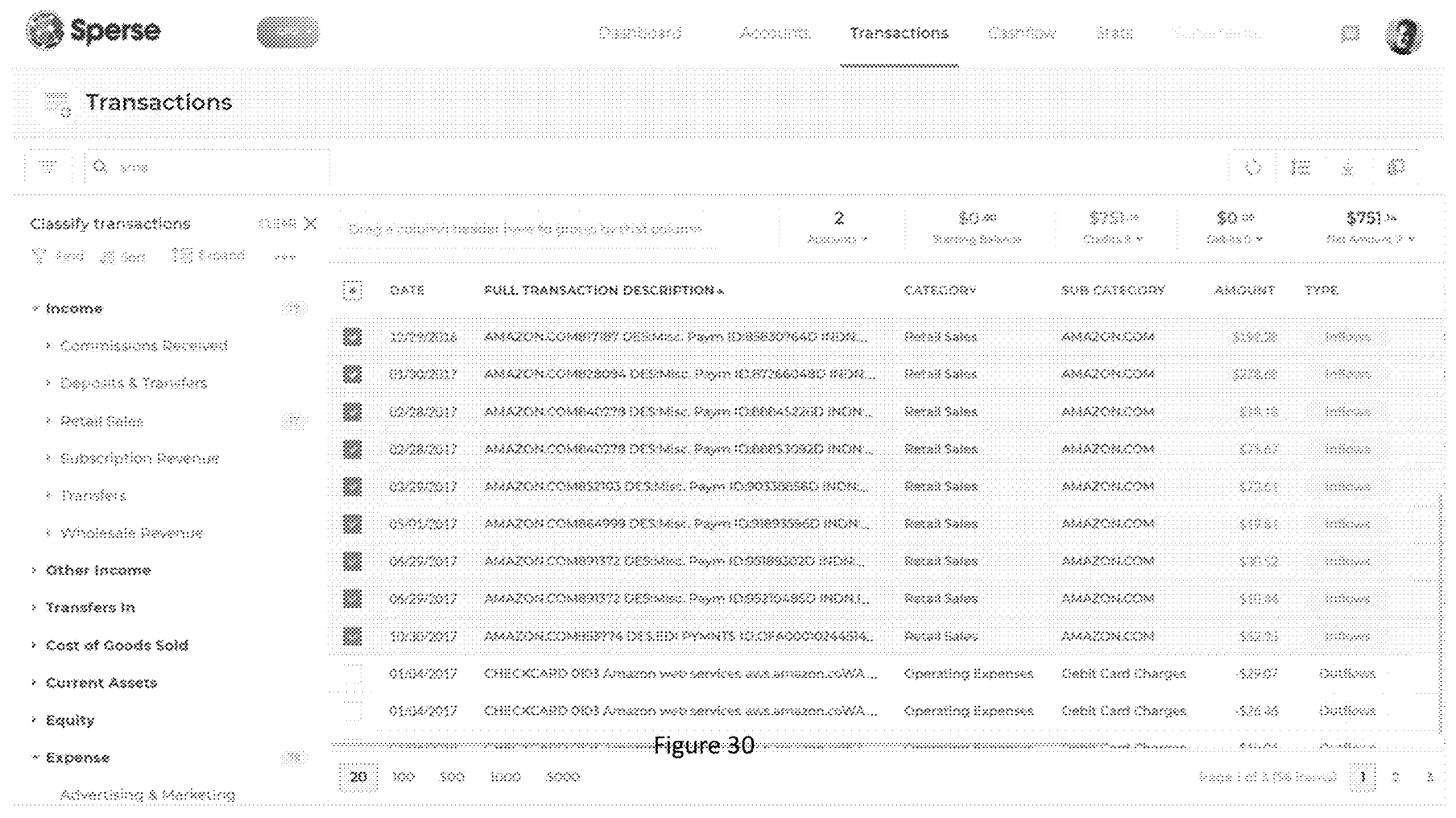
Figure 31:
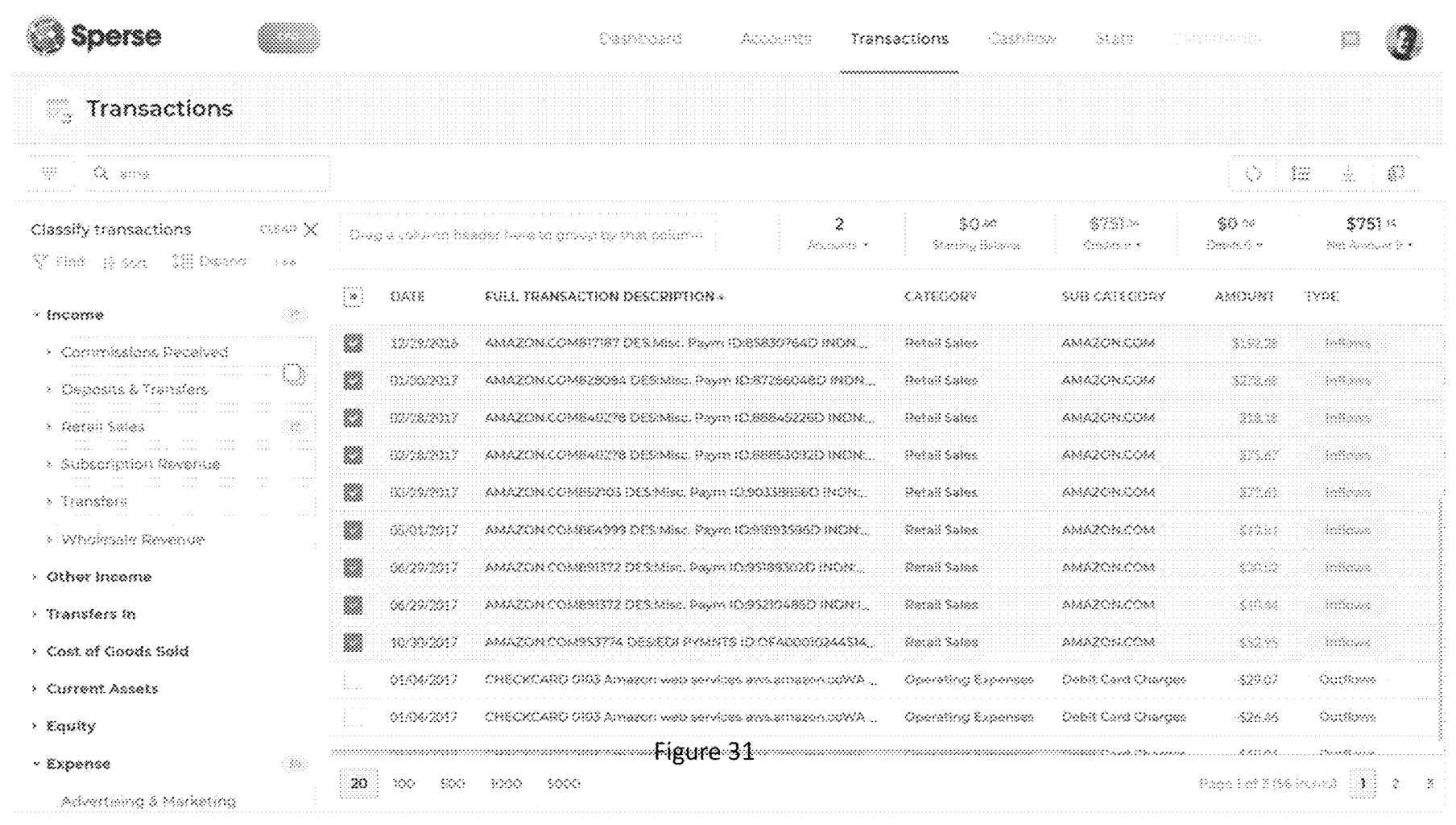
Figure 32:
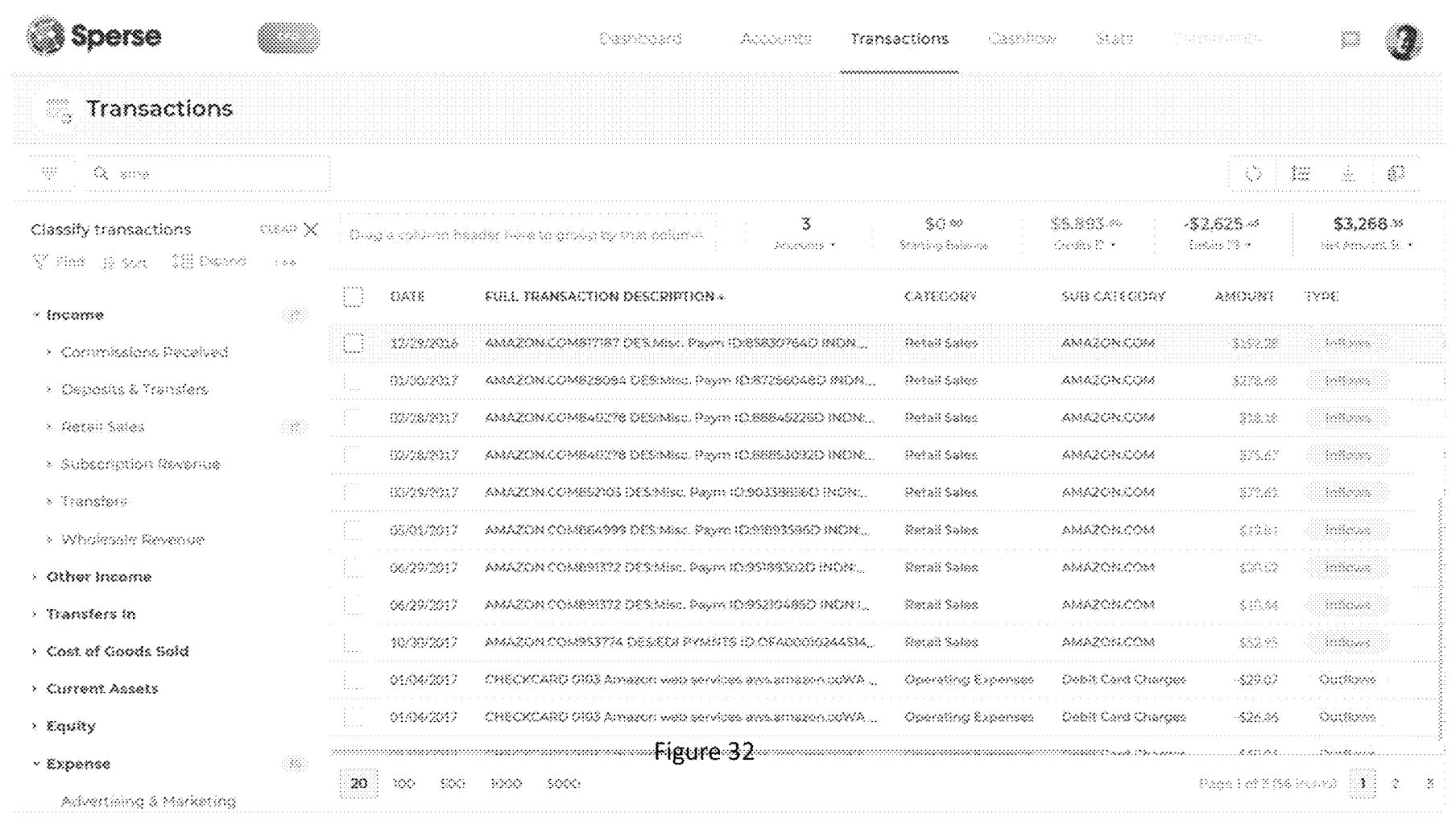

FIGS. 30-32 show listings of transactions, according to one embodiment. For example, a listing of transactions can be displayed to the user. Each transaction is displayed along with the corresponding category and sub-category.

Figure 33:
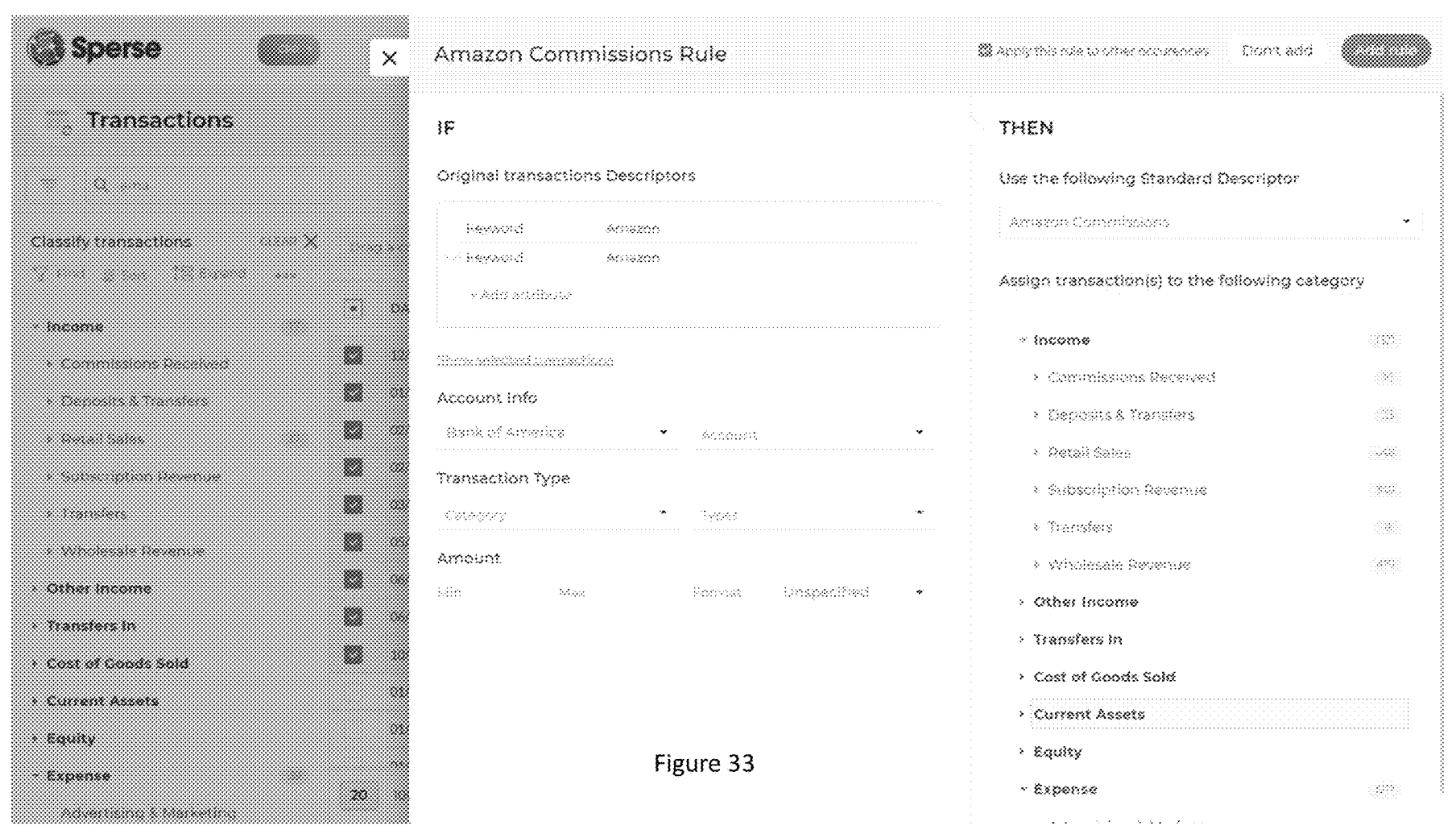

FIG. 33 shows applying a rule to transaction data received from a server of a financial institution, according to one embodiment. In one embodiment, artificial intelligence (AI)/machine self-learning rules are used for transaction classification (e.g., by word pattern(s) parsing).

The system can use a model to train its machine learning system to recognize new word patterns. The system then learns to parse the transaction descriptions and categorizations from partial strings that the system encounters. The system uses samples from historical data to determine how a user or set of users have previously defined a transaction and applies similar patterns to identify new strings to create new classification rules, maps, and schemas (e.g., stored in a database accessible by server 123). The rules are defined and applied at an individual user level and/or learned from other users of the system. A user can overwrite any system generated pattern rules with manually defined classification rules.

FIGS. 34-41 show cash flow reports presented to a user of the software application of FIG. 10 including listed cash inflows, listed cash outflows, and corresponding cash balances for various time periods, according to various embodiments.

Figure 42:
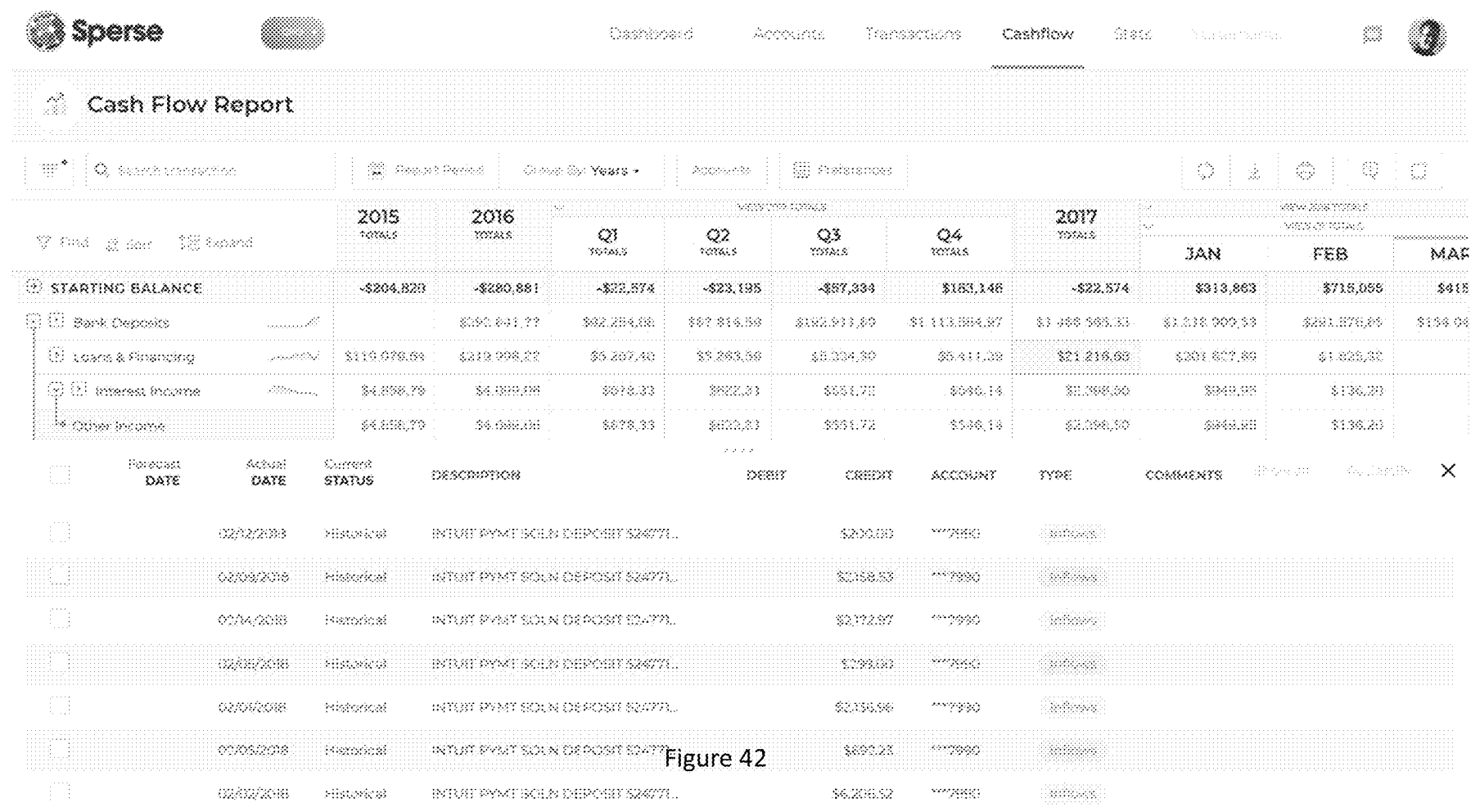

FIG. 42 shows a cash flow report along with historical transaction data corresponding to a cash balance entry selected by a user in a user interface, according to one embodiment.

Figure 43:
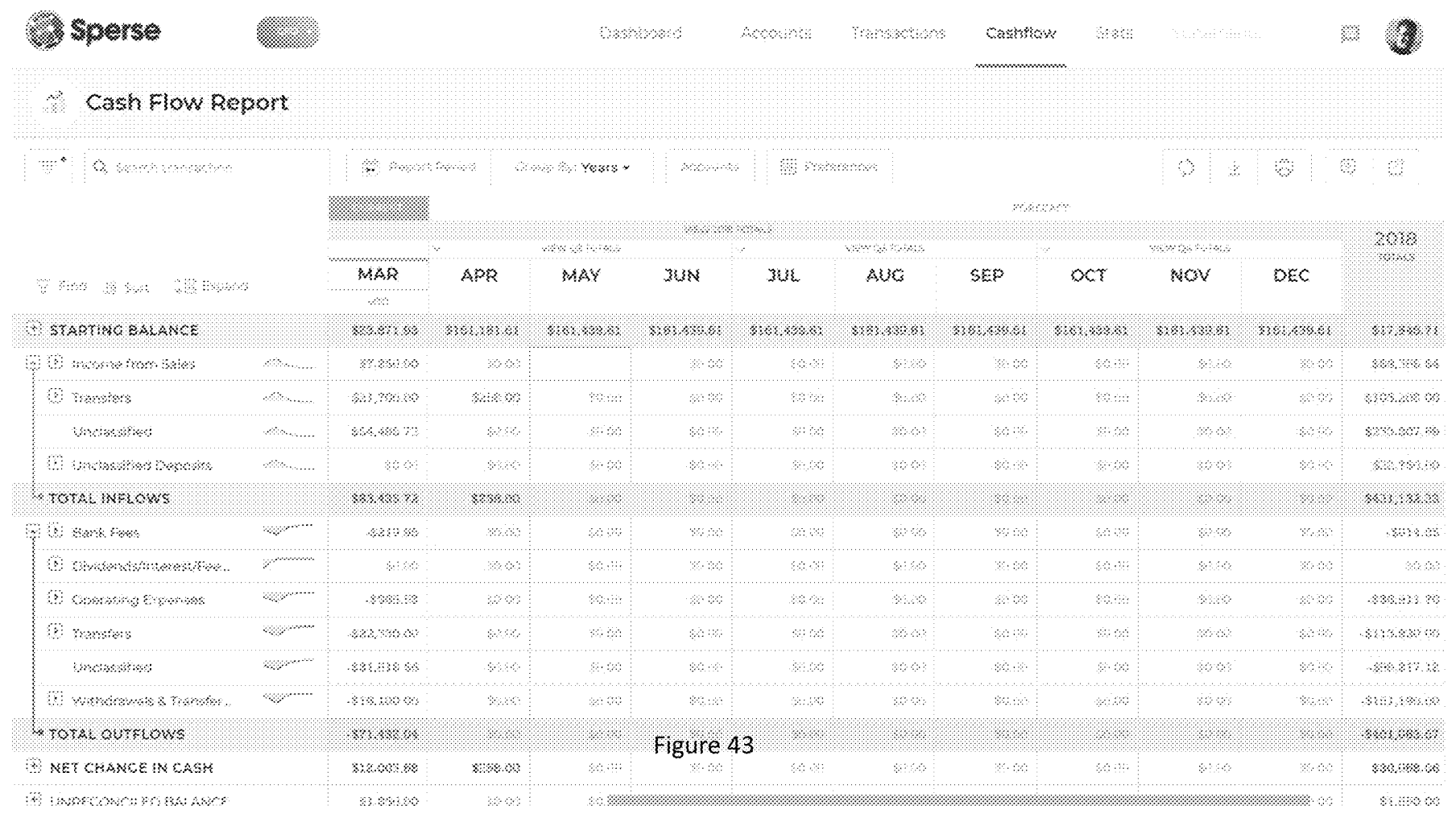
Figure 44:
Figure 45:

FIGS. 43-45 show cash flow reports presented to a user of the software application of FIG. 10, according to various embodiments.

Figure 46:
FIGS. 46-47 show cash flow reports including a corresponding recurring schedule of future payments, according to one embodiment.
Figure 47:
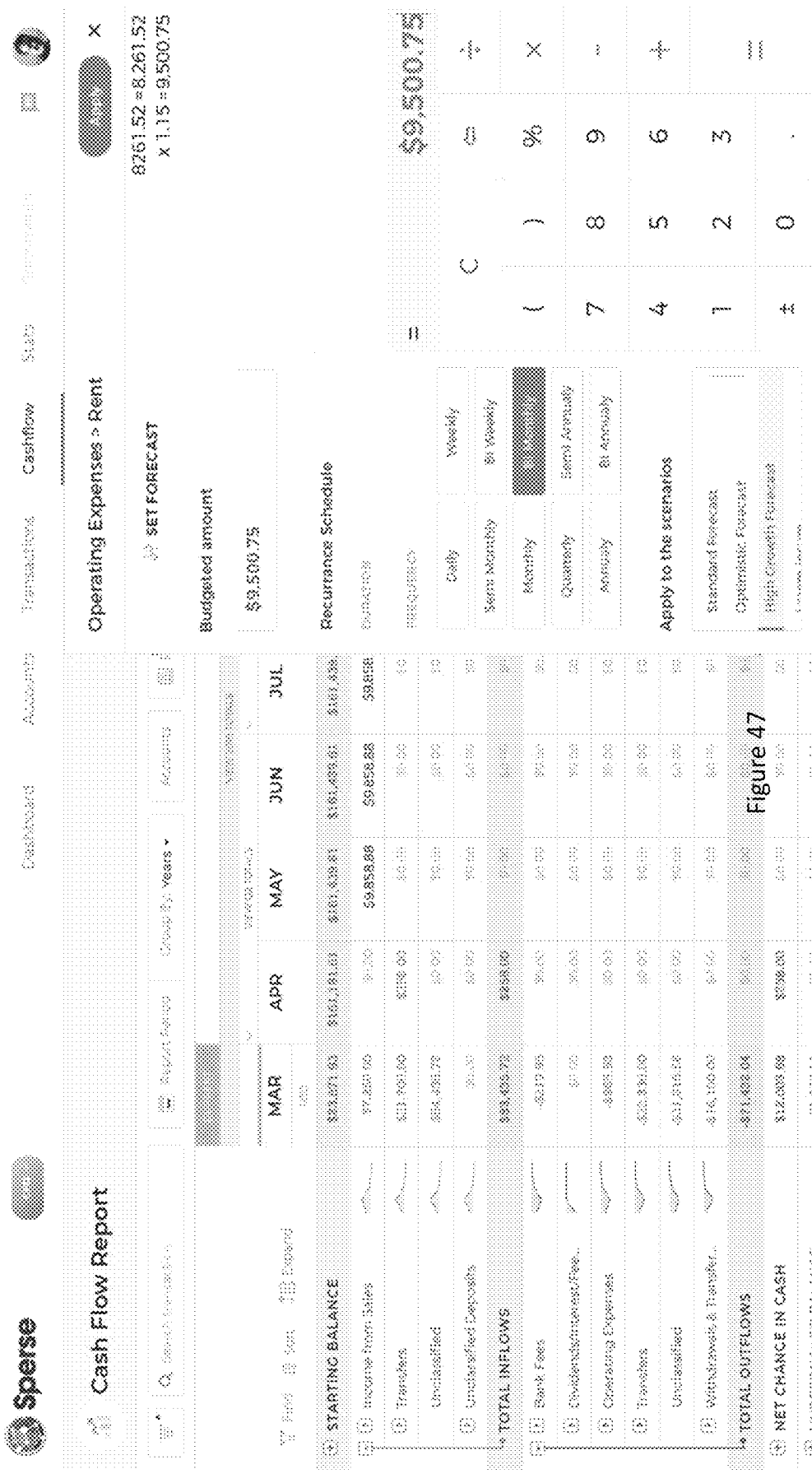

FIGS. 46-47 show cash flow reports including a corresponding recurring schedule of future payments, according to one embodiment. For example, a cash flow forecast that is generated for a user terminal can be based at least in part on the recurring schedule of future payments.

Figure 48:
FIG. 48 shows a cash flow report with a forecast including transaction entries corresponding to an account of a user, according to one embodiment.

FIG. 48 shows a cash flow report with the forecast including transaction entries corresponding to an account of a user, according to one embodiment.

FIG. 49 shows a cash flow report, according to one embodiment.

Figure 50:
FIGS. 50-51 show selection of filters applied to transaction data for presentation to a user, according to one embodiment.
Figure 51:
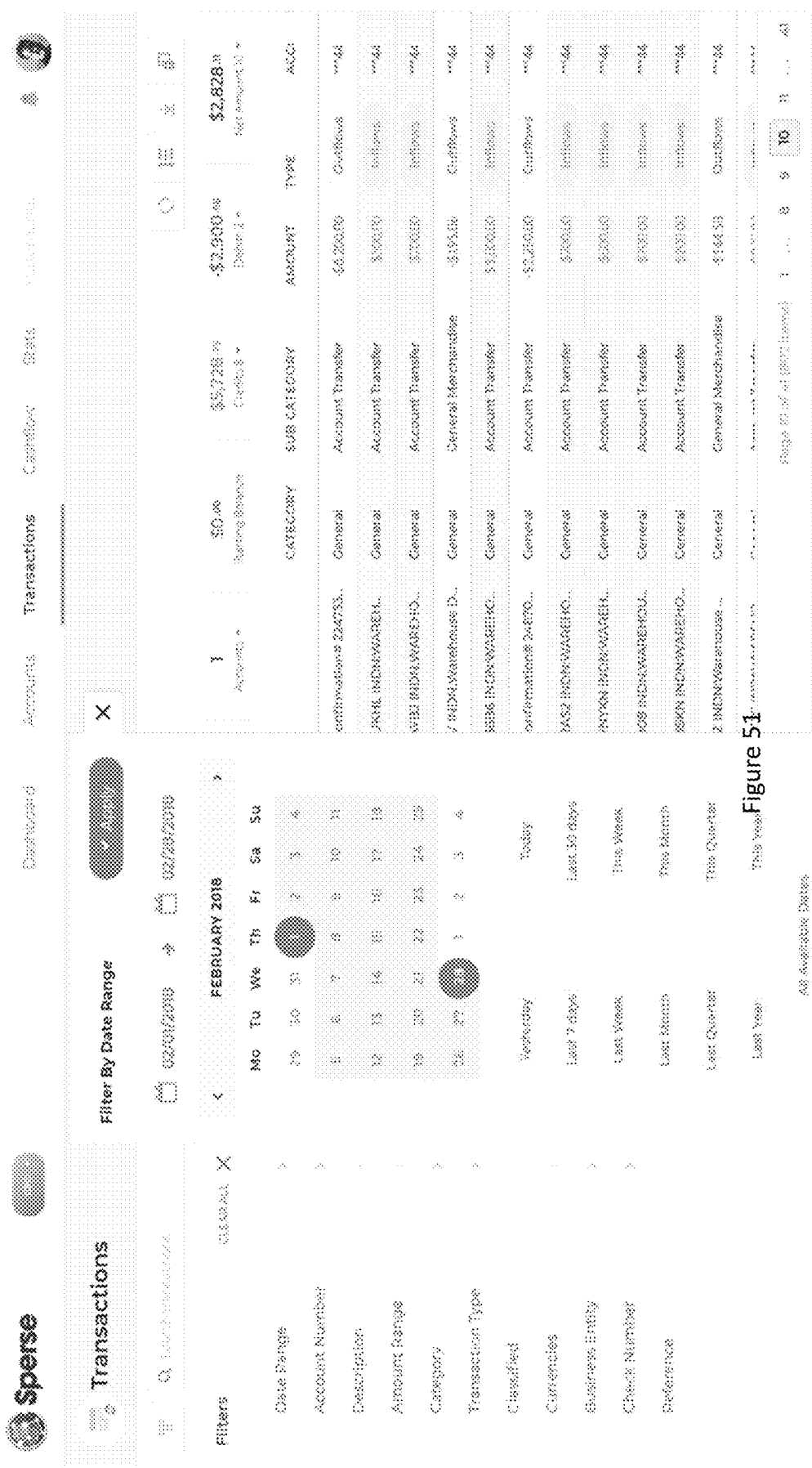

FIGS. 50-51 show selection of filters applied to transaction data for presentation to a user, according to one embodiment.

Figure 52:
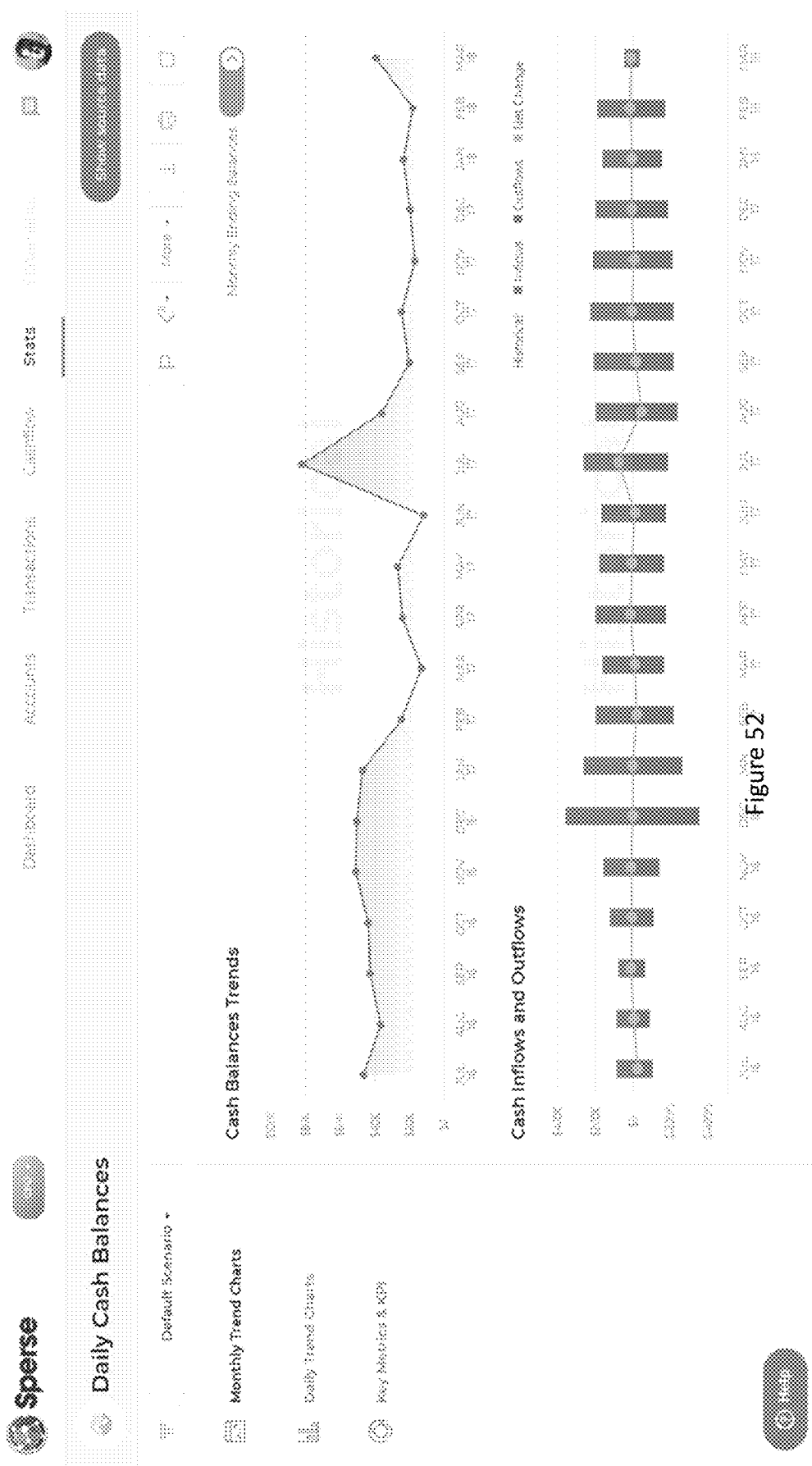
FIG. 52 shows a display of cash balance data including cash balance trends and corresponding cash inflows and outflows, according to one embodiment.

FIG. 52 shows a display of cash balance data including cash balance trends and corresponding cash inflows and outflows, according to one embodiment.

FIG. 53 shows receiving daily updates from various bank accounts of a user, according to one embodiment.

In one embodiment, additional transaction details can be obtained from another internal or external source. The system may recognize a transaction and be configured to connect to an external source to get additional detail about the transaction details and determine whether to split the original transaction into multiple sub transactions and add additional comments to the transactions that are matched and pulled from another data sources.

For example, if a cash transaction is recognized as "salary/wages" and an expense for a total of $54,650 is shown as a single expense transaction from the data source of the financial institution, the system can be configured to link to another source and pull the data for additional sub-transaction details about the specific transaction, which will then show the sub-transaction breakdown (e.g., as salaries of multiple employees).

In one embodiment, historical data processing avoids importing duplicate data (data verification). For example, when each new transaction is added, the transaction is converted to a unique hash code identifier and new records are compared against previous hash code identifiers to remove duplication. When data is imported from any other sources, transaction data is checked for duplication and excluded from import. Only distinct transactions are imported.

In one embodiment, both actuals and forecast data are connected and shown in the same view. For example, a historical view is connected with a forecast view; when the historical view changes, the forecast view correspondingly changes. Each view has selectable granularity (e.g., by day, week, month, quarter, and year).

In one embodiment, detection and separation of historically complete, pending and forecasted values in a given current period can be used. The current period (e.g., which may be a week, month, quarter or year) displays transactions for any days of the same period that have passed as historical data, and any remaining days of the same period, as forecasted values. The current period therefore, shows the values for historic amounts separately from transactions that are pending or forecasted for the remainder of the current period.

In one embodiment, a forecast value is recognized and replaced with historical data once a transaction is completed. The system recognizes if there are differences and similarities between a transaction that has successfully been completed, a transaction that is pending to complete, and a transaction that is a forecasted value in future. If the system recognizes a forecasted transaction has been successfully completed or is pending, the system adjusts the forecast by removing the value from future projection and shows the transaction as one of (i) a completed transaction of the current or a historical period, and (ii) a pending transaction of the current period.

In one embodiment, transaction and balance reconciliation with one or multiple data providers is used. The system gathers the financial transactional data and current ending balances from all linked financial accounts and compares them to the transactional data imported in the system. The ending balances for each financial account must reconcile accurately to the transactional data in the system. If there is any discrepancy in the balance reconciled, the user is alerted of the difference through, for example, a website screen presented on a user terminal, and/or by mobile notification messages.

In one embodiment, a sharable multiuser forecast versioning with commenting functionality is used. The system can maintain multiple versions of forecasting scenarios for each user. Using the same historical data, various versions of forecasts can be created and maintained by different users of the same business entity.

For example, a single company using the same underlying actuals has five different users with various user-defined scenarios, which results in several different forecast scenarios that can be selected by each of the different users. The scenarios created by one user can be shared with another user based on permissions assigned to each user. Users who have the permissions to do so, can enter comments to and/or part of the historical or forecasted values.

In one embodiment, alerts to a user mobile device (e.g., a smartphone) are used. The system looks for certain thresholds of change by calculation differences in any new information that occurs by comparing the new information to historical or forecasted information. If certain events meet the criteria to send notifications to the users, the system sends notifications using, for example, one more of an SMS message, a phone call, and an email through one or more wired networks, wireless networks, and the Internet to the user or users who have requested such alerts.

In one embodiment, integrated cash flow financing is used. The system recognizes that the expenses exceed incomes for certain periods of time. The system will determine the certain gaps that have such a shortfall and determine suitable financial recommendations such as financing options that would meet the needs of the business.

In one embodiment, the system is used for non-financial data. The forecasting model and processes used by the system (e.g., server 123) can be applied to non-financial data that includes actuals and user inputs of future values, such as for advertising budgets, operation of a manufacturing facility or production line, etc. For example, a marketing analysis includes actuals for a number of customers and user inputs for future numbers of customers. From this information, the system can forecast the number of customers and derive a marketing budget.

As another example, a concrete mixing company uses data stored in a data source that tracks the actual and future values of the amounts of raw materials used and the amounts of products created from the raw materials. The amounts of raw materials and products are forecasted, which are then used to adjust the mixing formulas, amounts of labor, and types of equipment that are used to create the product from the raw materials. The adjustments can be implemented as control signals to production computing devices (e.g., that control robotic manufacturing).

In one embodiment, multi-user preferences and multi-account user defined settings are used. The system is configurable for multiple users by specifying one or more of the following settings: multiple business entities or business units (e.g., a holding company and three subsidiaries); chart of accounts classifications (categories by which transactions are organized); financial institutions linked to each business entity; and/or users and data access permissions for each user.

In one embodiment, visibility controls, data encryption, and/or security options are used. The system can have multiple security features. The system level data is encrypted using a user-defined encryption key. Visibility to all reports is controlled by user-based permissions that can be limited to each user by one or more financial account permissions, row level permissions, and column level permissions. The permissions are assigned to each user by the administrative user who can assign permissions to other users.

In one embodiment, a change log and/or auto-save with multi-level undo can be used. The system maintains an audit log for every change to any transactional data tied to each user. The system will auto save changes made to the data and allow a user to undo or reverse multiple steps of up to, for example, 20 previous batch of changes saved to the audit log.

In one embodiment, multicurrency and combined currency support can be used. The reports generated by the system can be localized by different international regions and financial data can be presented for transactions grouped by individual currencies or separated by multiple currencies, or converted into a single currency using a daily currency conversion rate determined by user defined values or form a third-party currency price index.

Figure 55:
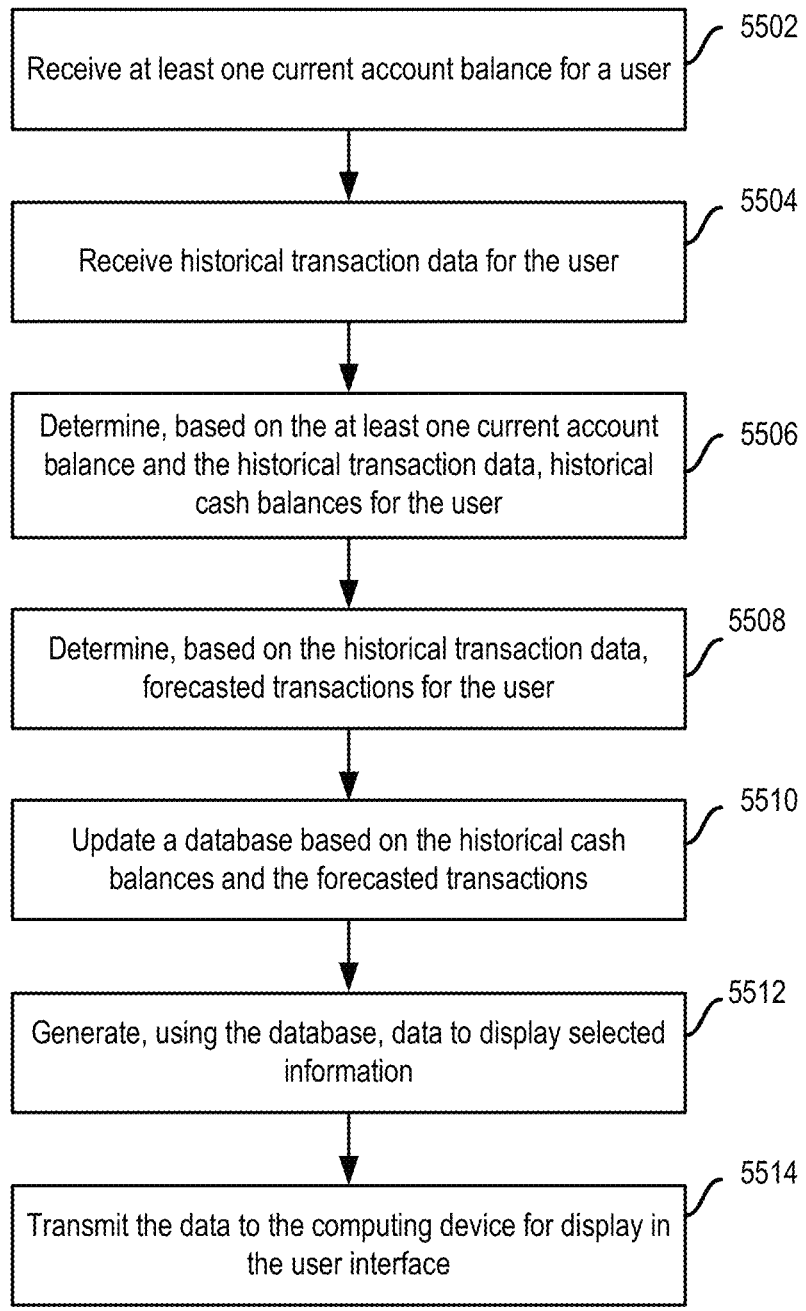
FIG. 55 shows a method to update a database based on historical cash balances and forecasted transactions, according to one embodiment.

FIG. 55 shows a method to update a database (e.g., cash flow database 153) based on historical cash balances and forecasted transactions, and to generate data using the database for transmission to a computing device, according to one embodiment. In block 5502, one or more current account balances for a user are received. For example, the account balances can be received by server 123.

In block 5504, historical transaction data for the user is received. For example, historical transaction data can be received by server 123 for an account of the user.

In block 5506, historical cash balances for the user are determined. This is based on one or more of the current account balances and the historical transaction data.

In block 5508, forecasted transactions for the user are determined. The forecasted transactions are based on the historical transaction data.

In block 5510, a database is updated based on the historical cash balances and the forecasted transactions. For example, cash flow database 153 can be updated by server 123.

In block 5512, data is generated using the updated database (e.g., generated by server 123). In block 5514, the generated data is transmitted to a computing device for display in a user interface (e.g., user interface 806). For example, the generated data can be transmitted to user terminal 145 for display to a user. In another example, the generated data can be transmitted to user terminal 808 for display in window 804. In one example, the generated data is dashboard 802.

In one embodiment, a method for displaying selected information in a user interface of a computing device includes: receiving, over a network from at least one server, at least one current account balance for a user of the computing device; receiving, over the network from the at least one server, historical transaction data for the user; determining, by at least one processor and based on the at least one current account balance and the historical transaction data, historical cash balances for the user; determining, by the at least one processor and based at least in part on the historical transaction data, forecasted transactions for the user; updating, by the at least one processor, at least one database, the updating based at least on the historical cash balances and the forecasted transactions; generating, using the at least one database, first data to display selected information; and transmitting, over the network, the first data to the computing device for display in the user interface.

In one embodiment, determining the historical cash balances for the user comprises calculating cash balances in reverse chronological order, and wherein calculating the cash balances starts with a current date of the at least one account balance.

In one embodiment, calculating the cash balances in reverse chronological order provides a starting cash balance, and the starting cash balance is for a date prior to the current date.

In one embodiment, the historical transaction data comprises debits and credits, and determining the historical cash balances for the user comprises calculating cash balances by applying, using an opposite sign, the debits and credits in reverse order.

In one embodiment, the method further comprises converting the forecasted transactions to historical transactions as additional historical transaction data is received from the at least one server.

In one embodiment, the method further comprises: determining whether a new transaction is a partial match to a forecasted transaction based on at least one of a source of historical transaction data for the new transaction or an amount of the new transaction; and in response to determining that the new transaction is a partial match to a forecasted transaction, converting a corresponding portion of the new transaction to a historical transaction.

In one embodiment, converting the forecasted transactions to historical transactions comprises recognizing a forecasted transaction has been completed or is pending, and updating the forecasted transaction in the at least one database as being a completed or pending transaction.

In one embodiment, the method further comprises, identifying word patterns in the historical transaction data, wherein converting the forecasted transactions to historical transactions is based at least in part on the identified word patterns.

In one embodiment, the method further comprises: updating, based on converting the forecasted transactions to historical transactions, the at least one database; generating, using the at least one database, updated data for display; and transmitting the updated data to the computing device for display in the user interface.

In one embodiment, converting the forecasted transactions to historical transactions is performed at least in part based on a computer model.

In one embodiment, the computer model uses machine learning to recognize at least one word pattern in the historical transaction data. Rules for performing the machine learning can be stored, for example, in rules database 151.

In one embodiment, the at least one database is updated by a first server that receives historical transaction data for other users, the computer model is based on rules, and the rules are learned at least from the other users.

In one embodiment, the method further comprises, in response to identifying a word pattern in a descriptor of the historical transaction data, automatically creating a new rule, wherein determining the forecasted transactions for the user is based at least in part on the new rule.

In one embodiment, determining the forecasted transactions is based on a set of rules using at least one of a priority level or a confidence level to determine each forecasted transaction.

In one embodiment, a first rule that is set by the user in the user interface has a higher confidence level than other rules in the set of rules.

In one embodiment, the method further comprises: converting each transaction of the received historical transaction data to a respective hash code identifier; wherein updating the at least one database comprises comparing new transactions to prior hash code identifiers.

In one embodiment, the method further comprises removing, based on comparing the new transactions to prior hash code identifiers, duplicate transactions.

In one embodiment, the method further comprises: receiving, from the computing device, categories defined based on at least one input provided by the user into the user interface; and automatically classifying each transaction of the received historical transaction data into a respective one of the categories.

In one embodiment, a system includes: at least one processor; and memory storing instructions configured to instruct the at least one processor to: receive at least one current account balance for a user; receive historical transaction data for the user; determine, based on the at least one current account balance and the historical transaction data, historical cash balances for the user; determine forecasted transactions for the user; update at least one database, the updating based at least on the historical cash balances and the forecasted transactions; generate, based on the at least one database, first data to display; and transmit the first data to a computing device for display of the first data in a user interface.

Figure 56:
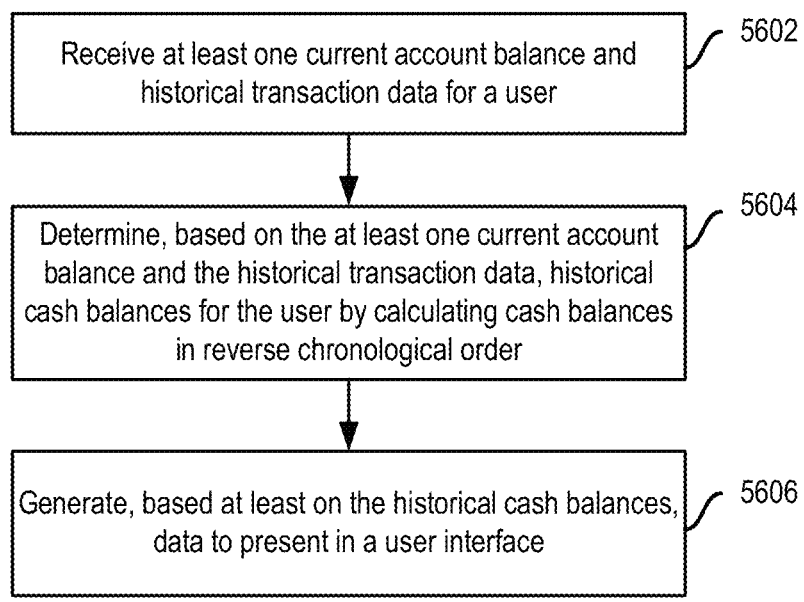
FIG. 56 shows a method to determine historical cash balances in reverse chronological order, according to one embodiment.

FIG. 56 shows a method to determine historical cash balances in reverse chronological order, according to one embodiment. In block 5602, one or more current account balances and historical transaction data for a user are received. For example, server 123 can be used to receive the balances and data.

In block 5604, historical cash balances for a user are determined by calculating cash balances in reverse chronological order. The historical cash balances are based on the one or more current account balances and historical transaction data. For example, the calculation of the cash balances can be performed by server 123.

In block 5606, data is generated to present in a user interface. The data is based at least on the historical cash balances. For example, the generated data can be transmitted to user terminal 808. In one example, the generated data is presented in dashboard 802.

In one embodiment, a non-transitory computer-readable storage medium stores computer-readable instructions, which when executed, cause a computing device to: receive at least one current account balance and historical transaction data for a user; determine, based on the at least one current account balance and the historical transaction data, historical cash balances for the user by calculating cash balances in reverse chronological order; and generate, based at least on the historical cash balances, data to present in a user interface of a computing device.

Figure 57:
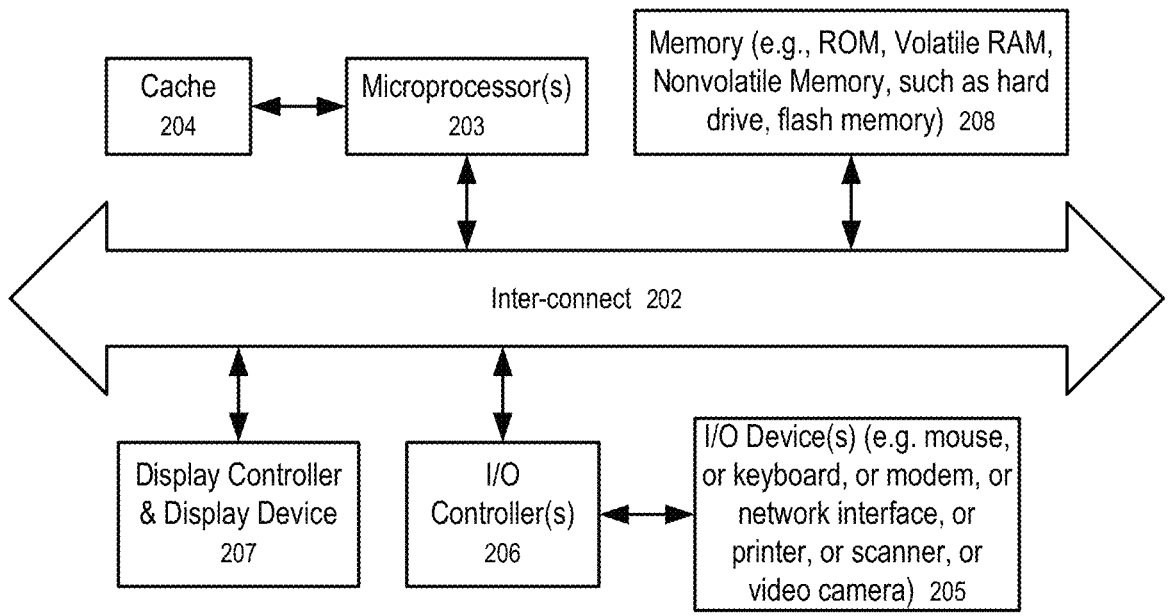
FIG. 57 shows a block diagram of a data processing system which can be used in various embodiments.

FIG. 57 shows a block diagram of a data processing system which can be used in various embodiments (e.g., as server 123). While FIG. 57 illustrates various components of a computer system, it is not intended to represent any particular architecture or manner of interconnecting the components. Other systems that have fewer or more components may also be used.

In FIG. 57, the system 201 includes an inter-connect 202 (e.g., bus and system core logic), which interconnects a microprocessor(s) 203 and memory 208. The microprocessor 203 is coupled to cache memory 204 in the example of FIG. 57.

The inter-connect 202 interconnects the microprocessor(s) 203 and the memory 208 together and also interconnects them to a display controller and display device 207 and to peripheral devices such as input/output (I/O) devices 205 through an input/output controller(s) 206. Typical I/O devices include mice, keyboards, modems, network interfaces, printers, scanners, video cameras and other devices which are well known in the art.

The inter-connect 202 may include one or more buses connected to one another through various bridges, controllers and/or adapters. In one embodiment the I/O controller 206 includes a USB (Universal Serial Bus) adapter for controlling USB peripherals, and/or an IEEE-1394 bus adapter for controlling IEEE-1394 peripherals.

The memory 208 may include ROM (Read Only Memory), and volatile RAM (Random Access Memory) and non-volatile memory, such as hard drive, flash memory, etc.

Volatile RAM is typically implemented as dynamic RAM (DRAM) which requires power continually in order to refresh or maintain the data in the memory. Non-volatile memory is typically a magnetic hard drive, a magnetic optical drive, or an optical drive (e.g., a DVD RAM), or other type of memory system which maintains data even after power is removed from the system. The non-volatile memory may also be a random access memory.

The non-volatile memory can be a local device coupled directly to the rest of the components in the data processing system. A non-volatile memory that is remote from the system, such as a network storage device coupled to the data processing system through a network interface such as a modem or Ethernet interface, can also be used.

A user terminal may be, for example, in the form of a mobile device, a pad or tablet device, a personal digital assistant (PDA), a cellular phone, a notebook computer or a personal desktop computer.

In some embodiments, one or more servers of the system can be replaced with the service of a peer to peer network of a plurality of data processing systems, or a network of distributed computing systems. The peer to peer network, or a distributed computing system, can be collectively viewed as a server data processing system.

Embodiments of the disclosure can be implemented via the microprocessor(s) 203 and/or the memory 208. For example, the functionalities described can be partially implemented via hardware logic in the microprocessor(s) 203 and partially using the instructions stored in the memory 208. Some embodiments are implemented using the microprocessor(s) 203 without additional instructions stored in the memory 208. Some embodiments are implemented using the instructions stored in the memory 208 for execution by one or more general purpose microprocessor(s) 203. Thus, the disclosure is not limited to a specific configuration of hardware and/or software.

Figure 58:
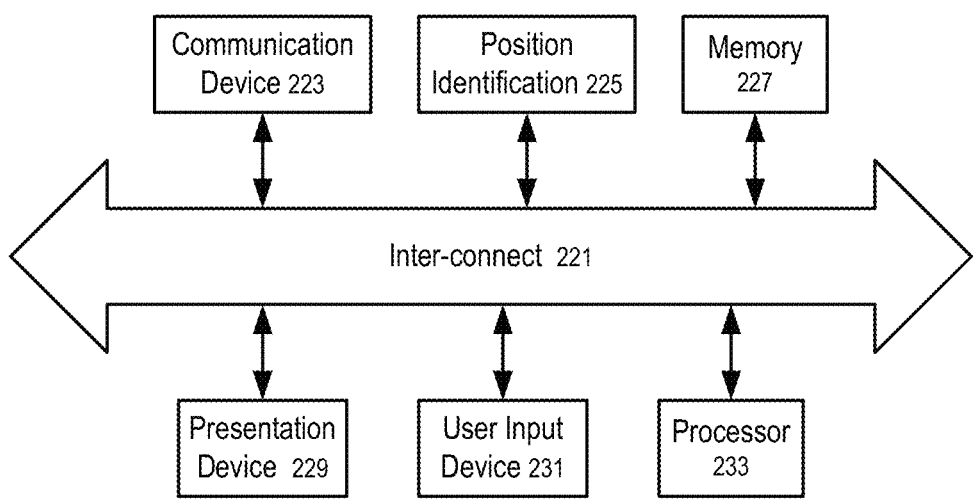
FIG. 58 shows a block diagram of a user device, according to one embodiment.

FIG. 58 shows a block diagram of a user device according to one embodiment. For example, the user device can be used as one of user terminals 141-145 or user terminal 808. In FIG. 58, the user device includes an inter-connect 221 connecting the presentation device 229, user input device 231, a processor 233, a memory 227, a position identification unit 225 and a communication device 223.

In FIG. 58, the position identification unit 225 is used to identify a geographic location. The position identification unit 225 may include a satellite positioning system receiver, such as a Global Positioning System (GPS) receiver, to automatically identify the current position of the user device.

In FIG. 58, the communication device 223 is configured to communicate with a server to provide user data and receive cash flow data. In one embodiment, the user input device 231 may include a text input device, a still image camera, a video camera, and/or a sound recorder, etc.

In this description, various functions and operations may be described as being performed by or caused by software code to simplify description. However, those skilled in the art will recognize what is meant by such expressions is that the functions result from execution of the code by a processor, such as a microprocessor. Alternatively, or in combination, the functions and operations can be implemented using special purpose circuitry, with or without software instructions, such as using an Application-Specific Integrated Circuit (ASIC) or a Field-Programmable Gate Array (FPGA). Embodiments can be implemented using hardwired circuitry without software instructions, or in combination with software instructions. Thus, the techniques are limited neither to any specific combination of hardware circuitry and software, nor to any particular source for the instructions executed by the data processing system.

While some embodiments can be implemented in fully functioning computers and computer systems, various embodiments are capable of being distributed as a computing product in a variety of forms and are capable of being applied regardless of the particular type of machine or computer-readable media used to actually effect the distribution.

At least some aspects disclosed can be embodied, at least in part, in software. That is, the techniques may be carried out in a computer system or other data processing system in response to its processor, such as a microprocessor, executing sequences of instructions contained in a memory, such as ROM, volatile RAM, non-volatile memory, cache or a remote storage device.

Routines executed to implement the embodiments may be implemented as part of an operating system, middleware, service delivery platform, SDK (Software Development Kit) component, web services, or other specific application, component, program, object, module or sequence of instructions referred to as "computer programs." Invocation interfaces to these routines can be exposed to a software development community as an API (Application Programming Interface). The computer programs typically comprise one or more instructions set at various times in various memory and storage devices in a computer, and that, when read and executed by one or more processors in a computer, cause the computer to perform operations necessary to execute elements involving the various aspects.

A machine readable medium can be used to store software and data which when executed by a data processing system causes the system to perform various methods. The executable software and data may be stored in various places including for example ROM, volatile RAM, non-volatile memory and/or cache. Portions of this software and/or data may be stored in any one of these storage devices. Further, the data and instructions can be obtained from centralized servers or peer to peer networks. Different portions of the data and instructions can be obtained from different centralized servers and/or peer to peer networks at different times and in different communication sessions or in a same communication session. The data and instructions can be obtained in entirety prior to the execution of the applications. Alternatively, portions of the data and instructions can be obtained dynamically, just in time, when needed for execution. Thus, it is not required that the data and instructions be on a machine readable medium in entirety at a particular instance of time.

Examples of computer-readable media include but are not limited to recordable and non-recordable type media such as volatile and non-volatile memory devices, read only memory (ROM), random access memory (RAM), flash memory devices, floppy and other removable disks, magnetic disk storage media, optical storage media (e.g., Compact Disk Read-Only Memory (CD ROMS), Digital Versatile Disks (DVDs), etc.), among others. The computer-readable media may store the instructions.

The instructions may also be embodied in digital and analog communication links for electrical, optical, acoustical or other forms of propagated signals, such as carrier waves, infrared signals, digital signals, etc. However, propagated signals, such as carrier waves, infrared signals, digital signals, etc. are not tangible machine readable medium and are not configured to store instructions.

In general, a tangible machine readable medium includes any mechanism that provides (e.g., stores) information in a form accessible by a machine (e.g., a computer, network device, personal digital assistant, manufacturing tool, any device with a set of one or more processors, etc.).

In various embodiments, hardwired circuitry may be used in combination with software instructions to implement the techniques. Thus, the techniques are neither limited to any specific combination of hardware circuitry and software nor to any particular source for the instructions executed by the data processing system.

Although some of the drawings illustrate a number of operations in a particular order, operations which are not order dependent may be reordered and other operations may be combined or broken out. While some reordering or other groupings are specifically mentioned, others will be apparent to those of ordinary skill in the art and so do not present an exhaustive list of alternatives. Moreover, it should be recognized that the stages could be implemented in hardware, firmware, software or any combination thereof.

The term "non-transitory" is to be understood to remove only propagating transitory signals per se from the claim scope and does not relinquish rights to all standard computer-readable media that are not only propagating transitory signals per se. Stated another way, the meaning of the term "non-transitory computer-readable medium" should be construed to exclude only those types of transitory computer-readable media which were found in In Re Nuijten to fall outside the scope of patentable subject matter under 35 U.S.C. § 101.

Benefits, other advantages, and solutions to problems have been described herein with regard to specific embodiments. However, the benefits, advantages, solutions to problems, and any elements that may cause any benefit, advantage, or solution to occur or become more pronounced are not to be construed as critical, required, or essential features or elements of the disclosure.

No claim element herein is to be construed under the provisions of 35 U.S.C. 112, sixth paragraph, unless the element is expressly recited using the phrase "means for."

In the foregoing specification, the disclosure has been described with reference to specific exemplary embodiments thereof. It will be evident that various modifications may be made thereto without departing from the broader spirit and scope as set forth in the following claims. The specification and drawings are, accordingly, to be regarded in an illustrative sense rather than a restrictive sense.

What is claimed is:

1. A method to display selected information in a user interface of a computing device, the method comprising:
    receiving, over a network from at least one server, at least one current account balance for a user of the computing device;
    receiving, over the network from the at least one server, historical transaction data for the user;
    converting each transaction of the received historical transaction data to a respective hash code identifier;
    determining, by at least one processor and based on the at least one current account balance and the historical transaction data, historical cash balances for the user by calculating cash balances in reverse chronological order;
    determining, by the at least one processor and based at least in part on the historical transaction data, forecasted transactions for the user;
    updating, by the at least one processor, at least one database, the updating based at least on the historical cash balances and the forecasted transactions, wherein updating the at least one database comprises comparing new transactions to prior hash code identifiers;
    removing, based on comparing the new transactions to prior hash code identifiers, duplicate transactions;
    generating, using the at least one database, first data to display selected information; and
    transmitting, over the network, the first data to the computing device for display in the user interface.

2. The method of claim 1, wherein calculating the cash balances starts with a current date of the at least one account balance.

3. The method of claim 2, wherein calculating the cash balances in reverse chronological order provides a starting cash balance, and the starting cash balance is for a date prior to the current date.

4. The method of claim 1, wherein the historical transaction data comprises debits and credits, and wherein determining the historical cash balances for the user comprises calculating cash balances by applying, using an opposite sign, the debits and credits in reverse order.

5. The method of claim 1, further comprising converting the forecasted transactions to historical transactions as additional historical transaction data is received from the at least one server.

6. The method of claim 5, further comprising:
    determining whether a new transaction is a partial match to a forecasted transaction based on at least one of a source of historical transaction data for the new transaction or an amount of the new transaction; and
    in response to determining that the new transaction is the partial match to a the forecasted transaction, converting a corresponding portion of the new transaction to a historical transaction.

7. The method of claim 5, wherein converting the forecasted transactions to historical transactions comprises recognizing each forecasted transaction as been completed or pending, and updating the forecasted transaction in the at least one database as being a completed or pending transaction.

8. The method of claim 5, further comprising, identifying word patterns in the historical transaction data, wherein converting the forecasted transactions to historical transactions is based at least in part on the identified word patterns.

9. The method of claim 5, further comprising:
    updating, based on converting the forecasted transactions to historical transactions, the at least one database;
    generating, using the at least one database, updated data for display; and
    transmitting the updated data to the computing device for display in the user interface, wherein the updated data is configured to display a historical view based on at least one historical cash balance and a forecast view based on at least one forecasted transaction, and wherein the historical view is connected with the forecast view such that when the historical view changes, the forecast view correspondingly changes.

10. The method of claim 5, wherein converting the forecasted transactions to historical transactions is performed at least in part based on a computer model.

11. The method of claim 10, wherein the computer model uses machine learning to recognize at least one word pattern in the historical transaction data.

12. The method of claim 10, wherein the at least one database is updated by a first server that receives historical transaction data for other users, the computer model is based on rules, and the rules are learned at least from the other users.

13. The method of claim 1, further comprising, in response to identifying a word pattern in a descriptor of the historical transaction data, automatically creating a new rule, wherein determining the forecasted transactions for the user is based at least in part on the new rule.

14. The method of claim 1, wherein determining the forecasted transactions is based on a set of rules using at least one of a priority level or a confidence level to determine each forecasted transaction.

15. The method of claim 14, wherein:
determining the historical cash balances and determining the forecasted transactions are performed in real-time; and
a first rule that is set by the user in the user interface has a higher confidence level than other rules in the set of rules.

16. The method of claim 1, further comprising:
receiving, from the computing device, categories defined based on at least one input provided by the user into the user interface; and
automatically classifying each transaction of the received historical transaction data into a respective one of the categories.

17. A system, comprising:
at least one processor; and
memory storing instructions configured to instruct the at least one processor to:
  receive at least one current account balance for a user;
  receive historical transaction data for the user;
  convert each transaction of the received historical transaction data to a respective hash code identifier;
  determine, based on the at least one current account balance and the historical transaction data, historical cash balances for the user calculating cash balances in reverse chronological order;
  determine forecasted transactions for the user;
  update at least one database, the updating based at least on the historical cash balances and the forecasted transactions, wherein updating the at least one database comprises comparing new transactions to prior hash code identifiers;
  remove, based on comparing the new transactions to prior hash code identifiers, duplicate transactions;
  generate, based on the at least one database, first data to display; and
  transmit the first data to a computing device for display of the first data in a user interface.

18. A non-transitory computer-readable storage medium storing computer-readable instructions, which when executed, cause a computing device to:
  receive at least one current account balance and historical transaction data for a user;
  convert each transaction of the received historical transaction data to a respective hash code identifier;
  determine, based on the at least one current account balance and the historical transaction data, historical cash balances for the user by calculating cash balances in reverse chronological order; and
  update at least one database, the updating based at least on the historical cash balances, wherein updating the at least one database comprises comparing new transactions to prior hash code identifiers;
  remove, based on comparing the new transactions to prior hash code identifiers, duplicate transactions; and
  generate, based at least on the historical cash balances, data to present in a user interface of a computing device.

* * * * *

UNITED STATES PATENT AND TRADEMARK OFFICE
CERTIFICATE OF CORRECTION

PATENT NO. : 10,891,695 B2  
APPLICATION NO. : 16/106788  
DATED : January 12, 2021  
INVENTOR(S) : Omar Sayed Page 1 of 1

It is certified that error appears in the above-identified patent and that said Letters Patent is hereby corrected as shown below:

In the Claims

In Column 26, Line 21, in Claim 6, delete "to a the" and insert -- to the --, therefor.

In Column 26, Line 26, in Claim 7, delete "as been" and insert -- as --, therefor.

In Column 27, Line 26, in Claim 17, delete "user calculating" and insert -- user by calculating --, therefor.

In Column 28, Line 19, in Claim 18, delete "order; and" and insert -- order; --, therefor.

Signed and Sealed this  
Sixteenth Day of March, 2021

Drew Hirshfeld  
*Performing the Functions and Duties of the*  
*Under Secretary of Commerce for Intellectual Property and*  
*Director of the United States Patent and Trademark Office*